United States Patent
Verma et al.

(10) Patent No.: US 12,270,821 B2
(45) Date of Patent: Apr. 8, 2025

(54) DEVICE AND METHOD FOR ASSESSING OXIDATIVE POTENTIAL OF AMBIENT PARTICULATE MATTER

(71) Applicant: The Board of Trustees of the University of Illinois, Urbana, IL (US)

(72) Inventors: Vishal Verma, Savoy, IL (US); Haoran Yu, Urbana, IL (US); Joseph Puthussery, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 342 days.

(21) Appl. No.: 17/204,158

(22) Filed: Mar. 17, 2021

(65) Prior Publication Data
US 2021/0293842 A1   Sep. 23, 2021

Related U.S. Application Data

(60) Provisional application No. 62/991,159, filed on Mar. 18, 2020.

(51) Int. Cl.
*B01L 3/00* (2006.01)
*B01L 7/00* (2006.01)
(Continued)

(52) U.S. Cl.
CPC .......... *G01N 35/1016* (2013.01); *B01L 3/502* (2013.01); *B01L 3/567* (2013.01);
(Continued)

(58) Field of Classification Search
CPC . B01L 3/502; B01L 3/567; B01L 7/00; G01N 21/31; G01N 21/6428; G01N 35/1016
See application file for complete search history.

(56) References Cited

U.S. PATENT DOCUMENTS

| 5,444,807 A * | 8/1995 | Liu | G02B 6/032 |
| | | | 204/603 |
| 2010/0317119 A1* | 12/2010 | Sem | C07C 323/52 |
| | | | 562/556 |
| 2012/0046203 A1* | 2/2012 | Walsh | G01N 21/253 |
| | | | 422/69 |

FOREIGN PATENT DOCUMENTS

EP     2909605 B1     1/2018

OTHER PUBLICATIONS

Abrams et al. (2017) "Associations between ambient fine particulate oxidative potential and cardiorespiratory emergency department visits," Environmental Health Perspectives 125(10):107008. doi: 10.1289/ehp1545.

(Continued)

*Primary Examiner* — Matthew D Krcha
*Assistant Examiner* — Tingchen Shi
(74) *Attorney, Agent, or Firm* — Leydig, Voit & Mayer, Ltd.

(57) ABSTRACT

Disclosed herein are instruments and related methods for measuring oxidative potential (OP) in airborne particulates, particularly $PM_{2.5}$. The instrument is formed from three main components: a sample injector, a sample incubator and a measurement system. The instrument provides an automatic measure of five OP endpoints in a relatively rapid time frame of less than 3 hours. In this manner, additional parameters beyond the gross particle concentration or mass per unit volume is obtained, including the biologically-relevant OP associated with $PM_{2.5}$.

17 Claims, 29 Drawing Sheets

(51) Int. Cl.
  G01N 21/31 (2006.01)
  G01N 21/64 (2006.01)
  G01N 35/10 (2006.01)
(52) U.S. Cl.
  CPC .............. *B01L 7/00* (2013.01); *G01N 21/31* (2013.01); *G01N 21/6428* (2013.01); *B01L 2200/026* (2013.01); *B01L 2200/0605* (2013.01); *B01L 2300/18* (2013.01); *B01L 2400/0403* (2013.01); *B01L 2400/0622* (2013.01); *G01N 2021/6439* (2013.01)

(56) References Cited

OTHER PUBLICATIONS

Alfadda et al. (2012) "Reactive oxygen species in health and disease," BioMed Research International, vol. 2012, Article ID 936486. doi: 10.1155/2012/936486.
Antiñolo et al. (2015) "Connecting the oxidation of soot to its redox cycling abilities," Nature Communications 6, 6812. doi: 10.1038/ncomms7812.
Araujo et al. (2009) "Particulate matter and atherosclerosis: role of particle size, composition and oxidative stress," Particle and Fibre Toxicology 6(1):24. doi: 10.1186/1743-8977-6-24.
Ayres et al. (2008) "Evaluating the toxicity of airborne particulate matter and nanoparticles by measuring oxidative stress potential—a workshop report and consensus statement," Inhalation Toxicology 20(1):75-99. doi: 10.1080/08958370701665517.
Baker et al. (1990) "Microtiter plate assay for the measurement of glutathione and glutathione disulfide in large numbers of biological samples," Analytical Biochemistry 190(2):360-365. doi: 10.1016/0003-2697(90)90208-Q.
Bates et al. (2015) "Reactive oxygen species generation linked to sources of atmospheric particulate matter and cardiorespiratory effects," Environmental Science & Technology 49(22):13605-13612. doi: 10.1021/acs.est.5b02967.
Bates et al. (Mar. 2019) "Review of Acellular Assays of Ambient Particulate Matter Oxidative Potential: Methods and Relationships with Composition, Sources, and Health Effects." Environ Sci Technol. 53(8): 4003-4019.
Becker et al. (2005) "Seasonal variations in air pollution particle-induced inflammatory mediator release and oxidative stress," Environmental Health Perspectives 113(8):1032-1038. doi: 10.1289/ehp.7996.
Birben et al. (2012) "Oxidative stress and antioxidant defense," World Allergy Organization Journal 5(1):9-19. doi: 10.1097/WOX.0b013e3182439613.
Böhmer et al. (2011) "High-performance liquid chromatography ultraviolet assay for human erythrocytic catalase activity by measuring glutathione as o-phthalaldehyde derivative" Analytical Biochemistry 410(2):296-303. doi: 10.1016/j.ab.2010.11.026.
Bonomini et al. (2008) "Atherosclerosis and oxidative stress," Histology and Histopathology 23(3):381-390. doi: 10.14670/HH-23.381.
Calas et al. (2018) "Comparison between five acellular oxidative potential measurement assays performed with detailed chemistry on PM10 samples from the city of Chamonix (France)," Atmos. Chem. Phys., 18, 7863-7875, https://doi.org/10.5194/acp-18-7863-2018.
Campbell et al. (Sep. 2019) "Development of a Physiologically Relevant Online Chemical Assay To Quantify Aerosol Oxidative Potential," Analytical Chemistry 91 (20), 13088-13095 DOI: 10.1021/acs.analchem.9b03282.
Charrier et al. (2012) "On dithiothreitol (DTT) as a measure of oxidative potential for ambient particles: evidence for the importance of soluble transition metals," Atmospheric Chemistry and Physics 12(5):11317-11350. doi: 10.5194/acp-12-9321-2012.
Charrier et al. (2014) "Hydrogen peroxide formation in a surrogate lung fluid by transition metals and quinones present in particulate matter," Environmental Science & Technology 48(12):7010-7017. doi: 10.1021/es501011w.

Charrier et al. (2015) "Rates of Hydroxyl Radical Production from Transition Metals and Quinones in a Surrogate Lung Fluid," Environmental Science & Technology 49(15):9317-9325. doi: 10.1021/acs.est.5b01606.
Charrier et al. (2016) "A bias in the "mass-normalized" DTT response—An effect of non-linear concentration-response curves for copper and manganese," Atmospheric Environment 144, 325-334. doi: 10.1016/j.atmosenv.2016.08.071.
Cho et al. (2005) "Redox activity of airborne particulate matter at different sites in the Los Angeles Basin," Environmental Research 99(1):40-47. doi: 10.1016/j.envres.2005.01.003.
Chuang et al. (2007) "The effect of urban air pollution on inflammation, oxidative stress, coagulation, and autonomic dysfunction in young adults," American Journal of Respiratory and Critical Care Medicine 176(4):370-376. doi: 10.1164/rccm.200611-1627OC.
Cohen et al. (2017) "Estimates and 25-year trends of the global burden of disease attributable to ambient air pollution: an analysis of data from the Global Burden of Diseases Study 2015," The Lancet 389(10082):1907-1918. doi: 10.1016/S0140-6736(17)30505-6.
Crobeddu et al. (2017) "Oxidative potential of particulate matter 2.5 as predictive indicator of cellular stress," Environmental Pollution 230,125-133. doi: doi.org/10.1016/j.envpol.2017.06.051.
D'Autréaux et al. (2007) "ROS as signalling molecules: mechanisms that generate specificity in ROS homeostasis," Nature Reviews Molecular Cell Biology 8(10):813-824. doi: 10.1038/nrm2256.
Delfino et al. (2013) "Airway inflammation and oxidative potential of air pollutant particles in a pediatric asthma panel," Journal of Exposure Science and Environmental Epidemiology 23(5):466-473. doi: 10.1038/jes.2013.25.
Fang et al. (2015) "A semi-automated system for quantifying the oxidative potential of ambient particles in aqueous extracts using the dithiothreitol (DTT) assay: results from the Southeastern Center for Air Pollution and Epidemiology (SCAPE)," Atmos. Meas. Tech., 8, 471-482, https://doi.org/10.5194/amt-8-471-2015.
Fang et al. (2016) "Oxidative potential of ambient water-soluble PM 2.5 in the southeastern United States: contrasts in sources and health associations between ascorbic acid (AA) and dithiothreitol (DTT) assays," Atmospheric Chemistry and Physics 16(6):3865-3879. doi: 10.5194/acp-16-3865-2016.
Feng et al. (2016) "The health effects of ambient $PM_{2.5}$ and potential mechanisms," Ecotoxicology and Environmental Safety 128,67-74. doi: 10.1016/j.ecoenv.2016.01.030.
Godri et al. (2011) "Increased oxidative burden associated with traffic component of ambient particulate matter at roadside and urban background schools sites in London," PloS One 6(7):e21961. doi: 10.1371/journal.pone.0021961.
Held et al. (1996) Role of Fenton chemistry in thiol-induced toxicity and apoptosis. Radiation Research 145(5):542-553. doi: 10.2307/3579272.
Hu et al. (2008) Redox activity and chemical speciation of size fractioned PM in the communities of the Los Angeles-Long Beach harbor. Atmospheric Chemistry and Physics 8(21):6439-6451. doi: 10.5194/acp-8-6439-2008.
Hulskotte (2007) Brake wear from vehicles as an important source of diffuse copper pollution. Water Science & Technology 56(1):223-231. doi: 10.2166/wst.2007.456.
Janssen et al. (2014) "Oxidative potential of particulate matter collected at sites with different source characteristics," Science of the Total Environment 472, 572-581. doi: 10.1016/j.scitotenv.2013.11.099.
Janssen et al. (2015) Associations between three specific a-cellular measures of the oxidative potential of particulate matter and markers of acute airway and nasal inflammation in healthy volunteers. Occupational & Environmental Medicine 72(1):49-56. doi: 10.1136/oemed-2014-102303.
Kampa et al. (2008) Human health effects of air pollution. Environmental Pollution 151(2):362-367. doi: 10.1016/j.envpol.2007.06.012.
Knaapen et al. (2004) Inhaled particles and lung cancer. Part A: Mechanisms. International Journal of Cancer 109(6):799-809. doi: 10.1002/ijc.11708.

(56) References Cited

OTHER PUBLICATIONS

Kodavanti (2000) The spontaneously hypertensive rat as a model of human cardiovascular disease: evidence of exacerbated cardiopulmonary injury and oxidative stress from inhaled emission particulate matter. Toxicology and Applied Pharmacology 164(3):250-263. doi: 10.1006/taap.2000.8899.
Künzli et al. (2006) Comparison of oxidative properties, light absorbance, and total and elemental mass concentration of ambient PM2. 5 collected at 20 European sites. Environmental Health Perspectives 114(5):684-690. doi: 10.1289/ehp.8584.
Li et al. (2003) Ultrafine particulate pollutants induce oxidative stress and mitochondrial damage. Environmental Health Perspectives 111(4):455. doi: 10.1289/ehp.6000.
Li et al. (2008) The role of oxidative stress in ambient particulate matter-induced lung diseases and its implications in the toxicity of engineered nanoparticles. Free Radical Biology and Medicine 44(9):1689-1699. doi: 10.1016/j.freeradbiomed.2008.01.028.
Longhin et al. (2013) Cell cycle alterations induced by urban PM2. 5 in bronchial epithelial cells: characterization of the process and possible mechanisms involved. Particle and Fibre Toxicology 10(1):63. doi: 10.1186/1743-8977-10-63.
Ma et al. (2015) Production of hydroxyl radicals from Fe-containing fine particles in Guangzhou, China. Atmospheric Environment 123, 72-78. doi: 10.1016/j.atmosenv.2015.10.057.
Maikawa et al. (2016) Particulate Oxidative Burden as a Predictor of Exhaled Nitric Oxide in Children with Asthma. Environmental Health Perspectives 124(10):1616. doi: 10.1289/ehp175.
Mudway et al. (2001) Differences in basal airway antioxidant concentrations are not predictive of individual responsiveness to ozone: a comparison of healthy and mild asthmatic subjects. Free Radical Biology and Medicine 31(8):962-974. doi: 10.1016/S0891-5849(01)00671-2.
Mudway et al. (2005) Combustion of dried animal dung as biofuel results in the generation of highly redox active fine particulates. Particle and Fibre Toxicology 2(1):6. doi: 10.1186/1743-8977-2-6.
Oh et al. (2011) Organic extracts of urban air pollution particulate matter (PM2. 5)-induced genotoxicity and oxidative stress in human lung bronchial epithelial cells (BEAS-2B cells). Mutation Research/Genetic Toxicology and Environmental Mutagenesis 723(2):142-151. doi: 10.1016/j.mrgentox.2011.04.003.
Pervez et al. (2016) Chemical speciation of aerosols and air quality degradation during the festival of lights (Diwali). Atmospheric Pollution Research 7(1):92-99. doi: 10.1016/j.apr.2015.09.002.
Pham-Huy et al. (2008) Free radicals, antioxidants in disease and health. International Journal of Biomedical Science 4(2):89.
Pietrogrande et al. (Aug. 2019) "Ascorbate assay as a measure of oxidative potential for ambient particles: Evidence for the importance of cell-free surrogate lung fluid composition," Atmospheric Environment 211:103-112. doi: 10.1016/j.atmosenv.2019.05.012.
Puthussery et al. (2018) "Development and field testing of an online instrument for measuring the real-time oxidative potential of ambient particulate matter based on dithiothreitol assay," Atmos. Meas. Tech., 11, 5767-5780, https://doi.org/10.5194/amt-11-5767-2018.
Rahman et al. (2012) Oxidative stress and human health. Advances in Bioscience and Biotechnology 3(07):997. doi: 10.4236/abb.2012.327123.
Roušar et al. (2012) Assessment of reduced glutathione: comparison of an optimized fluorometric assay with enzymatic recycling method. Analytical Biochemistry 423(2):236-240. doi: 10.1016/j.ab.2012.01.030.
Sarnat et al. (2016). Ambient PM2. 5 and health: does PM2. 5 oxidative potential play a role?, American Thoracic Society. Am J Respir Crit Care Med. 194(5):530-1.
Sauvain et al. (2015) Oxidative potential of particles in different occupational environments: A pilot study. The Annals Of Occupational Hygiene 59(7):882-894. doi: 10.1093/annhyg/mev024.
Shen et al. (2011) Generation of hydrogen peroxide from San Joaquin Valley particles in a cell-free solution. Atmospheric Chemistry and Physics 11(2):753-765. doi: 10.5194/acp-11-753-2011.
Shidlauski (Dec. 17, 2019) "Automated instrument measures oxidative potential of ambient particulate matter," University of Illinois Urbana-Champaign, The Grainger College of Engineering, Civil & Environmental Engineering website accessed Jan. 22, 2020. https://cee.illinois.edu/news/automated-instrument-measures-oxidative-potential-ambient-particulate-matter.
Son et al. (2015) A Novel High-Throughput Approach to Measure Hydroxyl Radicals Induced by Airborne Particulate Matter. International Journal of Environmental Research and Public Health 12(11):13678-13695. doi: 10.3390/ijerph121113678.
Sun et al. (2005) Long-term air pollution exposure and acceleration of atherosclerosis and vascular inflammation in an animal model. JAMA 294(23):3003-3010. doi: 10.1001/jama.294.23.3003.
Szigeti et al. (2016) Oxidative potential and chemical composition of PM2.5 in office buildings across Europe—The OFFICAIR study. Environment International 92, 324-333. doi: 10.1016/j.envint.2016.04.015.
Torres-Ramos (2011) Urban PM2.5 induces ROS generation and RBC damage in COPD patients. Frontiers in Bioscience (Elite Edition) 3 E(3):808-817. doi: 10.2741/e288.
Verma et al. (2009) Redox activity of urban quasi-ultrafine particles from primary and secondary sources. Atmospheric Environment 43(40):6360-6368. doi: 10.1016/j.atmosenv.2009.09.019.
Verma et al. (2012) Contribution of water-soluble and insoluble components and their hydrophobic/hydrophilic subfractions to the reactive oxygen species-generating potential of fine ambient aerosols. Environmental Science & Technology 46(20):11384-11392. doi: 10.1021/es302484r.
Verma et al. (2015) Fractionating ambient humic-like substances (HULIS) for their reactive oxygen species activity—Assessing the importance of quinones and atmospheric aging. Atmospheric Environment 120, 351-359. doi: 10.1016/j.atmosenv.2015.09.010.
Verma et al. (2015) Organic aerosols associated with the generation of reactive oxygen species (ROS) by water-soluble PM2. 5. Environmental Science & Technology 49(7):4646-4656. doi: 10.1021/es505577w.
Vidrio et al. (2008) Generation of hydroxyl radicals from dissolved transition metals in surrogate lung fluid solutions. Atmospheric Environment 42(18):4369-4379. doi: 10.1016/j.atmosenv.2008.01.004.
Vidrio et al. (2009) Generation of hydroxyl radicals from ambient fine particles in a surrogate lung fluid solution. Environmental Science & Technology 43(3):922-927. doi: 10.1021/es801653u.
Visentin et al. (2016) Urban PM2. 5 oxidative potential: Importance of chemical species and comparison of two spectrophotometric cell-free assays. Environmental Pollution 219, 72-79. doi: 10.1016/j.envpol.2016.09.047.
Wang et al. (2018) Assessing the cytotoxicity of ambient particulate matter (PM) using Chinese hamster ovary (CHO) cells and its relationship with the PM chemical composition and oxidative potential. Atmospheric Environment 179, 132-141. doi: 10.1016/j.atmosenv.2018.02.025.
Weichenthal et al. (2016) Ambient PM2.5 and risk of emergency room visits for myocardial infarction: impact of regional PM2.5 oxidative potential: a case-crossover study. Environmental Health 15(1):46. doi: 10.1186/s12940-016-0129-9.
West et al. (2016) What we breathe impacts our health: improving understanding of the link between air pollution and health. Environmental Science & Technology 50(10):4895-4904. doi: 10.1021/acs.est.5b03827.
Wragg et al. (2016) "An automated online instrument to quantify aerosol-bound reactive oxygen species (ROS) for ambient measurement and health-relevant aerosol studies," Atmos. Meas. Tech., 9, 4891-4900, https://doi.org/10.5194/amt-9-4891-2016, 2016.
Xiong et al. (2017) "Rethinking Dithiothreitol-Based Particulate Matter Oxidative Potential: Measuring Dithiothreitol Consumption versus Reactive Oxygen Species Generation," Environ. Sci. Technol. 51, 6507-6514. DOI: 10.1021/acs.est.7b01272.
Yan et al. (2016) Oxidative stress and endocytosis are involved in upregulation of interleukin-8 expression in airway cells exposed to PM 2.5. Environmental Toxicology 31(12):1869-1878. doi: 10.1002/tox.22188.

(56) References Cited

OTHER PUBLICATIONS

Yang et al. (2016) Children's respiratory health and oxidative potential of $PM_{2.5}$: the PIAMA birth cohort study. Occupational & Environmental Medicine 73(3):154-160. doi: 10.1136/oemed-2015-103175.

Yu et al. (2018) Synergistic and antagonistic interactions among the particulate matter components in generating reactive oxygen species based on the dithiothreitol assay. Environmental Science & Technology 52(4):2261-2270. doi: 10.1021/acs.est.7b04261.

Yu et al. (Nov. 2019) "A Semi-Automated Multi Endpoint Reactive Oxygen Species Activity Analyzer (SAMERA) for measuring the Oxidative Potential of Ambient $PM_{2.5}$ Aqueous Extracts," with Supplemental Information, Aerosol Science and Technology, 54:3, 304-320, DOI: 10.1080/02786826.2019.1693492.

Yu et al. (Oct. 2019) "A Comprehensive Assessment of the Spatiotemporal Variability of Oxidative Potential of Ambient $PM_{2.5}$ in Midwest U.S. using a Semi-Automated Multi-Endpoint ROS-Activity Analyzer (SAMERA)." Poster presentation at 37th Annual Aerosol Conference. Oct. 14-18, 2019. Portland, OR.

Yu et al. (Oct. 2020) "Spatiotemporal Variability of Oxidative Potential (OP) of Water-Soluble $PM_{2.5}$ in Midwest U.S.," virtual presentation in the American Association for Aerosol Research Conference.

Zhang et al. (2016) Associations of oxidative stress and inflammatory biomarkers with chemically-characterized air pollutant exposures in an elderly cohort. Environmental Research 150, 306-319. doi: 10.1016/j.envres.2016.06.019.

\* cited by examiner

DEVICE AND METHOD FOR ASSESSING OXIDATIVE POTENTIAL OF AMBIENT PARTICULATE MATTER

CROSS-REFERENCE TO RELATED APPLICATIONS

This application claims the benefit of priority to U.S. Provisional Patent Application No. 62/991,159, filed Mar. 18, 2020, which is hereby incorporated by reference in its entirety.

STATEMENT REGARDING FEDERALLY SPONSORED RESEARCH OR DEVELOPMENT

This invention was made with government support under Grant Number CBET-1847237 awarded by the National Science Foundation. The government has certain rights in the invention.

BACKGROUND OF INVENTION

Provided herein are systems and related methods for assessing the oxidative potential of airborne particulates, including particles having an effective diameter that is less than 2.5 μm ($PM_{2.5}$).

Epidemiological studies recognize that particulate air pollution is responsible for many adverse health effects, including atherosclerosis, asthma, lung cancer and various cardiovascular diseases. Because of this, governmental regulations are provided for particulate matter having an effective or aerodynamic diameter that is less than 2.5 μm, with those regulations becoming more restrictive as the adverse health effects of these particles are increasingly well-established. For example, the U.S. EPA in 1990 established mandated ambient concentration limits (National Ambient Air Quality Standards or "NAAQS") and in 1997 the first $PM_{2.5}$ standards were adopted, and have been twice revised in 2006 and 2012. For example, the yearly standard is currently 12 micrograms per cubic meter ($\mu g/m^3$).

There is a fundamental problem with standards tied to particle mass per unit volume. Such a standard is based on weight and does not account for particle composition. It is recognized that, depending on particle composition, the health impact or toxicity can vary widely even for equivalent particle mass. This reflects that not all particles impact health in the same way. For example, oxidative potential (OP) of particles are increasingly recognized as a biologically-relevant source of reactive oxygen species (ROS) that can adversely impact biological cells. See, e.g., Bates et al. "Review of Acellular Assays of Ambient Particulate Matter Oxidative Potential: Methods and Relationships with Composition, Sources, and Health Effects." Environ Sci Technol. 53(8): 4003-4019 (Apr. 16, 2019). Of course, not all $PM_{2.5}$ have the same OP. Accordingly, there is a need in the art for reliable, efficient and accurate measurement of the OP of $PM_{2.5}$.

Although acellular assays are available to measure OP of $PM_{2.5}$, including by consumption of ascorbic acid (AA), glutathione (GSH), dithiothreitol (DTT) and generation rate of hydroxyl radicals, there is no consensus as to the most appropriate method for measuring OP. There are also significant issues associated with the ability to efficiently and timely obtain results from each of these acellular assays. For example, manual assays for OP analysis for DTT assay (Cho et al., 2005), AA consumption (Mudway et al., 2005), GSH consumption (Godri et al., 2011) and hydroxyl radical generation (Vidrio et al., 2008), each involve laborious and time-consuming protocols. The systems and methods provided herein address the need in the art for measuring OP of $PM_{2.5}$ by combining five of the most used endpoints in assessing OP of $PM_{2.5}$ into an easy to use, automated system for a sample within 3 hours. The invention provided herein has a variety of uses and applications, including for analytical instrumentation in environmental testing applications. Examples include regulatory laboratories, contract testing laboratories, municipal wastewater utilities, power generation utilities, pharmaceutical organizations, chemical and petrochemical companies, oil and gas companies, food manufacturers, academic and research institutions.

SUMMARY OF THE INVENTION

Provided herein are instruments and related methods for measuring OP of $PM_{2.5}$ using a plurality of acellular assays that have been automated for efficient, reliable and accurate OP determination. For example, the systems and methods incorporate specialized fluidic handling and analysis to systemically and at least semi-automatically measure five most used endpoints of OP determination.

Of particular relevance is the ability for the instruments and methods to continuously, in a periodic manner, analyze samples so that a time course of measurements can be obtained. This is a fundamental improvement over conventional assays where, due to time constraints, it is impractical to perform measurements. Rather, conventional systems tend to simply measure a first and last endpoint, so that any rate determination, whether it be generation or consumption, is a crude and linear estimate. A particular advantage of the instantly described instruments is the ability to perform whole kinetic profiles of reaction rates, providing better accuracy, measuring non-linearity, and corresponding highly resolved output. This is readily achieved, for example, for a variety of time courses, such as a time course of about 4 hours. Conventional assays, are simply unable to realistically achieve such a time course measurement for five distinct endpoints from a single sample. Accordingly, in an aspect, the invention can be described as having a resolution for any of the rate determinants that is better than 30 minutes, 20 minutes, 15 minutes, 10 minutes, 5 minutes, 3 minutes, 2 minutes or 1 minute. In other words, the frequency of measurement is every 30 minutes, 20 minutes, 15 minutes, 10 minutes, 5 minutes, 3 minutes, 2 minutes or 1 minute, such as between 1 and 5 minutes, 1 and 10 minutes, 1 and 20 minutes, and 1 and 30 minutes. This is an important aspect, as conventional two-point analysis (start and end points) can be misleading, particularly if there is a large change in activity at the end of the assay.

Accordingly, the instruments and methods provided herein are preferably for measuring non-linear, highly resolved OP endpoints.

Preferably, the five endpoints of the instant instruments and methods are: consumption rate of ascorbic acid (AA) in surrogate lung fluid (SLF) ($OP^{AA-SLF}$); consumption rate of glutathione (GSH) in SLF ($OP^{GSH-SLF}$); generation rate of hydroxyl radicals (·OH) in SLF ($OP^{OH-SLF}$); consumption rate of dithiothreitol ($OP^{DTT}$); and generation rate of hydroxyl radicals in DTT ($OP^{OH-DTT}$). Of course, the methods and systems described herein are at a platform-level for OP measurement and can be readily adopted for use with a subset of the five endpoints or with other assays, as the field of OP measurement of ambient $PM_{2.5}$ continues to evolve. For example, the rates may be measured in other substitute fluids besides SLF by providing different media in reaction vials or reservoirs of the instant systems. The instruments and methods provided herein are, of course, compatible with additional endpoints.

At a general level, the instrument has a sample injection or injector system, a sample incubator and incubation system, and a sample measurement system. The sample injection system may include three programmable syringe pumps and a multi-position valve controlled by an actuator or, more generally, a controller. The sample incubation system has a temperature-controlled agitator, including to maintain a constant temperature (including 37° C.) and an agitation frequency (including 400 RPM). The measurement system is preferably an optical measurement system, including a spectrophotometer and a spectrofluorometer, such as a Fluromax-4 spectrofluorometer. In this manner, the instrument is programmable, thereby achieving a type of automated series of acellular assays for measuring OP of particulate matter, such as $PM_{2.5}$. The instrument and related methods are particularly well-suited for use in labs involved in measuring the oxidative and toxicological properties of environmental samples such as ambient particulate matter extracted in water. The instrument has applications for local and national air monitoring, including for monitoring agencies at the federal, state and local level (e.g., EPA, SCAQMD, CARB, etc.), who are responsible for maintaining healthy ambient air quality standards.

Provided herein is an instrument for analyzing oxidative potential of particles from an air sample comprising a sample injector. The sample injector comprises a plurality of reservoirs including a reaction vial (RV) and a measurement vial (MV), each reservoir configured to hold at least one material selected from the group consisting of: a reaction chemical, an incubation chemical, a cleaning liquid, air, and waste fluid; a plurality of programmable pumps for flowing the material from each reservoir to another reservoir or to or from another instrument component; a multi-position valve and fluid conduits to fluidically connect a sample vial to the plurality of reservoirs, wherein the programmable pump(s) are configured to drive a flow of fluid sample from the sample vial to a reaction vial; and a valve actuator for controlling the multi-position valve to select different samples for analysis and fluidically control fluid flow within, into and out of the sample injector. In this manner, fluid flow is controlled by programmable pumps, such that throughout the process, various reaction, measurement and cleaning steps are reliably achieved. A sample incubator comprises a thermal mixer fluidically connected to the sample injector for incubating and mixing a reaction mixture, wherein the reaction mixture comprises particles from the air sample in the fluid sample and material from the plurality of reservoirs, and the reaction mixture is contained in the RV. A measurement system is fluidically connected to the sample incubator and/or sample injector. The measurement system comprises: a spectrophotometer for detecting an optical absorbance of a targeted compound for use in oxidative potential analyses by consumption rate of ascorbic acid ($OP^{AA}$) and consumption rate of dithiothreitol ($OP^{DTT}$); a spectrofluorometer to measure a fluorescence of an indicator compound for use in oxidative potential analysis by consumption rate of glutathione ($OP^{GSH}$) and generation rate of hydroxyl radicals ($OP^{OH}$) analysis; an analyzer that determines five endpoints in two separate stages based on the absorbance of the targeted compounds measured by the spectrophotometer and fluorescence of the indicator compounds measured by the spectrofluorometer. The endpoints may comprise any one or more of, including all of: consumption rate of ascorbic acid (AA) in surrogate lung fluid (SLF) ($OP^{AA-SLF}$); consumption rate of glutathione (GSH) in SLF ($OP^{GSH-SLF}$); generation rate of hydroxyl radicals (·OH) in SLF ($OP^{OH-SLF}$); consumption rate of dithiothreitol ($OP^{DTT}$); and generation rate of hydroxyl radicals in DTT ($OP^{OH-DTT}$).

$OP^{AA-SLF}$, $OP^{GSH-SLF}$, and $OP^{OH-SLF}$ can be determined from a first stage SLF protocol; and $OP^{DTT}$ and $OP^{OH-DTT}$ are determined from a second stage DTT protocol.

The instrument may further comprise a controller for automatically controlling fluidics with a control scheme, wherein a plurality of the endpoints are substantially simultaneously determined so that the analyzer provides an automated output of the five endpoints in an output time that is less than 3 hours.

The particles may comprise atmospheric particulate matter having a diameter less than or equal to 2.5 µm extracted in a liquid solution.

The invention is compatible with any of a range of materials in the reservoirs. For example, the material in the plurality of reservoirs preferably comprises one or more of: K-PB of pH=7.4; SLF; TPT; DI; OPA; DTT; or DTNB. For example, each reservoir may have one of the above materials, with the programmable pumps providing the desired fluidic control at desired times.

The instrument may comprise three programmable pumps, including exactly three pumps. In an embodiment of a plurality of pumps, a first pump is positioned in fluidic communication with DTNB, K-PB, SLF, DTT, reaction vials 1, 2 and 3, and measurement vials 1 and 2; a second pump is positioned in fluidic communication with reaction vials 1, 2 and 3, measurement vial 1, a spectrophotometer capillary cell, and the multi-position valve; and a third pump is positioned in fluidic communication with the OPA, TPT, spectrophotometer capillary cell, reaction vials 1, 2 and 3, and measurement vial 1.

The five endpoints are preferably automatically and periodically determined over a time course of between 30 minutes and 90 minutes with an interval of between 4 minutes and 30 minutes. This is achieved by programming of the programmable pumps and controller/valve actuator to ensure the appropriate samples and reagents are dispensed, incubated, processed and measured, with appropriate rinsing and cleaning steps, depending on the specific application.

Also provided herein are OP measurement methods using any of the instruments described herein. For example, provided is an automated method for analyzing oxidative potential of particles from an air sample, the method comprising the steps of: fluidically connecting a liquid sample vial containing particles extracted from the air sample to the sample injector system of any of the instruments described herein. $OP^{AA-SLF}$, $OP^{GSH-SLF}$, and $OP^{OH-SLF}$ SLF-based endpoints are determined by: introducing with the sample injector a first sample volume from the liquid sample vial to a first reaction vial and a second sample volume to a second reaction vial, wherein the reaction vials each contain a buffer and SLF, and the second reaction vial further contains TPT to immediately capture hydroxyl radicals generated in a reaction in the reaction vial; incubating the first and second RVs for an SLF incubation time period; transferring a first aliquot from the first RV to a first MV and a second aliquot from the first RV to a second MV, wherein the transferring is by the sample injector; diluting the first MV with DI for measuring AA; adding OPA into the second MV for probing GSH, wherein GSH reacts with OPA to form the indicator compound, and the indicator compound is delivered to the spectrofluorometer for indicator compound detection; flowing the diluted sample from the first MV to a capillary cell of the spectrophotometer to measure absorbance of the targeted compound to determine a concentration of residual AA; further diluting the sample in the second MV and injecting the diluted sample into a flow cell of the spectrofluorometer to measure fluorescence intensity to determine a concentration of GSH; cleaning the RVs, MVs, flow cell and capillary cell with DI by the sample injector after each measuring step; and repeating the steps over a time course to determine consumption rates of AA and GSH; and quantifying AA and GSH from calibration curves of initial absorbance and fluorescence intensity of different known concentrations of AA and GSH in SLF to thereby determine $OP^{AA-SLF}$ and $OP^{GSH-SLF}$. Measurement of ·OH is conducted at substantially the same time as GSH and AA measurement. The method further comprises the steps of: reacting TPT with the ·OH in the second RV to form a fluorescent product 2-OHTA; periodically collecting at various time intervals an aliquot from the second RV containing 2-OHTA; diluting the collected aliquot with DI; and providing the diluted aliquot to a flow cell of the spectroflourometer to determine a concentration of the 2-OHTA to thereby determine $OP^{OH-SLF}$. The flow cell and RV are cleaned after each determining step.

After completing all determinations of AA and GSH in the first reaction vial and ·OH in the second reaction vial, a final cleaning step is conducted by rinsing with DI all the reaction vials, measurement vials, fluidic components and flow cells.

For the DTT aspect, the method may further comprise after the final cleaning step, determining the $OP^{DTT}$ and $OP^{OH-DTT}$ DTT-based endpoints, wherein the $OP^{DTT}$ determination comprises the steps of: introducing with the sample injector a first sample volume to the first reaction vial, wherein the first RV contains DTT, and a K-PB-buffered TP; incubating the first RV for a DTT incubation time period; periodically transferring an aliquot from the first RV with the sample injector to the first measurement vial containing DTNB; forming 2-nitro-5-thiobenzoic acid (TNB) from the DTNB and residual DTT in the first MV; diluting the TNB; flowing the diluted TNB from the first MV to a capillary cell of the spectrophotometer to measure an absorbance of the TNB to determine a concentration of TNB and thereby $OP^{DTT}$; and simultaneously to the $OP^{DTT}$ determination steps, determining $OP^{OH-DTT}$ by: periodically transferring an aliquot from the first RV with the sample injector to the second measurement vial at various time intervals; diluting the aliquot in the second MV with DI; delivering the diluted aliquot to a flow cell of the spectrofluorometer to determine a concentration of the 2-OHTA to thereby determine $OP^{OH-DTT}$.

After completing all determinations of DTT and ·OH, the method may further comprise a rinsing with DI all the reaction vials, measurement vials, fluidic components and flow cells.

The sample in the liquid sample vial may contain particles from the air sample and is prepared by the steps of: collecting ambient $PM_{2.5}$ samples on a filter; extracting the collected $PM_{2.5}$ from the filter; and suspending the extracted $PM_{2.5}$ in liquid.

The methods are particularly advantageous in that the simultaneous measurement of endpoints results in an elapsed measurement time to obtain all five endpoints that is less than or equal to three hours for a given ambient $PM_{2.5}$ aqueous extract.

The method may further comprise the step of automatically controlling the multi-position valve and programmable pumps to provide desired flow-rates, fluid volumes, fluid composition, to and between vials and the measurement system. The automated controlling step is by implementing a control scheme with a controller operably connected to the programmable pumps and the valve actuator. The controller may be a computing device or embedded in a computing device.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

(FIG. 2A) $OP^{AA-SLF}$ vs. Cu(II)) concentrations; (FIG. 2B) $OP^{GSH-SLF}$ vs. Cu(II) concentrations; (FIG. 2C) $OP^{OH-SLF}$ vs. Fe(II) concentrations; (FIG. 2D) $OP^{DTT}$ vs. PQ concentrations; (FIG. 2E) $OP^{OH-DTT}$ vs. 5-H-1,4-NQ concentrations. The error bars represent the standard deviation of triplicate OP analysis.

(FIG. 3A) $OP^{AA-SLF}$ of Cu(II); (FIG. 3B) $OP^{GSH-SLF}$ of Cu(II); (FIG. 3C) $OP^{OH-SLF}$ of Fe(II); (FIG. 3D) $OP^{DTT}$ of PQ; (FIG. 3E) $OP^{OH-DTT}$ of 5-H-1,4-NQ. The error bars on X and Y axes denote the standard deviation of triplicate OP analysis by both manual operation and automated system, respectively. The identity line is plotted as the dotted line.

(FIG. 4A) $OP^{AA-SLF}$; (FIG. 4B) $OP^{GSH-SLF}$; (FIG. 4C) $OP^{OH-SLF}$; (FIG. 4D) $OP^{DTT}$; (FIG. 4E) $OP^{OH-DTT}$. The identity line is plotted as the dotted line.

(FIG. 5A) $OP^{AA-SLF}$; (FIG. 5B) $OP^{GSH-SLF}$; (FIG. 5C) $OP^{OH-SLF}$; (FIG. 5D) $OP^{DTT}$; (FIG. 5E) $OP^{OH-DTT}$. Mass-normalized (OPm—left side) and volume-normalized (OPv—right side) of all samples are denoted by hollow and solid circles, respectively.

(FIG. 6B) the calibration curve of the fluorescence intensity under two wavelength settings (i.e. 310/427 nm and 340/420 nm) versus GSH concentration.

(FIG. 8A) the fluorescence intensity vs. time plot at excitation/emission wavelength of 310/427 nm for a sample; (FIG. 8B) the calibration curve of GSH; (FIG. 8C) GSH consumption rate derived from (FIG. 8A) and (FIG. 8B).

DETAILED DESCRIPTION OF THE INVENTION

Figure 1A:
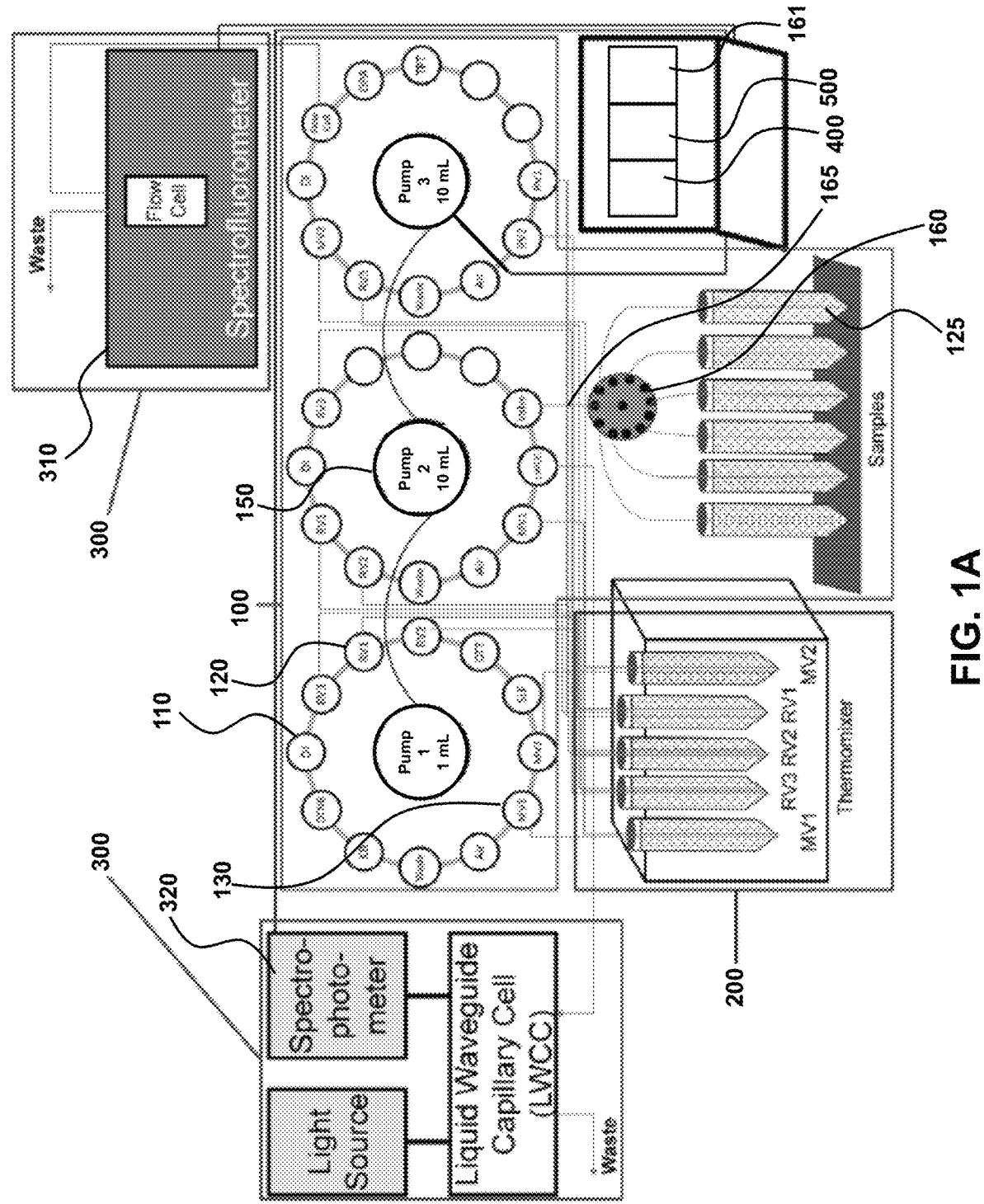
FIGS. 1A-1B. A system setup (FIG. 1A) and algorithm (FIG. 1B) of Semi-Automated Multi-Endpoint ROS Activity Analyzer (SAMERA). The measurement of absorbance and fluorescent intensity is conducted throughout the whole protocol. The absorbance is measured at 265 nm, 412 nm and 600 nm. The fluorescent intensity is measured at excitation/emission wavelength of 310 nm/427 nm.

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

"Programmable pump" refers to a pump that is user programmable, such as through the use of microprocessor controller that actuates the pump as desired in an automated fashion and in accordance with a desired algorithm or methodology.

"Operably connected" or "operatively coupled" refers to a configuration of elements, wherein an action or reaction of one element affects another element, but in a manner that preserves each element's functionality. For example, any of the controllers provided herein may be described as being operatively coupled to another component whose signal is used to control at least a portion of the system, such as pump power, valve actuation, flow direction, sample collection, or a signal sent to, or received by, an operator or an electronic device used by an operator.

"Fluidically connected" refers to components that are connected by fluid flow, but in a manner that does not affect either component's functionality. The connection may be direct, where a flow from an output of one component is provided as an input to another component. The connection may be indirect, where an intervening component is positioned between the components, including with components relevant for fluid control such as pumps, valves and the like.

"Automated" refers to the handling of all fluid components in a process is algorithm (e.g., computer) implemented, such as a software-implemented process so that hands-on intervention during the incubation, reaction and measurement steps is avoided. In recognition that some hands-on activity may be required, such as for sample introduction, reagent replenishment, and data analysis, the automated instruments and methods may be referred to as "semi-automated."

The instruments provided herein have an elegant combination of optical instruments (spectrophotometer and spectrofluorometer), sampling handlers (e.g., thermal mixers) with fluidic controls via programmable pumps and multi-position valves, wherein the flow-cells of the optical instruments provides a liquid flow-through application to measure desired OP end-points. In this manner, end-point determination is efficiently automated, including by timing a reaction in a reaction vial, removing liquid at different time points and pushing it to optical instruments to obtain kinetic profiles. As desired, the concentration of the sample is adjusted to achieve a desired range, such as about The invention can be further understood by the following non-limiting examples.

FIG. 1A is a schematic illustration of an instrument for analyzing oxidative potential of particles from an air sample. Generally, the instrument comprises a sample injector 100, sample incubator 200, and measurement system 300.

Sample injector 100 comprises a plurality of reservoirs 110, including a reaction vial (RV) 120 and a measurement vial (MV) 130. Each reservoir is configured to hold at least one material selected from the group consisting of: a reaction chemical, an incubation chemical, a cleaning liquid, air, and waste fluid. A plurality of programmable pumps 150 are configured to control flow of a material from each reservoir to another reservoir, or to or from another instrument component, such as to the measurement system. A multi-position valve 160 and fluid conduits 165 to fluidically connect a sample vial 125 to the plurality of reservoirs. The programmable pump(s) are configured to drive a flow of fluid sample from the sample vial to a reaction vial. A valve actuator 161 controls the multi-position valve to select different samples for analysis and fluidically control fluid flow within, into and out of the sample injector. The valve actuator may be electronically controlled, including through a user interface via a computer or electronic controller.

The sample incubator 200 comprises a thermal mixer 310 fluidically connected to the sample injector for incubating and mixing a reaction mixture, wherein the reaction mixture comprises particles from the air sample in the fluid sample and material from the plurality of reservoirs, and the reaction mixture is contained in the RV.

The measurement system 300 is fluidically connected to the sample incubator 200 and/or sample injector 100 and may comprise a spectrophotometer 310 and a spectrofluorometer 320. Spectrophotemeter is configured to detect an optical absorbance of a targeted compound for use in oxidative potential analyses by consumption rate of ascorbic acid ($OP^{AA}$) and consumption rate of dithiothreitol ($OP^{DTT}$). The spectrofluorometer 320 is configured to measure a fluorescence of an indicator compound for use in oxidative potential analysis by consumption rate of glutathione ($OP^{GSH}$) and generation rate of hydroxyl radicals ($OP^{OH}$) analysis;

An analyzer 400 is configured to determine the five endpoints in two separate stages based on the absorbance of the targeted compounds measured by the spectrophotometer and fluorescence of the indicator compounds measured by the spectrofluorometer. The analyzer may be a part of a computer having a processor that receives electronic input from the various measurement systems to determine the relevant endpoints.

A controller 500 may be used to control fluidics, including for automated control with a control scheme implemented with a processer of a computing device.

Example 1: A Semi-Automated Multi-Endpoint Reactive Oxygen Species Activity Analyzer (SAMERA) for measuring the Oxidative Potential of Ambient $PM_{2.5}$ Aqueous Extracts Many acellular assays have been developed for assessing the oxidative potential (OP) of ambient $PM_{2.5}$, yet no consensus has been reached on the most appropriate method. Most of these methods are highly time- and labor-intensive, making it difficult to analyze a large sample-set. Here, we have developed a semi-automated multi-endpoint ROS-activity analyzer (SAMERA) for measuring five commonly-used endpoints of OP: consumption rate of dithiothreitol ($OP^{DTT}$), ascorbic acid ($OP^{AA-SLF}$) and glutathione ($OP^{GSH-SLF}$), and the generation rate of ·OH in DTT ($OP^{OH-DTT}$) and in surrogate lung fluid ($OP^{OH-SLF}$). A high analytical precision (coefficient of variation=5-8% for all endpoints using positive controls such as Cu(II), Fe(II), phenanthrenequinone (PQ) and 5-hydroxy-1,4-naphthoquinone (5-H-1,4-NQ), and 8-13% using $PM_{2.5}$ samples) was obtained for SAMERA. The results generated from SAMERA are in good agreement with those obtained from the manual operation using both positive controls (slope=0.95-1.15 for automated vs. manual, $R^2$=0.99) and ambient samples (slope=0.89-1.09, $R^2$=0.86-0.97). SAMERA takes 3 hours to analyze one sample for all these OP endpoints, which is a substantial improvement over the manual analysis protocol. SAMERA is employed to analyze a subset (N=44) of ambient $PM_{2.5}$ samples collected from the Midwest US. Elevated OP activities in the week of Independence Day (Jul. 3-5, 2018) were observed for most endpoints measured by SAMERA at all the sites. Preliminary results demonstrate the stability and capability of SAMERA for providing a comprehensive OP dataset, which can be integrated into the epidemiological models in future studies.

Numerous studies have investigated the adverse health effects of atmospheric particulate matter (PM) to humans (Cohen et al. 2017; Kampa and Castanas 2008; West et al. 2016). The generation of reactive oxygen species (ROS) by fine particles ($PM_{2.5}$, particles size less than 2.5 µm) has emerged as one of the most promising hypotheses to explain these health effects (Abrams et al. 2017; Bates et al. 2015; Delfino et al. 2013; Maikawa et al. 2016; Sarnat et al. 2016; Yang et al. 2016; Zhang et al. 2016). Many transition metals and organic species present in ambient particles can catalyze the redox reactions in cellular environment, leading to the production of ROS like superoxide radicals ($\cdot O_2^-$), hydroxyl radicals ($\cdot OH$) and hydrogen peroxide ($H_2O_2$) (Feng et al. 2016; Longhin et al. 2013; Torres-Ramos et al. 2011). These species have very high reactivity; for example, the half-lives of $\cdot OH$ and $H_2O_2$ are only $10^{-9}$ and $10^{-3}$ seconds, respectively in the cellular environment (D'Autréaux and Toledano 2007). $\cdot OH$ can quickly oxidize deoxyribonucleic acid (DNA), proteins and cytoplasmic membrane (Pham-Huy et al. 2008), while $H_2O_2$ can target the thiol (—SH) groups in functional proteins such as the enzyme glyceraldehyde-3-phosphate dehydrogenase, and degrades their enzymatic activity (Bonomini et al. 2008). Some of these ROS can be neutralized by the cellular antioxidant defense mechanism (Rahman et al. 2012). The capability of PM to generate ROS and/or consume antioxidants is referred to as the oxidative potential (OP). The OP of ambient $PM_{2.5}$ has been linked with multiple health disorders, e.g. atherosclerosis (Araujo and Nel 2009; Sun et al. 2005), asthma (Delfino et al. 2013; Li et al. 2008; Yang et al. 2016), lung cancer (Knaapen et al. 2004; Oh et al. 2011), and cardiovascular diseases (Chuang et al. 2007; Kodavanti et al. 2000; Weichenthal et al. 2016). These findings indicate that the OP of $PM_{2.5}$ might be a more relevant indicator in assessing the health outcomes of $PM_{2.5}$ compared to their mass concentrations.

To assess the OP of PM, biological assays are considered more representative as they measure the specific biomarkers like interleukin-8 (IL-8) (Becker et al. 2005; Yan et al. 2016) and hemeoxygenase-1 (HO-1) expressions (Crobeddu et al. 2017; Li et al. 2008). However, the time- and labor-intensive experimental protocols of these studies limit their application to only small sample sizes. To overcome these problems, numerous non-biological (i.e. chemical) assays have been developed as substitutes to measure the OP of PM. These chemical assays have the advantages of higher reproducibility, higher accuracy, cheaper material cost, and much lesser time and labor.

Among all chemical assays, dithiothreitol (DTT) is the most commonly used probe for measuring the OP of PM (Charrier and Anastasio 2012; Cho et al. 2005; Fang et al. 2014; Verma et al. 2015a). The depletion process of DTT resembles the oxidation of dihydronicotinamide adenine dinucleotide phosphate (NADPH) in mitochondria and the formation of ROS such as $\cdot O_2^-$ and $H_2O_2$ (Alfadda and Sallam 2012). The consumption rate of DTT ($OP^{DTT}$) is correlated with the largest pool of PM components, including elemental carbon (EC) (Antiñolo et al. 2015; Saffari et al. 2014), water soluble organic carbon (WSOC) (Verma et al. 2009; Verma et al. 2012), quinones (Charrier and Anastasio 2012), humic-like substances (HULIS) (Verma et al. 2015b), and transition metals (Charrier and Anastasio 2012; Sauvain et al. 2015). $OP^{DTT}$ has also been found to correlate with several biological endpoints, e.g. HO-1 expression (Li et al. 2003), fractional exhaled nitric oxide (Delfino et al. 2013; Zhang et al. 2016), an increased risk of asthma (Yang et al. 2016) and wheeze (Bates et al. 2015). However, $\cdot OH$ generated through Fenton reaction by Cu(II) or Fe(II) is not represented by DTT depletion rate (Held et al. 1996). In our previous study, Xiong et al. (2017) found that the consumption rate of DTT is well correlated with $H_2O_2$ generation, but not with $\cdot OH$ generation rate in DTT. Therefore, measuring both $OP^{DTT}$ and $\cdot OH$ generation in DTT assay ($OP^{OH-DTT}$) can provide a wider scope of OP induced by different PM components.

Other than the DTT assay, the consumption rates of several antioxidants present in epithelial lining fluid have also been used as the indicators of OP. The most commonly indices in this category are the depletion rate of ascorbic acid (AA; $OP^{AA}$) (Fang et al. 2016; Janssen et al. 2014; Visentin et al. 2016) and reduced glutathione (GSH; $OP^{GSH}$) (Ayres et al. 2008; Künzli et al. 2006; Mudway et al. 2005). Both $OP^{AA}$ and $OP^{GSH}$ are found to be sensitive to certain transition metals like Fe(II) and Cu(II) (Ayres et al. 2008; Godri et al. 2011; Künzli et al. 2006). A large-scale OP study in the Southeast US found that $OP^{AA}$ has a narrower sensitivity spectrum for PM components and therefore has lesser biological relevance compared to $OP^{DTT}$ (Fang et al. 2016).

A surrogate lung fluid (SLF) containing multiple antioxidants (AA, GSH, uric acid; UA, and citric acid; CA) is generally used to simulate the epithelial lung lining fluid (Charrier et al. 2014), and generation rates of ROS (e.g. $\cdot OH$ and $H_2O_2$) in SLF catalyzed by the ambient PM are also used as the indices for OP determination (Charrier and Anastasio 2015; Charrier et al. 2014; Shen et al. 2011). Previous studies have shown that Cu(II) dominated the generation of $H_2O_2$ in SLF (96%) (Charrier et al. 2014), while both Cu(II) and Fe(II) contributed to $\cdot OH$ generation (up to 92%) in SLF ($OP^{OH-SLF}$) (Charrier and Anastasio 2015). Quinone compounds contributed marginally (at most 4% and 8% for $H_2O_2$ and $\cdot OH$, respectively) to the generation of ROS in SLF.

Although various chemical assays have been developed to quantify the OP of ambient PM, no consensus has been reached in the scientific community for selecting the most appropriate method. Among several available OP endpoints, $OP^{DTT}$, $OP^{OH-DTT}$, $OP^{AA}$, $OP^{GSH}$ and $OP^{OH-SLF}$ are the ones, which have shown some promises in terms of their biological relevance (Abrams et al. 2017; Bates et al. 2015; Janssen et al. 2015; Ma et al. 2015; Maikawa et al. 2016; Wang et al. 2018; Weichenthal et al. 2016; Yang et al. 2016). These five endpoints are highly reproducible and cover the ROS-expression pathways by most of the redox active PM components. However, each of these methods takes 1-2 hours to perform, thus consuming almost one individual's day to analyze one sample. To overcome this limitation, we have developed an automated instrument (SAMERA), which measures all these OP endpoints for a given ambient PM aqueous extract in three hours or less. See, e.g., Fang et al. (2014). The instrument is able to serve for 24-hours unattended sample analysis. We test the response of SAMERA using select sensitive chemical compounds for individual endpoints. We also evaluate the performance of SAMERA for both precision and accuracy using positive controls and water-soluble ambient $PM_{2.5}$ extracts. The OP results of ambient samples on all the endpoints are compared with those reported in previously published studies. Finally, we demonstrate the application of SAMERA by analyzing a subset of large number of ambient $PM_{2.5}$ samples collected from the Midwest US.

Materials and Methods: Chemicals: AA, CA, UA, GSH, DTT, 9,10-Phenanthrenequinone (PQ), 5-hydroxy-1,4-naphthoquinone (5-H-1,4-NQ), 2-hydroxyterephthalic acid (2-OHTA), 5,5'-dithiobis-(2-nitrobenzoic acid) (DTNB), o-phthaldialdehyde (OPA), copper (II) sulfate pentahydrate ($CuSO_4 \cdot 5H_2O$), iron (II) sulfate heptahydrate ($FeSO_4 \cdot 7H_2O$), potassium phosphate monobasic ($KH_2PO_4$) and potassium phosphate dibasic ($K_2HPO_4$) are obtained from Sigma-Aldrich (St. Louis, MO). Sodium hydroxide (NaOH) is obtained from VWR International Inc. (Radnor, PA). Disodium terephthalate (TPT) is obtained from Alfa Aesar (Tewksbury, MA).

The stock solutions of 20 mM AA, 30 mM CA, 10 mM UA and 10 mM GSH are made in 10 mL de-ionized water (DI; Milli-Q; resistivity=18.2 MΩ/cm) separately, stored at 4° C. in the refrigerator, and used within one week. 50 µL of 4 M NaOH is added into UA stock solution to adjust pH and dissolve UA. SLF solution is made fresh daily by mixing equal volumes (1 mL each) of four antioxidant stock solutions and diluting the mixture by DI to 10 mL. The stock solution of 10 mM DTT is made and stored in the refrigerator for at most two months. DTT solution used in SAMERA is made daily by diluting 1 mL of DTT stock solution into 10 mL DI. 0.5 mM potassium phosphate buffer (K-PB; pH=7.4) is prepared by dissolving 26.94 g $KH_2PO_4$ and 139.70 g $K_2HPO_4$ in 2 L of DI. 50 mM TPT solution was made by dissolving 5.31 g TPT in 500 mL of 0.5 mM K-PB. 10 mM DTNB stock solution is prepared in methanol and stored in the refrigerator for no longer than two months. 0.2 mM DTNB solution used in SAMERA is made weekly by diluting 10 mL of DTNB stock solution into 500 mL of DI. 2 mM OPA solution is made by dissolving 134.1 mg of OPA in 1 mL methanol, followed by dilution with DI to 500 mL. 10 mM PQ and 5-H-1,4-NQ stock solutions are made in DMSO every day prior to the experiments. The stock solutions of 10 mM $CuSO_4$ and 10 mM $FeSO_4$ are prepared in DI every day prior to the experiments. The final solutions for the positive control chemicals [i.e. PQ, 5-H-1,4-NQ, Cu(II) and Fe(II)] are obtained by serially diluting the stock solutions in DI.

System Setup: A schematic diagram of SAMERA instrument is shown in FIG. 1A. The instrument comprises three major systems: sample injector 100, sample incubator 200, and measurement system 300. The sample injector system includes three Kloehn® programmable syringe pumps (IMI precision, Littleton, CO) and a 14-port multi-position valve (VICI® Valco Instrument Co. Inc., Houston, TX). The Kloehn® syringe pumps serve for dispensing the solutions between chemical reservoirs, various vials and the flow cells. The multi-position valve connects the sample vials to one of the syringe pumps (Pump 2) and is controlled by a valve actuator (VICI® Valco Instrument Co. Inc., Houston, TX), which consecutively selects different samples for analysis. The sample incubation system employs an Eppendorf ThermoMixer® (Eppendorf North America, Hauppauge, NY) for holding and incubating three centrifuge tubes (also called reaction vials, RV1, RV2 and RV3) at a constant temperature (37° C.), while continuously shaking at a frequency of 400 rpm. There are two components in the measurement system—a spectrophotometer and a spectrofluorometer. The spectrophotometer (Ocean Optics, Dunedin, FL) comprises an ultraviolet-visible-near-infrared (UV-Vis-NIR) light source as well as a multiwavelength light detector, and is used for detecting the absorbance of the targeted compound in $OP^{AA}$ and $OP^{DTT}$ analyses. The Fluoromax-4 spectrofluorometer (Horiba Scientific, Edison, NJ) serves to measure the fluorescence of the indicator compounds for the determination of GSH and ·OH.

Figure 1B:
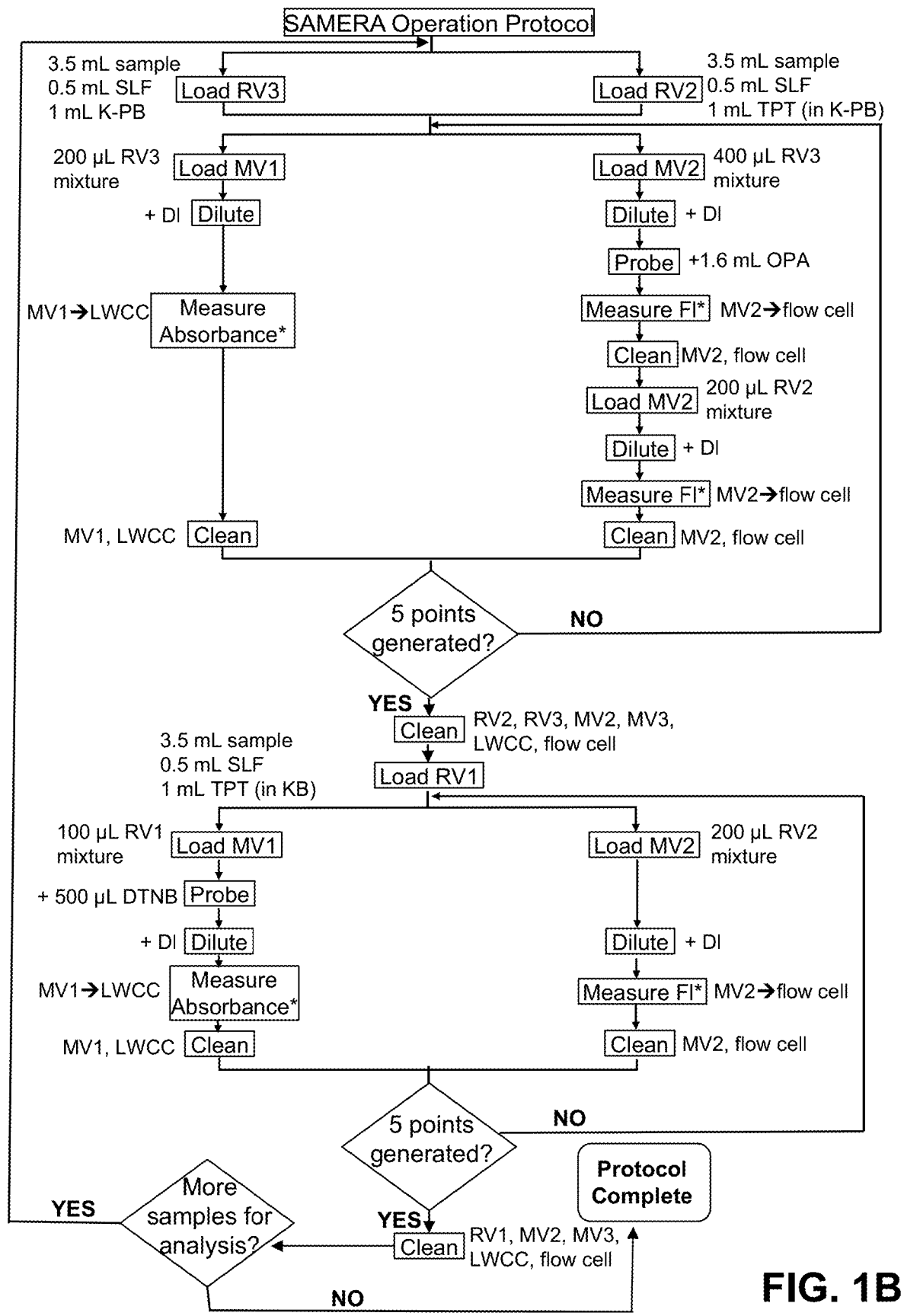
Figure 2A:
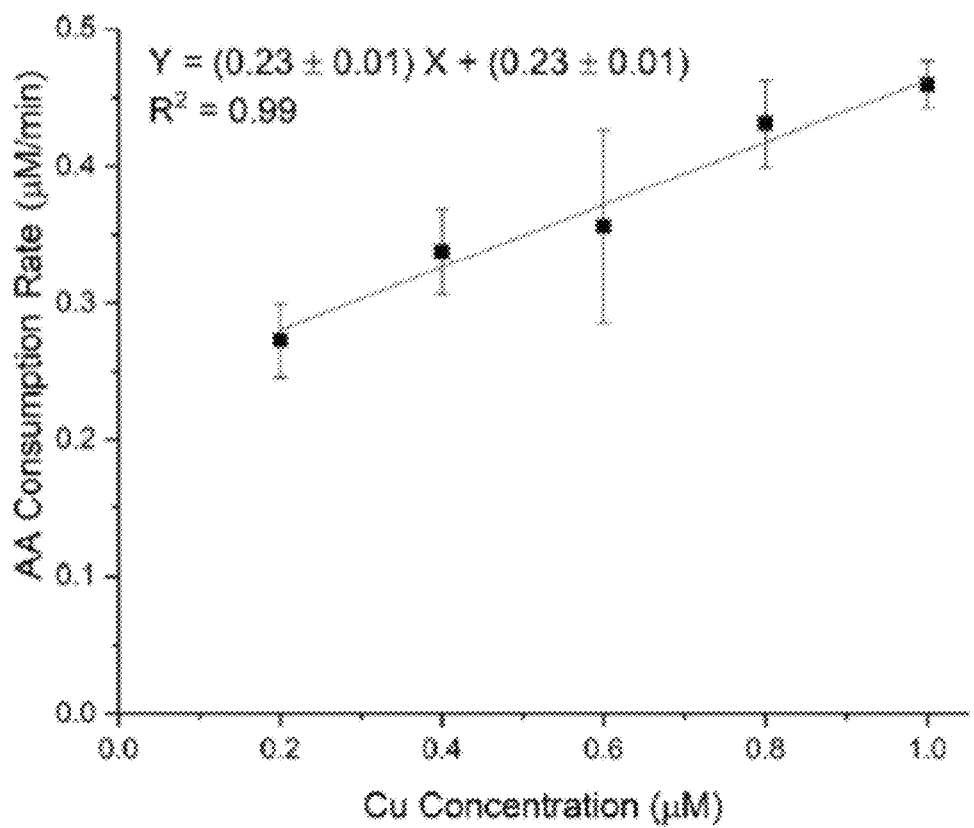
FIGS. 2A-2E. OP as a function of the concentration of positive controls.
Figure 2B:
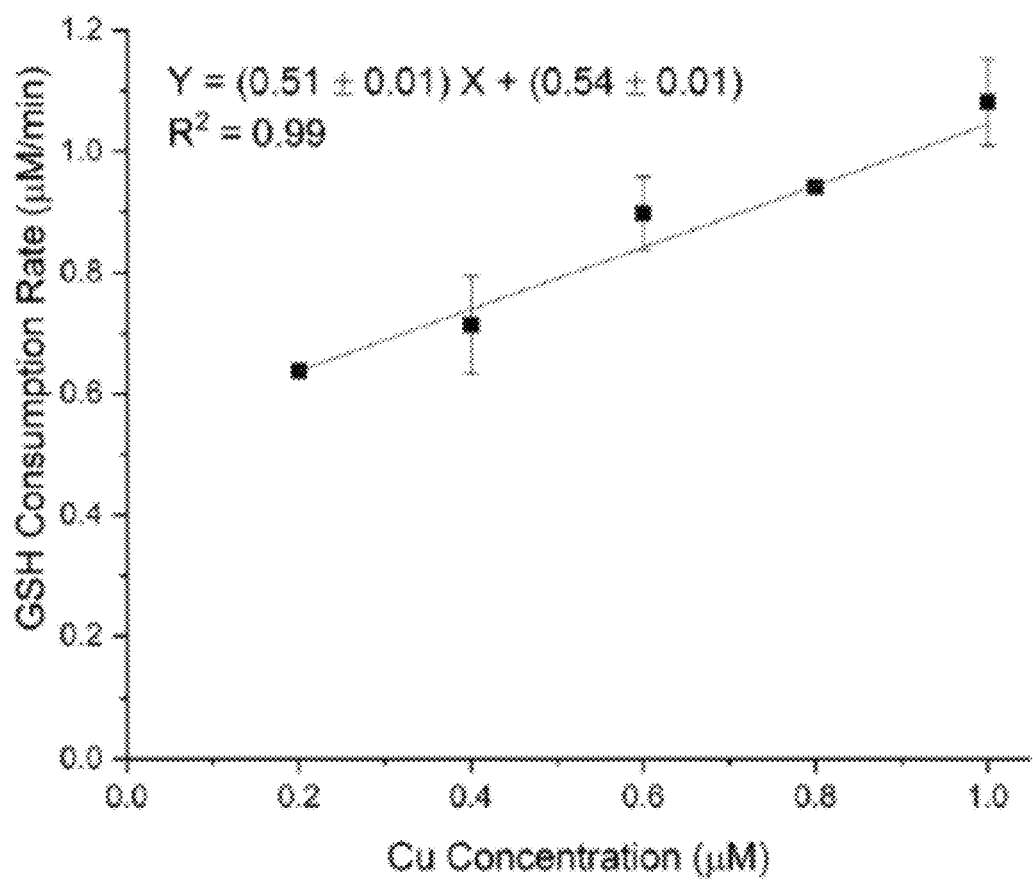
Figure 2C:
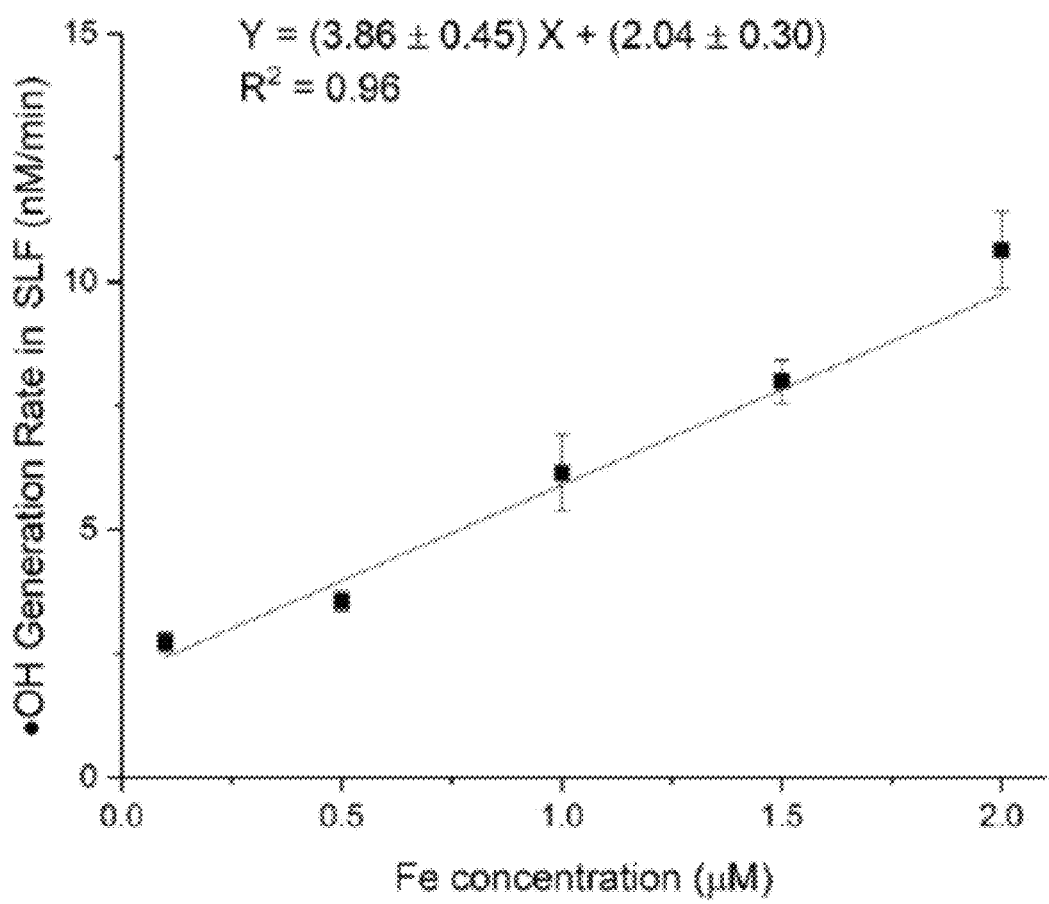
Figure 2D:
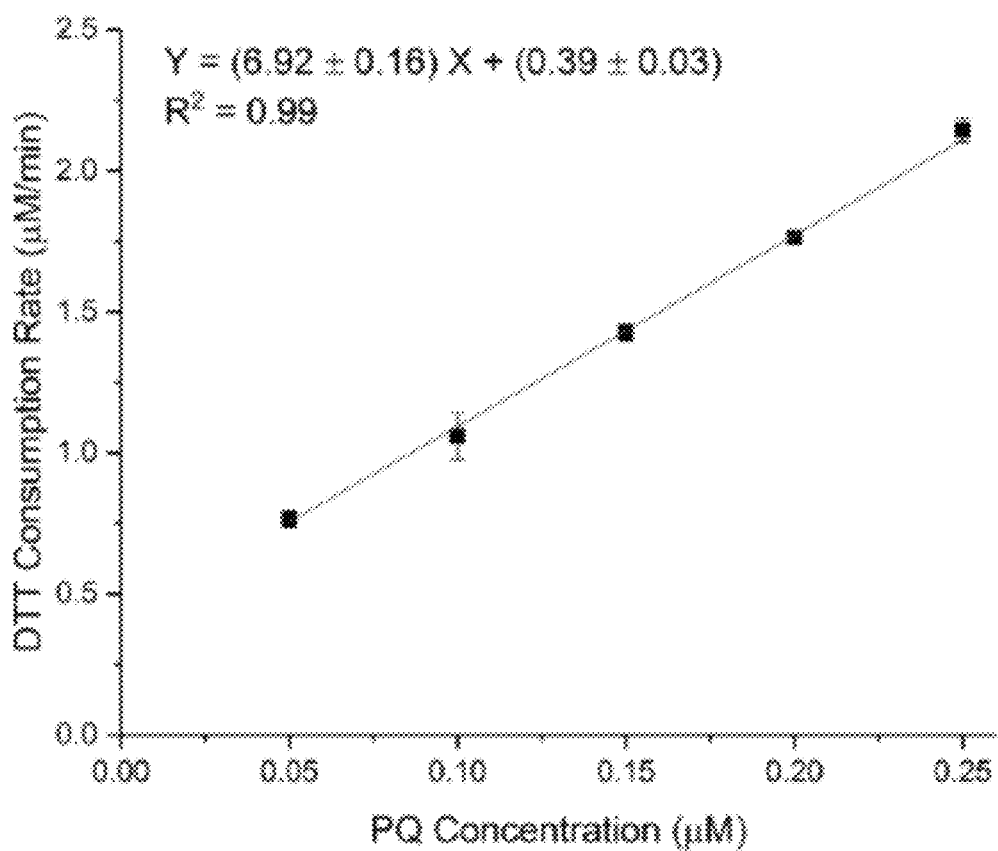
Figure 2E:
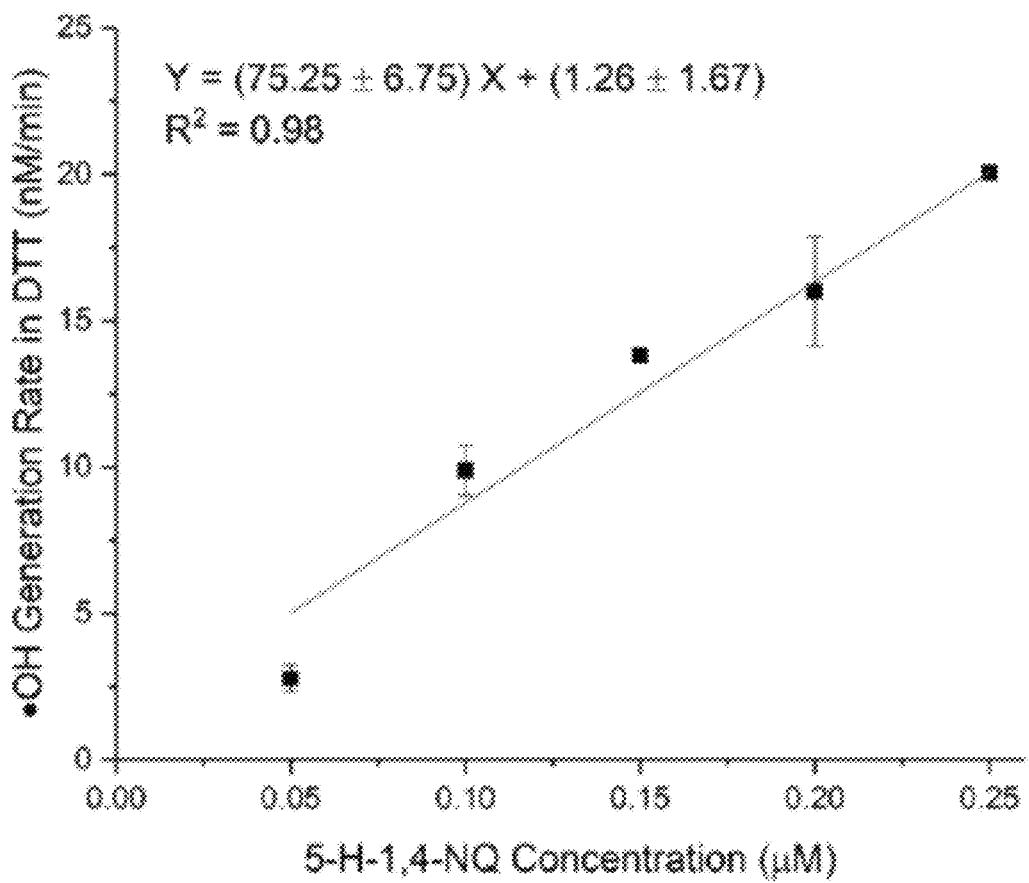
Figure 3A:
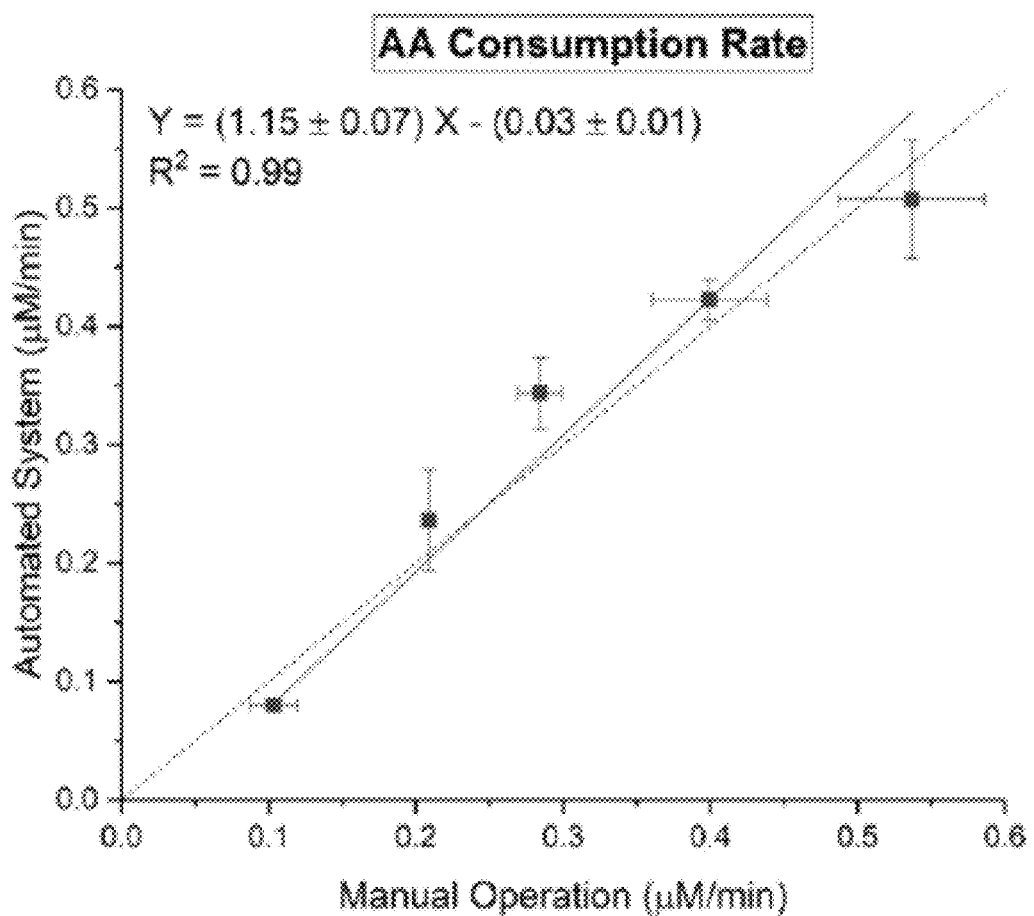
FIGS. 3A-3E. Comparison of manual operation (X axis) and automated system (Y axis) using four positive controls.
Figure 3B:
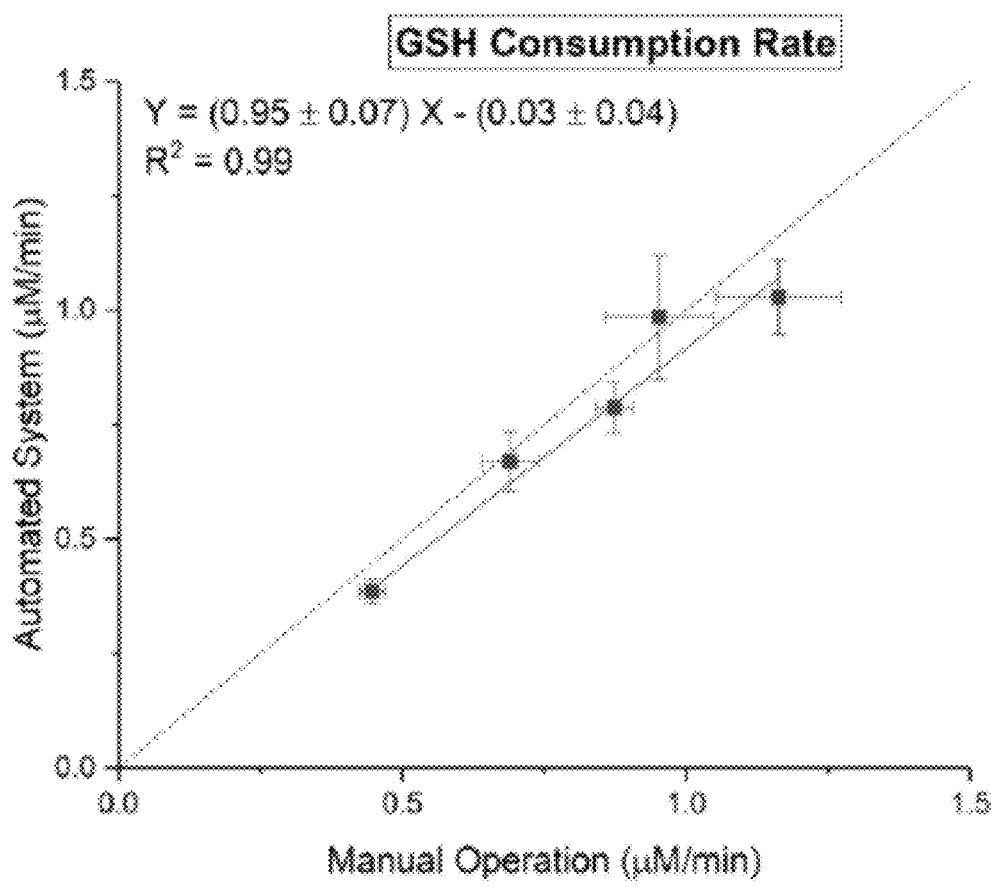
Figure 3C:
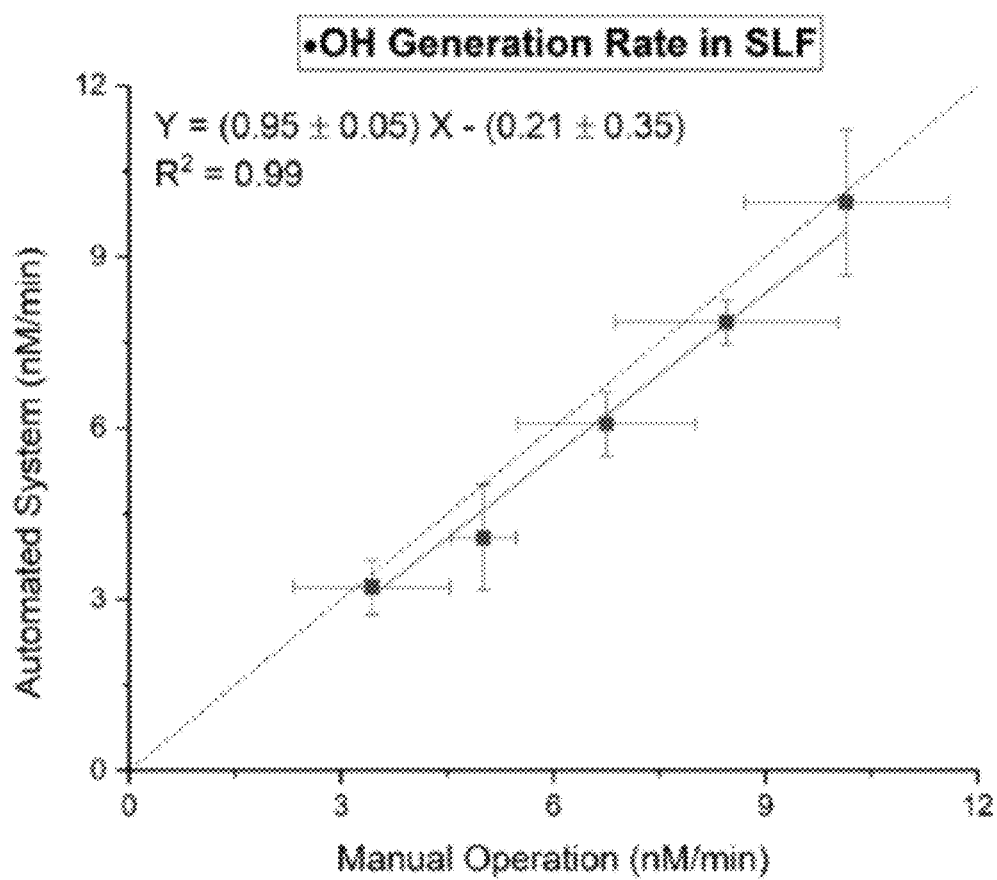
Figure 3D:
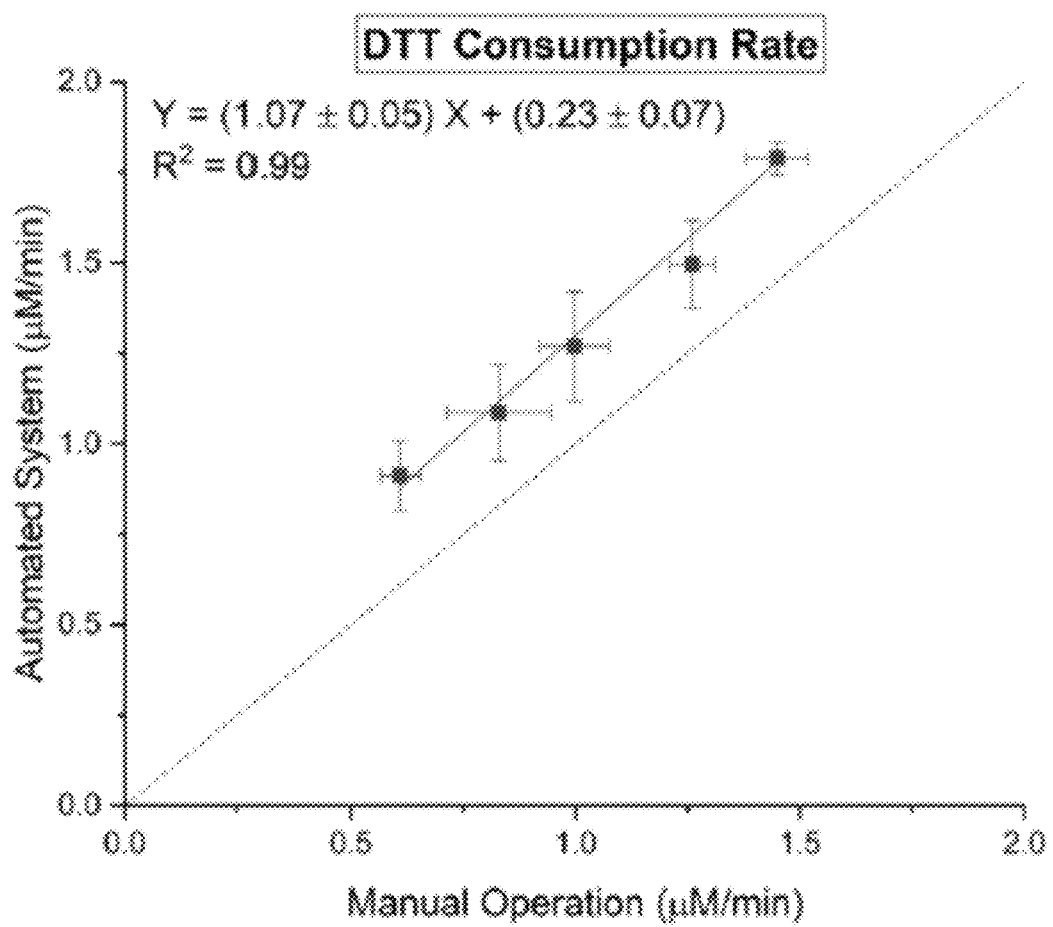
Figure 3E:
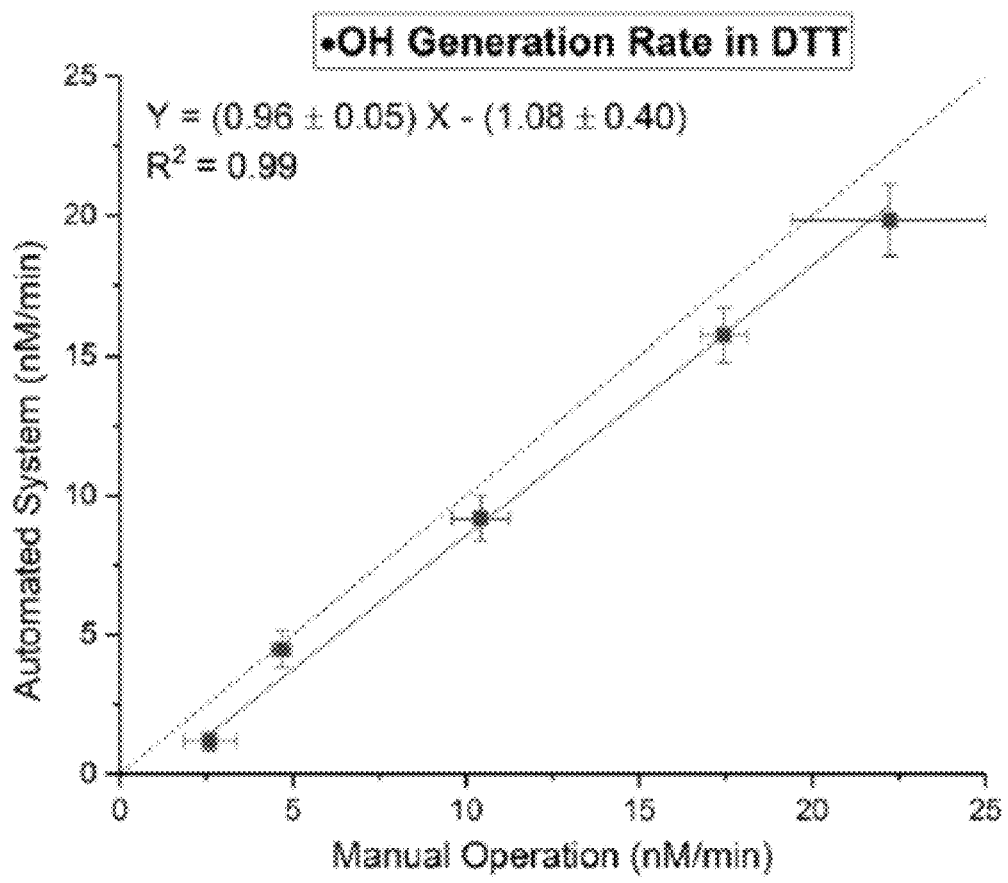
Figure 4A:
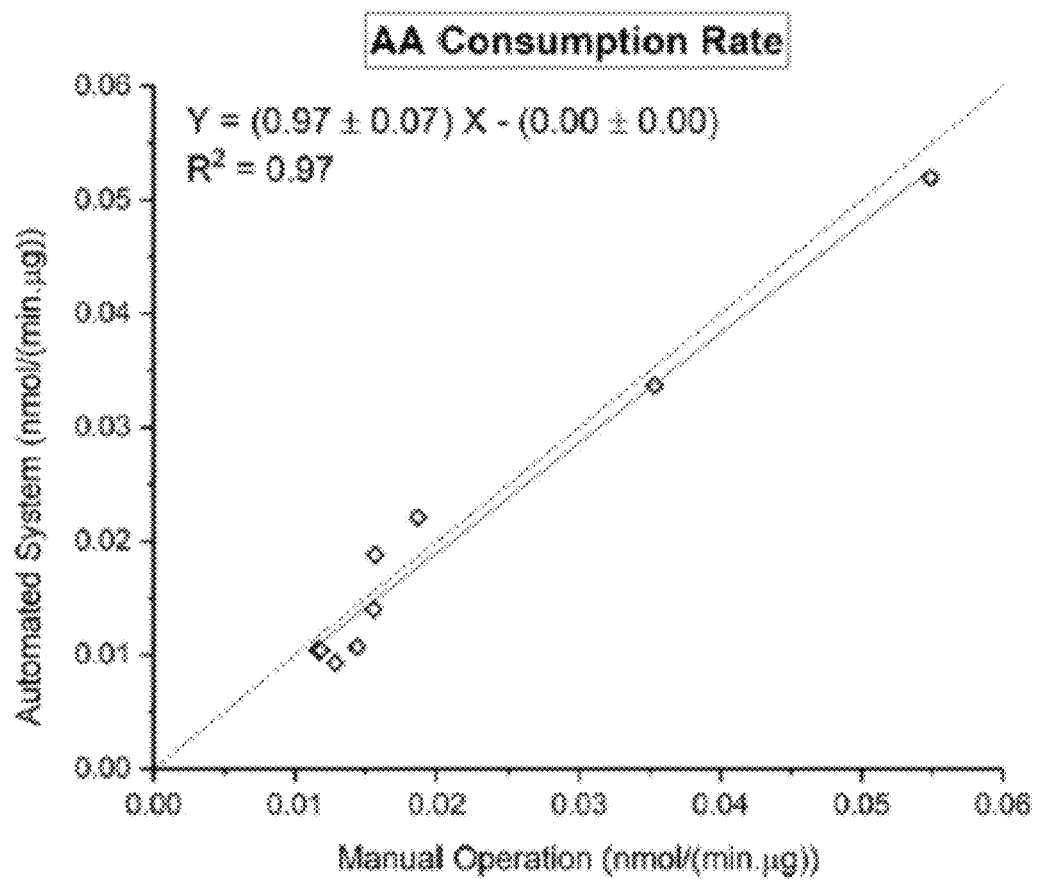
FIGS. 4A-4E. Comparison of manual operation (X axis) and automated system (Y axis) using ambient Hi-Vol filter samples (N=9)
Figure 4B:
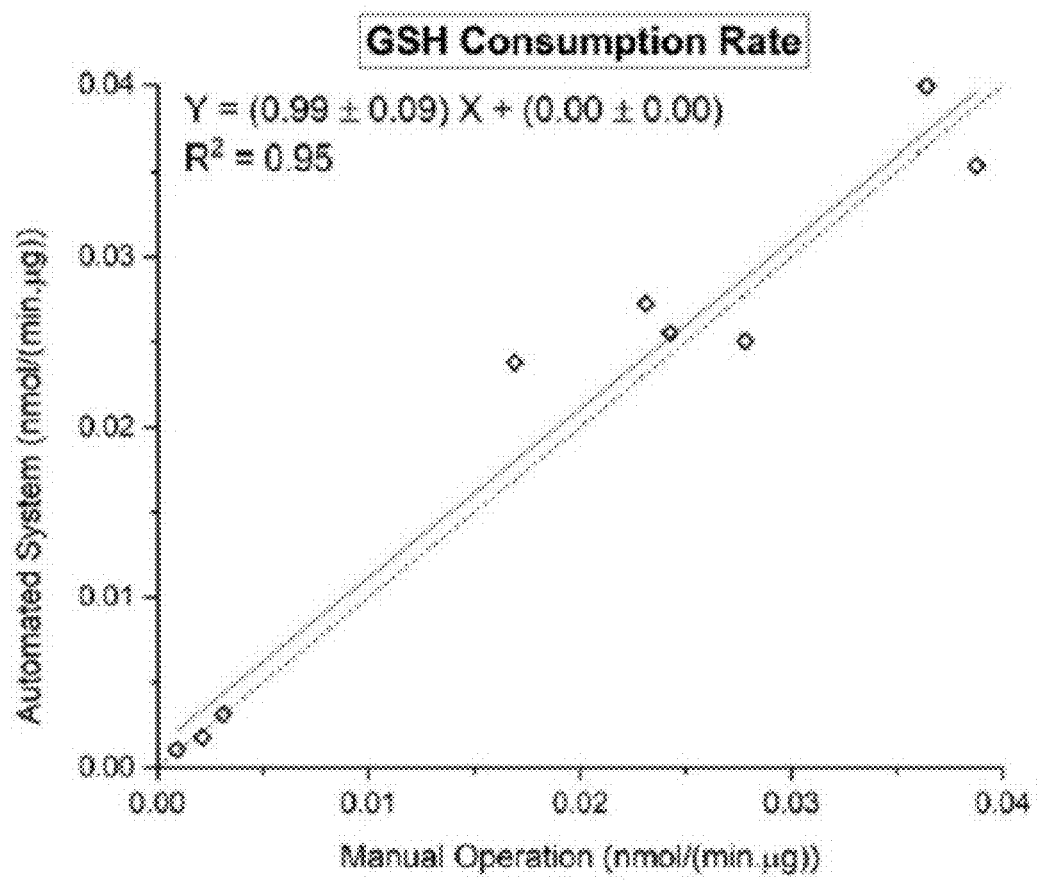
Figure 4C:
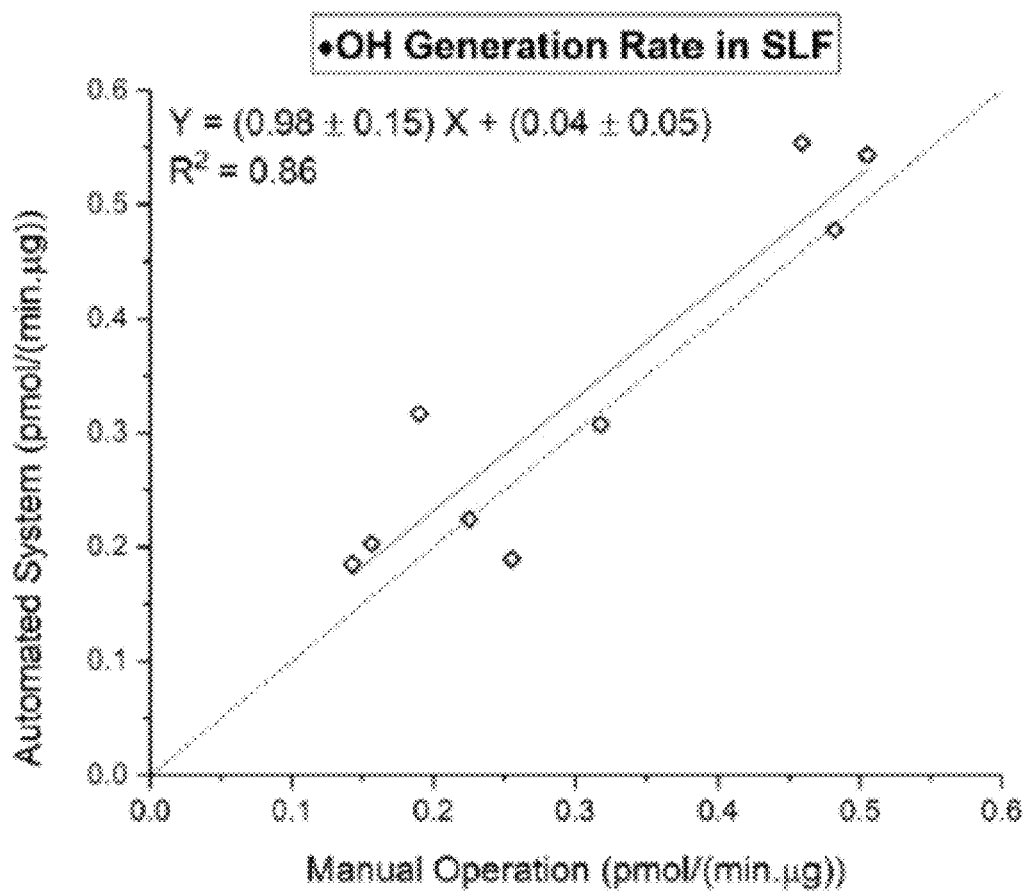
Figure 4D:
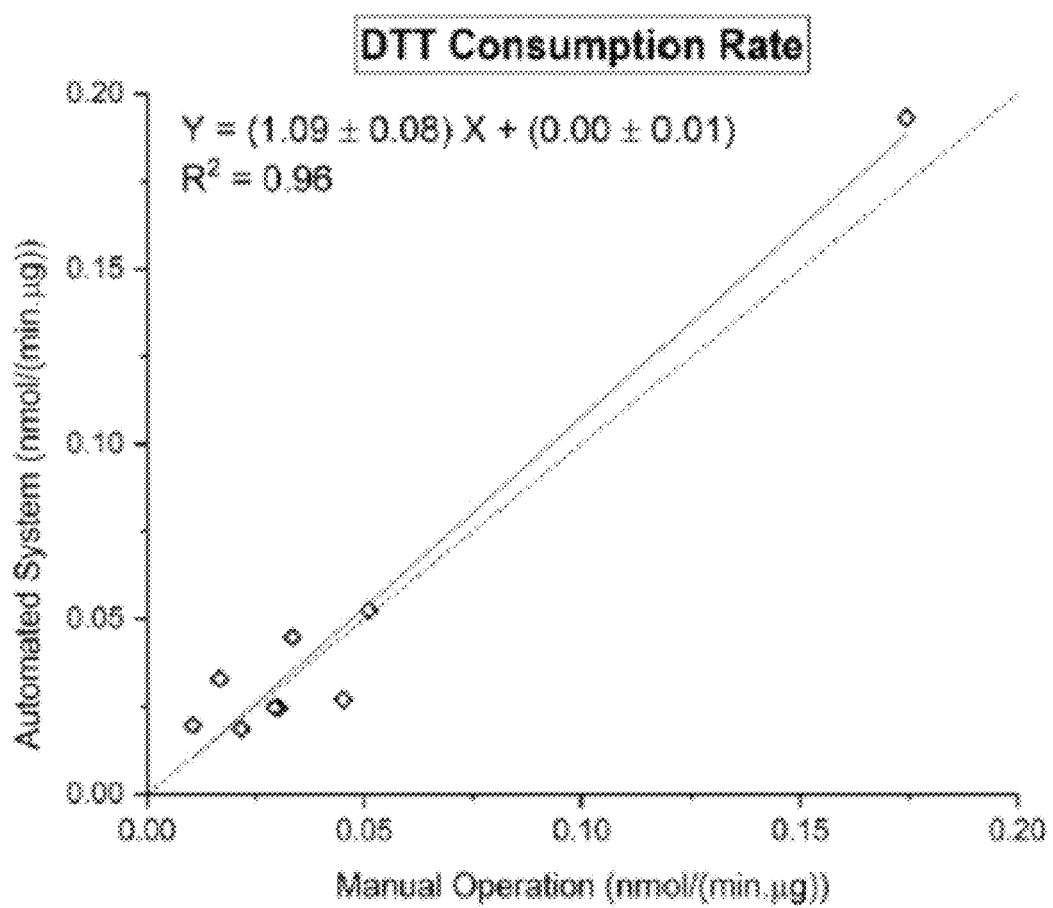
Figure 4E:
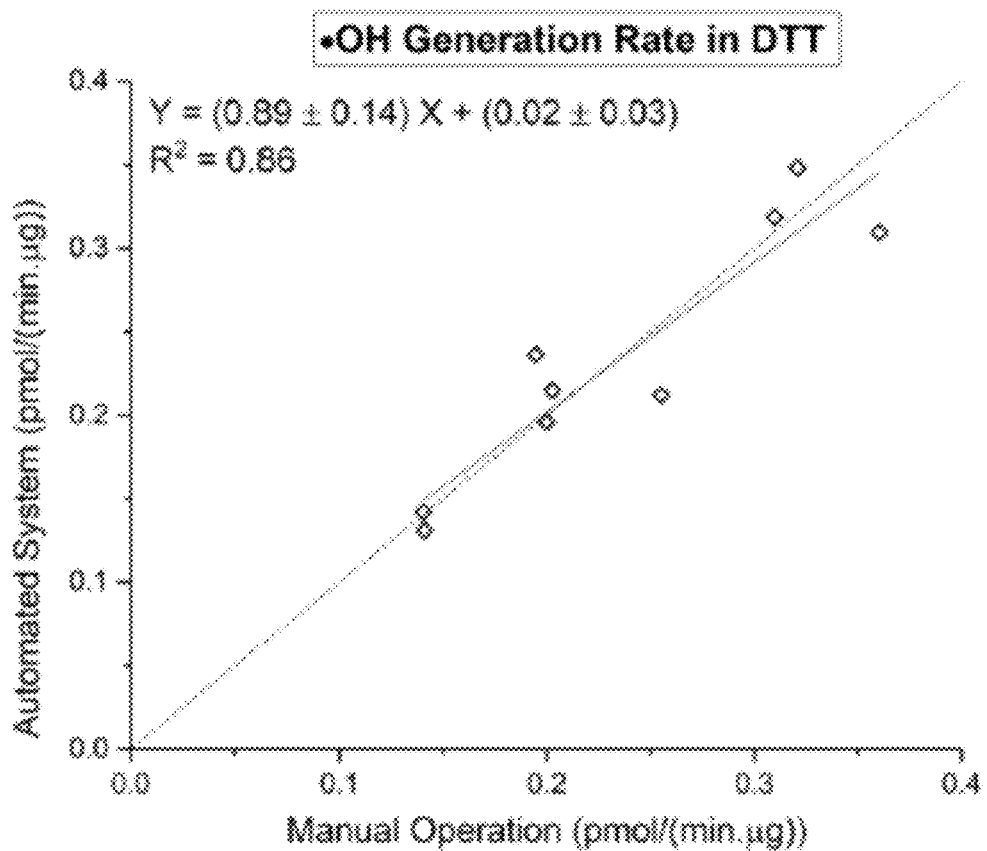

OP Analysis Protocol: The algorithm for OP analysis in SAMERA is summarized in FIG. 1B, and is implemented with processer of the analyzer 400 schematically illustrated in FIG. 1A. The five endpoints are measured in two separate stages. $OP^{AA-SLF}$, $OP^{GSH-SLF}$ and $OP^{OH-SLF}$ are measured in the first stage following an SLF-based protocol, while a DTT assay is conducted to measure $OP^{DTT}$ and $OP^{OH-DTT}$ in the second stage. Since the consumption of AA and GSH were measured in SLF in our study, we denote these OP endpoints as $OP^{AA-SLF}$ and $OP^{GSH-SLF}$, to distinguish them from the studies directly measuring AA and GSH without any SLF (simply denoted as $OP^{AA}$ and $OP^{GSH}$ here).

SLF-Based Protocol: The SLF-based protocol involves three steps. In the first (incubation) step, 3.5 mL of the sample (either PM filter extract or chemical standard), 1 mL of K-PB (pH=7.4) and 0.5 mL of SLF [final concentrations of AA, GSH, UA and CA in RV as 200 µM, 100 µM, 100 µM, and 300 µM, respectively following Charrier and Anastasio (2015) protocol] are loaded separately into RV2 and RV3 kept in the ThermoMixer through injection system (see FIG. 1a). The only difference in the content of RV2 and RV3 is that the K-PB in RV2 contains TPT (50 mM) to immediately capture the ·OH generated in the reaction. In the second (probing) step, two small aliquots (200 µL and 400 µL) are withdrawn separately from RV3 using the same injection system, and transferred to the measurement vials 1 and 2 (MV1 and MV2), respectively. This injected mixture is diluted by DI in MV1 for measuring AA, while 1.6 mL of OPA is added into MV2 for probing GSH in the injected mixture. GSH reacts with OPA, forming a fluorescent product (referred as GS-OPA hereafter), which can be detected by a spectrofluorometer (Böhmer et al. 2011). In the third (measurement) step, the diluted mixture in MV1 is withdrawn from the vial and pushed through a liquid waveguide capillary cell (LWCC-3100; World Precision Instruments, Inc., Sarasota, FL), where the absorbance at 265 nm and 600 nm (background) is measured by the spectrophotometer and is recorded by Ocean Optics SpectraSuite software. The background corrected absorbance at 265 nm ($Abs_{265\ nm}$-$Abs_{600\ nm}$) is used to determine the concentration of residual AA in RV2. Similarly, the mixture in MV2 is further diluted and injected into the flow cell of the spectrofluorometer. The fluorescence intensity is measured at the excitation/emission wavelength of 310 nm/427 nm, to determine the concentration of GS-OPA. Although the peak absorbance and emission of GS-OPA is at 340 nm and 420 nm wavelength (Roušar et al. 2012), an excitation/emission wavelength of 310/427 nm with a slit width of 5 nm is selected to allow the measurement of both GS-OPA and 2-OHTA (fluorescent product of ·OH and TPT, discussed later), without the need of changing the slit position. FIG. S1 in the supplemental information (SI) shows the contour plot of fluorescence intensity and calibration curves at different excitation/emission wavelengths for GS-OPA, indicating no significant difference for GS-OPA measurement at either of these wavelengths settings. The MVs and flow cells are cleaned with DI immediately after each measurement step. Steps 2 and 3 are repeated five times at designated time intervals (i.e. 5 min, 24 min, 43 min, 62 min and 81 min) to determine the consumption rate of AA and GSH. Calibration curves to quantify AA and GSH are prepared by measuring initial absorbance and fluorescence intensity of different known concentrations of AA and GSH in SLF, following the same protocol as described above. The consumption rate of both AA and GSH is then derived from these calibration curves.

The measurement of ·OH is conducted around the same time as GSH and AA. TPT present in RV2 reacts with ·OH and forms a fluorescent product: 2-OHTA. At designated time intervals (i.e. 10 min, 29 min, 48 min, 67 min and 86 min), a small aliquot (200 μL) of the reaction mixture in RV2 is withdrawn into MV2, and diluted by DI. The diluted mixture in MV2 is then passed through the flow cell of the spectrofluorometer. The peak absorbance of 2-OHTA is at 310 nm, while the emission intensity peaks at 427 nm. Therefore, the same wavelength settings (as used for the GS-OPA measurements) are used to determine the concentration of 2-OHTA. The concentration of 2-OHTA in the reaction mixture is derived by calibrating the spectrofluorometer with known concentrations (0-200 nM) of 2-OHTA standards. The concentrations of ·OH are then calculated after dividing 2-OHTA concentration by 0.35—the yield of 2-OHTA from the reaction between TPT and ·OH (Son et al. 2015). The flow cell and MV2 are cleaned with DI immediately after the measurement. After completing all the measurements of AA, GSH in RV3 and ·OH in RV2 at different time intervals, SAMERA performs a final cleaning of all the vials (i.e. RV2, RV3, MV1 and MV2), connection tubes and flow cells by rinsing them with DI, to prepare the system for the DTT assay.

DTT Assay: The protocol of DTT assay is adapted from our previous publication (Yu et al. 2018), and combines the ·OH generation measurement into the automated $OP^{DTT}$ analysis protocol, following the same three step process as in SLF-based protocol. In the first incubation step, 3.5 mL of sample, 0.5 mL of 1 mM DTT and 1 mL of 50 mM K-PB-buffered TPT are added into RV1. Our tests have shown that the addition of TPT in the reaction vial does not affect the consumption rate of DTT (see Section S2 and Figure S2 in SI). At specific time intervals (5 min, 17 min, 29 min, 41 min and 53 min), a small aliquot (100 μL) of the reaction mixture from RV1 is taken out and added to 500 μL of 200 μM DTNB in measurement vial 1 (MV1) (probing step). DTNB combines with residual DTT in the mixture, and forms a yellow colored complex, 2-nitro-5-thiobenzoic acid (TNB). The mixture in MV1 is then diluted and passed through LWCC, where the absorbance at 412 nm and 600 nm (background) is measured by the spectrophotometer and recorded by Ocean Optics SpectraSuite software. A DTT calibration curve is also prepared by measuring the initial absorbance of different known concentrations of DTT (0-100 μM). Simultaneously with the DTT measurement (i.e. 5 min, 17 min, 29 min, 41 min and 53 min), another aliquot (200 μL) of the mixture from RV1 is withdrawn and diluted with DI in MV2. The measurement of ·OH then follows in the same manner as ·OH concentration in SLF. All MVs and flow cells are cleaned with DI immediately after each measurement step.

After all five endpoints are measured for a given sample, SAMERA performs a final self-cleaning operation for all RVs, MVs, LWCC and flow cell by rinsing them with DI, before the next run of analysis. The next sample is selected by the multi-position valve using VCOM software. The system is thoroughly cleaned at least three times every week by replacing all the reagents and chemicals with DI and run the same code as for the sample analysis. The procedure for mass and volume normalized OP (OPm and OPv, respectively) determination from the raw absorbance and fluorescence intensity data is described below and in FIGS. 8A-8C.

Ambient samples collection and preparation: Sampling: Ambient $PM_{2.5}$ samples are collected on prebaked quartz filters (Pall Tissuquartz™, 8"×10") using high-volume samplers (flow rate=1.13 m³/min; $PM_{2.5}$ inlets, Tisch Environmental; Cleves, Ohio) installed at five sites in the Midwest US. The map of all sites is shown in FIG. 10. Champaign (CMP) site is located on a parking garage (~30 m from ground level) in the campus of University of Illinois at Urbana-Champaign (UIUC) and is adjacent to a major road (University Ave.) in Urbana, IL. Bondville (BON) site is located in a rural area, 15 km west of downtown Champaign. Chicago (CHI) site is located on the rooftop (~40 m from the ground level) of a student dormitory building (Carman hall) in Illinois Institute of Technology (IIT) campus, which is 0.5 km east of a 6-lane interstate highway 1-90/94 and 1.5 km west of Lake Michigan. Indianapolis (IND) site is located in the campus of Indiana University—Purdue University Indianapolis (IUPUI) and is close to downtown Indianapolis (2 km southeast of the site) and a 4-lane interstate highway I-65 (1 km northeast of the site). St. Louis (STL) site is located in the north-central area of St. Louis (3247 Blair St.), and is part of the National Core Pollutants (NCore) Network of USEPA. The site is surrounded by multiple industries for steel and vehicle part fabrication.

All $PM_{2.5}$ samples analyzed in the current study were collected for a sampling duration of 72 hours in the months of May, June and July. The samples used for assessing the precision and accuracy of SAMERA were collected separately at CMP site (N=10). Sufficient field blank filters (N=10) were also collected during the sampling. All filter samples were weighed before and after $PM_{2.5}$ collection using a lab-scale digital balance (±0.2 mg readability; Sartorius A120S, Götingen, Germany) for determining PM mass loadings on the filters. The filters were equilibrated for at least 24 hours in a control room with constant temperature (20° C.) and relative humidity (RH=50%) before weighing. The filters were wrapped in prebaked (at 550° C.) aluminum foils and stored in a freezer at −20° C. immediately after weighing.

PM Extraction from the Filters: Before analysis, a few (usually 2-5) punches (1" diameter each) were taken from the $PM_{2.5}$ filters by a metallic punch, and extracted in 20 mL DI using an ultrasonic water bath (Cole-Palmer, Vernon-Hills, IL). These extracts were filtered through a 0.45 μm polytetrafluoroethylene (PTFE) syringe filter to remove the insoluble components. The filtered extracts were then analyzed by SAMERA for all five OP endpoints (i.e. $OP^{AA-SLF}$, $OP^{GSH-SLF}$, $OP^{OH-SLF}$, $OP^{DTT}$ and $OP^{OH-DTT}$).

Performance evaluation of SAMERA: The performance of SAMERA was evaluated by measuring the limit of detection (LOD), instrument response, precision and accuracy for five OP endpoints using blanks, positive controls and ambient samples. The LOD was obtained by analyzing multiple blanks (both DI and field blank filters). Four redox-active chemicals (Cu(II), Fe(II), PQ and 5-H-1,4-NQ) were selected as the positive controls to test the instrument response for five endpoints. Precision was assessed by analyzing the same sample multiple times, while accuracy was determined by comparing the results obtained from SAMERA with that from the manual analysis of a given set of samples (discussed in next section). All OP assays on the positive controls for assessing instrument response, precision and accuracy were conducted in triplicates.

Limit of Detection (LOD): The LOD of SAMERA is defined as three times of the standard deviation of OP activities for blanks. Both DI and field blank filters were used as the blanks for assessing LOD. Table 1 lists the average blank level and LOD for five OP endpoints. The LOD determined from DI is useful to determine the minimum concentration of chemical standards, which are prepared in DI, while that from field blanks is important for the ambient PM samples. However, the expression of LOD in terms of the PM mass is complicated as it depends on many factors, such as extraction protocol (e.g. volume of water used for PM extraction and the filter area which can be submerged in that volume), and the concentration of redox-active substances in the PM. In previous studies, at least 50 μg/mL of PM in the reaction mixture was generally used for $OP^{AA}$ and $OP^{GSH}$ measurements (Ayres et al. 2008; Künzli et al. 2006; Mudway et al. 2005), while $OP^{DTT}$ was found to be sensitive enough even at 10 μg/mL of PM (Charrier et al. 2016; Fang et al. 2014). Based on the analysis of ten ambient samples at different concentrations in this study, we found that the endpoints $OP^{DTT}$ and $OP^{OH-SLF}$ are sufficiently above detection at 10 μg/mL, while other endpoints require higher concentrations—30 μg/mL for $OP^{OH-DTT}$ and 50 μg/mL for $OP^{AA-SLF}$ and $OP^{GSH-SLF}$. Therefore, to obtain a good performance of SAMERA for all the endpoints, we recommend using a minimum concentration of 50 μg/mL for SLF-based assays, and 30 μg/mL for DTT-based assays.

The Response of SAMERA to Positive Controls: Four chemicals—Cu(II), Fe(II), PQ and 5-H-1,4-NQ, were selected as the positive controls separately for five OP endpoints based on their reported sensitivities, i.e. Cu(II) for $OP^{AA-SLF}$ and $OP^{GSH-SLF}$ (Ayres et al. 2008; Mudway et al. 2005), Fe(II) for $OP^{OH-SLF}$ (Charrier and Anastasio 2015; Vidrio et al. 2008), PQ for $OP^{DTT}$ (Cho et al. 2005; Xiong et al. 2017), and 5-H-1,4-NQ for $OP^{OH-DTT}$ (Xiong et al. 2017; Yu et al. 2018). All the calibration curves for different OP endpoints using these positive controls yield an excellent coefficient of determination ($R^2=0.96-0.99$), as shown in FIG. 2. The slope of the calibration curve for $OP^{DTT}$ ($6.92\pm0.16$ min$^{-1}$) is close to the one obtained by Fang et al. (2014) in the automated system based on the DTT assay ($7.64\pm0.51$ min$^{-1}$), adding confidence to the measurements obtained by SAMERA.

Precision: The analytical precision of SAMERA was assessed by analyzing ten parallel samples, i.e. respective positive controls of same concentration for each OP endpoint. The average and standard deviation of the OP activities measured from these analyses are listed in Table 2. A low coefficient of variation (CoV) for all five OP endpoints (4.9%-8.1%) indicates a high reproducibility of the results obtained from SAMERA.

Overall precision of SAMERA was assessed by using ambient PM$_{2.5}$ samples for five endpoints. Ten punches— each of 1" diameters were taken from the same Hi-Vol filter collected at CMP site, and extracted separately in 10 mL DI water. After filtering through a 0.45 μm PTFE syringe filter, the extracts were analyzed by SAMERA for all five endpoints. Table 3 lists the average and standard deviation of the mass-normalized OP activities (OPm) for five endpoints. A slightly higher CoV (7.9-13.3%) compared to that by the positive controls is observed, which is reasonable due to higher uncertainties associated with extraction procedures, e.g. non-uniform mass loadings on the filter and variable PM extraction efficiencies.

Accuracy: SAMERA was validated for accuracy through comparison of its results with that from the manual operation, over a range of concentrations (same as used in FIG. 2) of positive controls. FIG. 3 shows the comparison of OP measured by manual operation (X axis) with that from SAMERA (Y axis) for all five endpoints using positive controls. The fitted lines from orthogonal regressions applied on two measurement approaches (i.e. automated vs. manual) yield slopes close to 1 ($OP^{AA-SLF}$: $1.15\pm0.07$; $OP^{GSH-SLF}$: $0.95\pm0.07$; $OP^{OH-SLF}$: $0.95\pm0.05$; $OP^{DTT}$: $1.07\pm0.05$; $OP^{OH-DTT}$: $0.96\pm0.05$), with an excellent coefficient of determination ($R^2>0.98$), indicating high accuracy of SAMERA as tested from the positive controls.

Accuracy was also tested using ambient samples. Nine ambient PM$_{2.5}$ Hi-Vol filter samples collected at CMP site were extracted and analyzed for all five endpoints using both SAMERA and the manual operation. FIG. 4 shows comparison of the mass-normalized OP activities (OPm) measured from two approaches for all five endpoints. Similar to positive controls, the slopes of the regression curves from the orthogonal fit of two measurement methods on five endpoints ($OP^{AA-SLF}$: $0.97\pm0.07$; $OP^{GSH-SLF}$: $0.99\pm0.09$; $OP^{OH-SLF}$: $0.98\pm0.15$; $OP^{DTT}$: $1.09\pm0.08$; $OP^{OH-DTT}$: $0.89\pm0.14$) were close to 1, with high $R^2$ (0.86-0.97). A 2-tailed paired t-test further demonstrates no significant differences ($p>0.05$) in the results obtained from two measurement approaches (i.e. manual and automated) using both positive controls and the ambient samples.

Field Application of SAMERA: An important objective of developing SAMERA is to employ it for generating large OP dataset. This dataset could then be integrated into epidemiological studies for testing the hypothesis of OP association with biological health endpoints. Therefore, we tested utility and stability of SAMERA by analyzing a subset of our large number of ambient PM samples (N~300) collected from five sites in the Midwest US. Note, the complete OP analysis along with a comprehensive chemical and toxicity characterization of these samples is currently underway and this will be a topic of our future manuscripts. Here, we show a snapshot of the data from only 44 samples collected during summer 2018, from the perspective of demonstrating the potential application of SAMERA in yielding an important OP dataset. All filters were extracted in DI and therefore only water-soluble fraction was analyzed.

Figure 9:
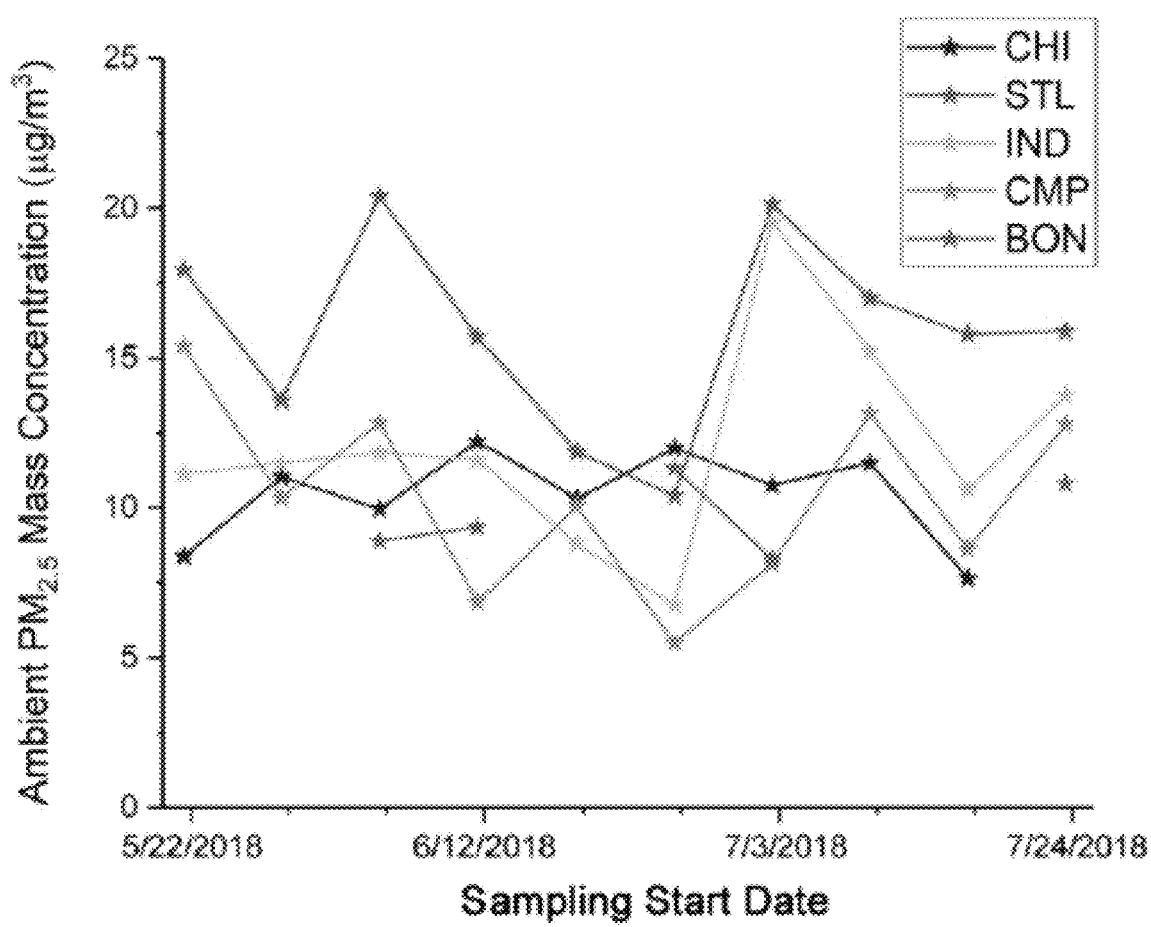
FIG. 9. The mass concentrations of ambient $PM_{2.5}$ at five sampling sites in the Midwest US.

FIGS. 5A-5E show the time series of both mass-normalized and volume-normalized OP endpoints. From the comparison of OPm, a substantial variation could be observed among the sites for several endpoints. For example, the samples from CMP had higher activities for $OP^{AA-SLF}$m, $OP^{GSH-SLF}$m and $OP^{OH-SLF}$m endpoints than other sites. Our previous studies have observed significant concentrations of Cu (5-52 ng/m$^3$) at this site (Puthussery et al. 2018; Wang et al. 2018), which is an important driver of these endpoints. Because CMP is adjacent to a major road (University Ave.), the emissions from brake wear and dust resuspension (Hulskotte et al. 2007) could contribute to Cu at this site. In contrast, CHI had higher activities for $OP^{OH-SLF}$m, $OP^{DTT}$m and $OP^{OH-DTT}$m endpoints compared to IND and STL. In volume normalized activities (FIG. 5B), a similar trend but with lesser variation than OPm among these sites can be observed for all five endpoints. FIG. 9 shows the ambient concentrations of PM$_{2.5}$ mass at all these sites, which seem to have only marginal variations, except STL (higher levels than others). A significant variation in the mass normalized activities despite similar ambient concentration profiles of $PM_{2.5}$ mass indicates that the composition of redox-active PM fraction varies substantially among these sites.

The activities for most OP endpoints ($OP^{AA-SLF}$, $OP^{GSH-SLF}$, $OP^{DTT}$ and $OP^{OH-SLF}$) were elevated in the week of July 3 at all sampling sites. This trend is more profound in OPv than in OPm, except at BON (due to lower ambient PM mass concentration there in that week; see FIG. 9). This is attributed to the fireworks emissions for the Independence Day celebration on the evening of July 4. In our previous study, Puthussery et al. (2018) also observed elevated OP levels of ambient $PM_{2.5}$ on Jul. 4, 2017 in Urbana, IL using a real-time $OP^{DTT}$ instrument. Cracking fireworks result into elevated levels of ambient Fe and Cu (Pervez et al. 2016), which are intrinsically ROS-active in most of these assays.

Table 4A-4B shows the comparison of average mass-normalized and volume-normalized OP activities measured in this study with several previous studies conducted in North America, Europe, China and India. $OP^{AA}v$ (TABLE 4A) measured in this study (0.044-0.745 nmol·min$^{-1}$·m$^{-3}$) is at very low end of the range (0.2-5.2 nmol·min$^{-1}$·m$^{-3}$) reported by Fang et al. (2016) for the ambient $PM_{2.5}$ samples collected from Southeast US. However, the range of our $OP^{AA-SLF}m$ (0.004-0.077 nmol·min$^{-1}$·μg$^{-1}$) measurements is closer to the range (0.0017-0.04 nmol·min$^{-1}$·μg$^{-1}$) reported by Szigeti et al. (2016) for the urban $PM_{2.5}$ samples collected from 20 European cities. The median of our $OP^{AA-SLF}m$ (0.012 nmol·min$^{-1}$·μg$^{-1}$) is also close to the average activity reported in two European studies (Künzli et al. 2006; Mudway et al. 2005). Since $OP^{AA}v$ in Fang et al. (2016) was measured in the absence of other antioxidants (i.e. GSH, UA and CA), the lower $OP^{AA-SLF}v$ in our study might be due to the interactions among these antioxidants. For example, GSH has the ability to reduce the oxidized AA (Birben et al. 2012), thereby slowing down the depletion rate of AA in SLF. Recently, Pietrograde et al. (2019) has also reported a significant suppressing effect by other three antioxidants (i.e. GSH, CA and UA, up to 80% decrease depending upon the relative concentrations of these antioxidants) in SLF on the consumption rate of AA.

Our $OP^{GSH-SLF}m$ (Table 4B) has a slightly wider range (0.001-0.040 nmol·min$^{-1}$·μg$^{-1}$) than the range (0-0.0275 nmol·min$^{-1}$·μg$^{-1}$) reported in the studies conducted so far. Note, the depletion rate of both AA and GSH reported in most studies (Godri et al. 2011; Künzli et al. 2006; Mudway et al. 2005; Szigeti et al. 2016) are calculated based on a 4-hour test with the lung lining fluid (200 μM AA, 200 μM GSH and 200 μM UA), which has a different composition than the SLF used in this study (200 μM AA, 100 μM GSH, 100 μM UA and 300 μM CA). Furthermore, a photometric-based DTNB enzymatic recycling assay adapted from Baker et al. (1990) was used for GSH determination in all these studies. In this assay, DTNB reacts with GSH and generates oxidized glutathione (GSSG) and TNB, while GSSG is reduced back to GSH by an additional reductant NADPH, catalyzed by glutathione reductase (GR). TNB production (i.e. absorbance at 412 nm) is measured to determine the concentration of total glutathione (GSSG and GSH) and GSSG (by first removing GSH using 2-vinylpyridine). GSH concentration is then obtained indirectly by subtracting 2 times of GSSG from total GSH (Mudway et al. 2001). This method has been adapted from the cell-based studies (e.g. measuring oxidative stress in human lung adenocarcinoma cells) where the concentration of initial GSH is unknown and therefore it is important to measure both reduced (GSH) and oxidized (GSSG) glutathione to assess the cellular oxidative state. In the chemical assays, where we add a known amount of GSH, measurement of GSSG is not required and $OP^{GSH}$ can be simply determined by measuring the oxidation rate of GSH. Nevertheless, Roušar et al. (2012) compared the GSH concentration from the conventional enzymatic recycling approach versus direct determination of GSH using OPA method, and reported an excellent agreement between two methods (slope from orthogonal fit=0.98, $R^2$=0.99, N=45 biological samples). Note, the complexity of enzymatic recycling approach does not allow measuring the kinetic properties of GSH depletion as yielded by SAMERA, which could be important to understand the reaction mechanism and the role of different chemical components in this OP endpoint.

In contrast to $OP^{AA}$ and $OP^{GSH}$, fewer studies have used $OP^{OH-SLF}$ endpoint. Similar to $OP^{GSH-SLF}$, TABLE 4C shows a wider range of $OP^{OH-SLF}$ in our analysis compared to two studies (Ma et al. 2015; Vidrio et al. 2009) using the same SLF protocol. Note, due to the lack of kinetic profile, ·OH generation rates from these two studies were calculated assuming a linear pattern of ·OH production within 24 hours, which could lead to erroneous estimates. Therefore, caution needs to be exercised in comparing these results. Moreover, the samples used in those two studies were collected from a single site [i.e. Davis, C A for Vidrio et al. (2009) and Guangzhou, China for Ma et al. (2015)], in contrast to our samples, which were collected from five different sites, probably resulting into a wider range of OP activities in our study.

Figure 5A:
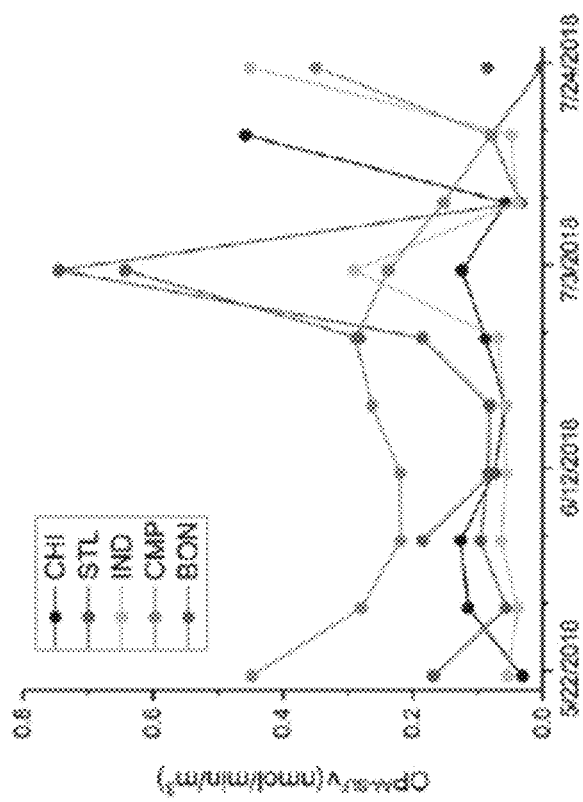
FIGS. 5A-5E. Mass and volume normalized OP of ambient $PM_{2.5}$ using the Hi-Vol samples collected from five sites in the Midwest US (N=44) for various sampling start dates (May 22, 2018, Jun. 12, 2018, Jul. 3, 2018 and Jul. 24, 2018)
Figure 5A:
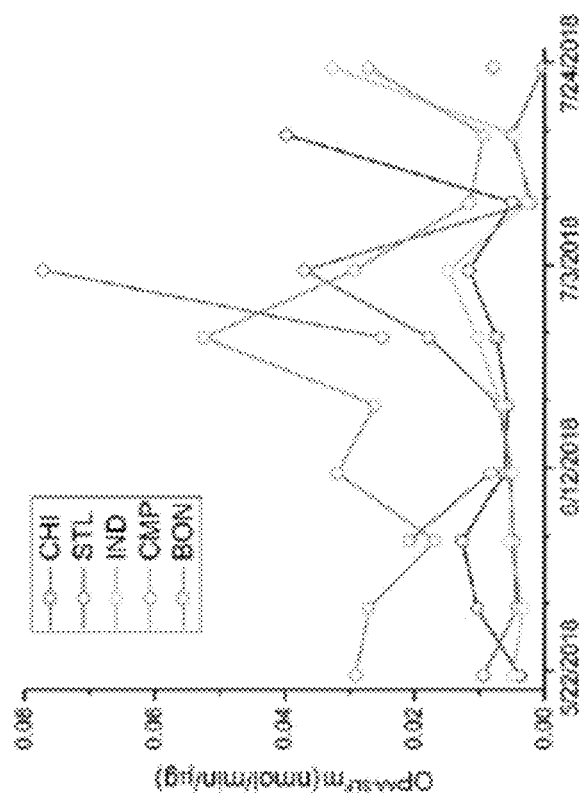
Figure 5B:
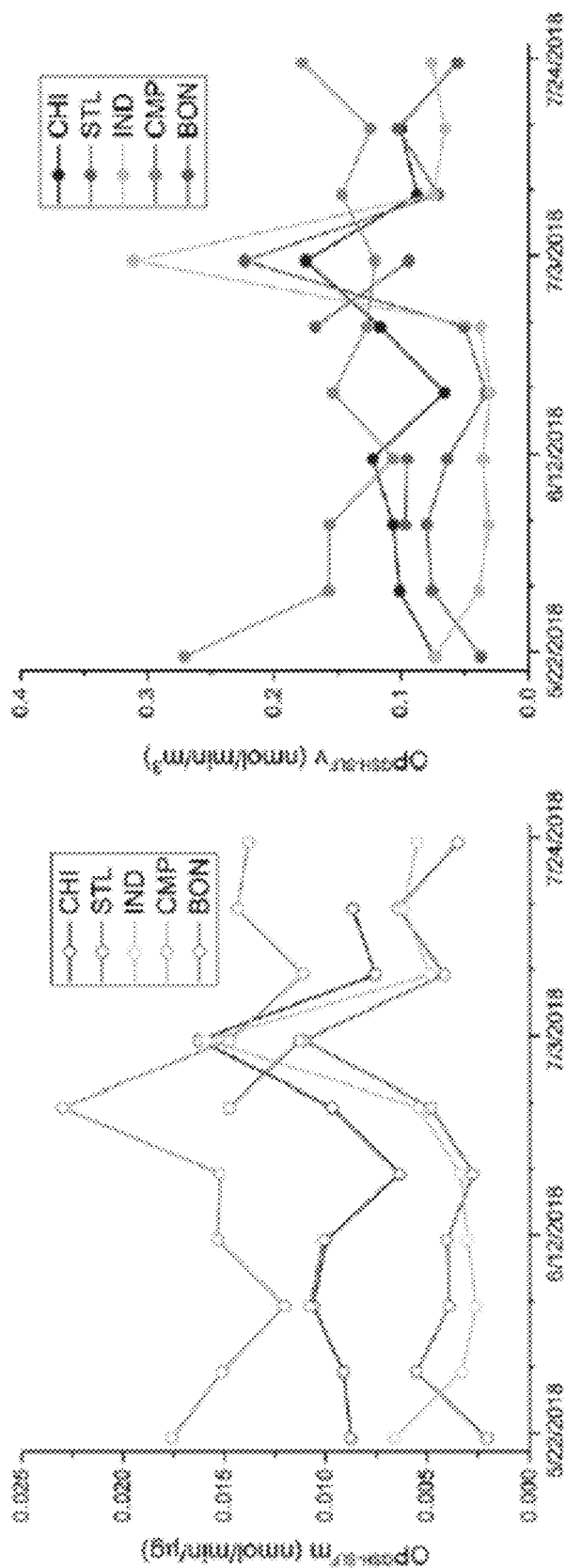
Figure 5C:
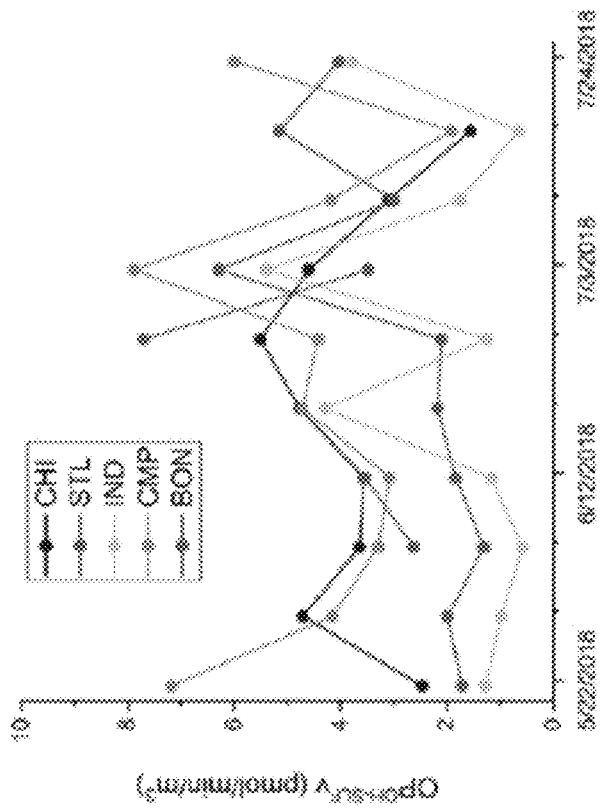
Figure 5C:
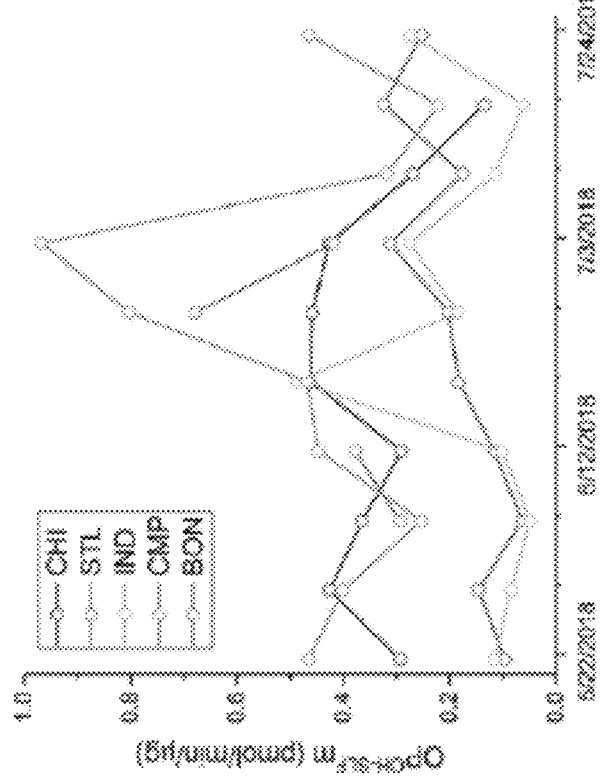
Figure 5D:
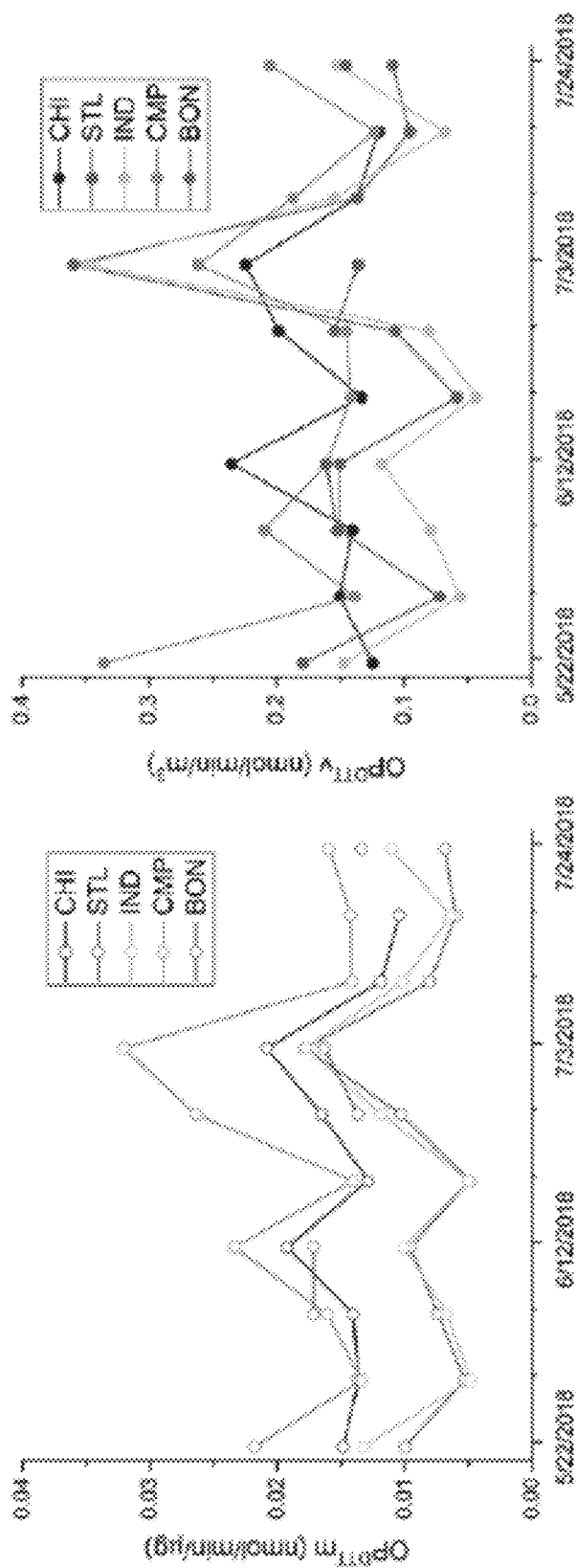
Figure 5E:
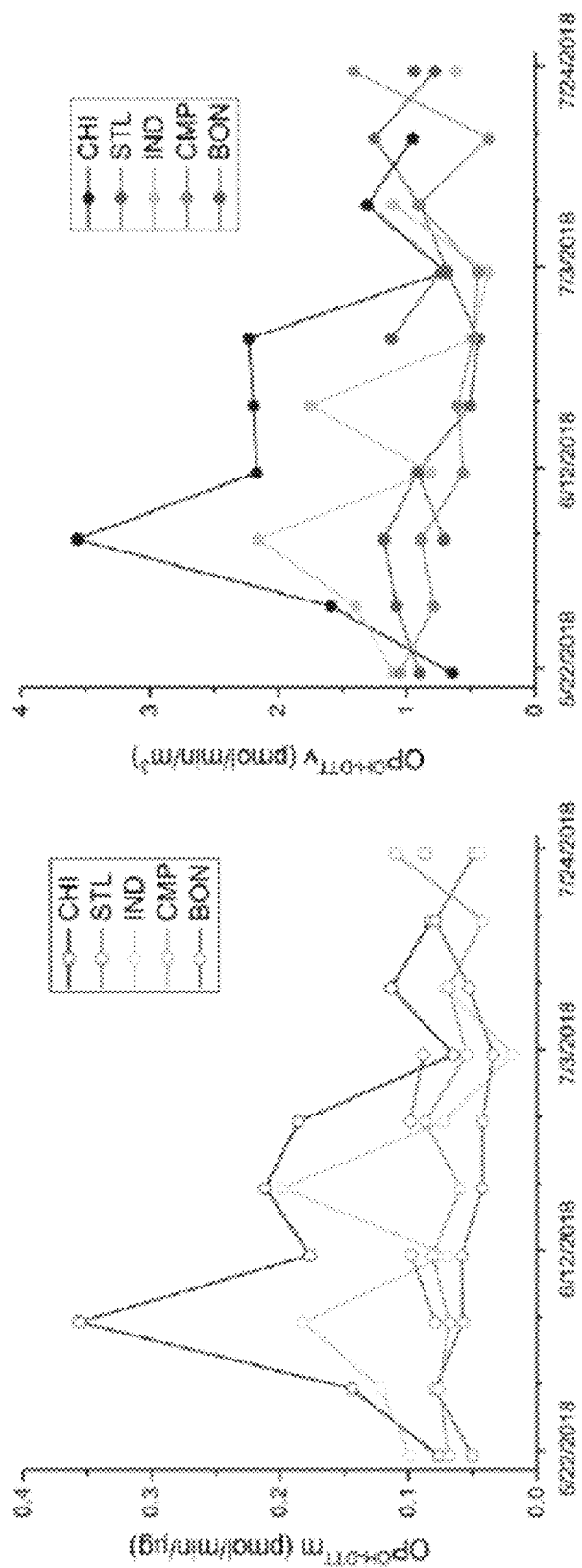

As the most commonly used endpoint, $OP^{DTT}$ has the largest database in existing literature. Both mass-normalized and volume-normalized DTT activities measured in this study are in good agreement with those from many previous studies listed in TABLE 4D (i.e. within the typical range: 0.005-0.2 nmol·min$^{-1}$·μg$^{-1}$ for $OP^{DTT}m$ and 0.1-0.5 nmol·min$^{-1}$·m$^{-3}$ for $OP^{DTT}v$). In contrast, $OP^{OH-DTT}$ is a newer endpoint which was first introduced in our previous study (Xiong et al. 2017). The activity of $OP^{OH-DTT}$ measured in this study is significantly higher than our previous studies [i.e. Xiong et al. (2017) and Yu et al. (2018) (TABLE 4E)] reporting this endpoint. This is again attributed to a diversity of the sites we have in the current study in contrast to only two sites, which were both in Champaign (IL) in those studies. Interestingly, the range of $OP^{OH-DTT}v$ at CMP in this study (0.4-1.4 pmol·min$^{-1}$·m$^{-3}$; FIG. 5E) is close to that reported in our previous study Yu et al. (2018) (0.2-1.1 pmol·min$^{-1}$·m$^{-3}$), indicating the consistency of our automated protocol. Further investigation of PM chemical composition (currently underway), will help in revealing the complex patterns of these OP endpoints among different sites.

SAMERA is designed for an automated analysis of five OP endpoints—$OP^{AA-SLF}$, $OP^{GSH-SLF}$, $OP^{OH-SLF}$, $OP^{DTT}$ and $OP^{OH-DTT}$ on ambient PM aqueous extracts. Both spectrophotometric- and spectrofluorometric-based approaches are adopted to obtain a simultaneous measurement of multiple endpoints. The system analyzes all five OP endpoints for a given sample within 3 hours. The precision tests on SAMERA demonstrate a high reproducibility for both positive controls and ambient $PM_{2.5}$ samples. The measurements obtained from SAMERA are also highly accurate as they are validated against the results from manual operation using the same experimental protocol. We recommend a liquid concentration of ambient $PM_{2.5}$ extracts in the reaction mixture of about 50 μg/mL for the SLF-based assays, and about 30 μg/mL for DTT-based assays.

Overall, SAMERA provides the first rapid and high-throughput analysis protocol for multiple endpoints of OP. It substantially reduces the time and labor required to conduct various OP assays on the ambient PM samples, which will facilitate integrating the OP dataset into epidemiological models in future studies. Furthermore, SAMERA can yield the kinetic properties for antioxidant (e.g. GSH) consumption and ROS generation (e.g. ·OH generation in SLF), which have not been typically obtained in previous studies due to labor-intensive protocols of these endpoints. The study also explored the feasibility of employing SAMERA for analyzing a large set of ambient $PM_{2.5}$ samples currently being collected from the Midwest US. Results show that the range of OP activities obtained from SAMERA is broader than those reported in previous studies, which is probably due to the diversity in chemical composition of the ambient samples collected from five different sampling sites in our study. The activities for most OP endpoints were significantly elevated in the week of July 4 at all the sites, indicating a substantial impact of fireworks emissions from Independence Day celebration on ambient $PM_{2.5}$ OP. Further analysis of OP on the remaining samples along with a detailed chemical speciation, which is currently underway, will yield insights on the chemical components and their emission sources contributing to different mechanisms of ROS generation induced by ambient $PM_{2.5}$ in the Midwest US.

Figure 6A:
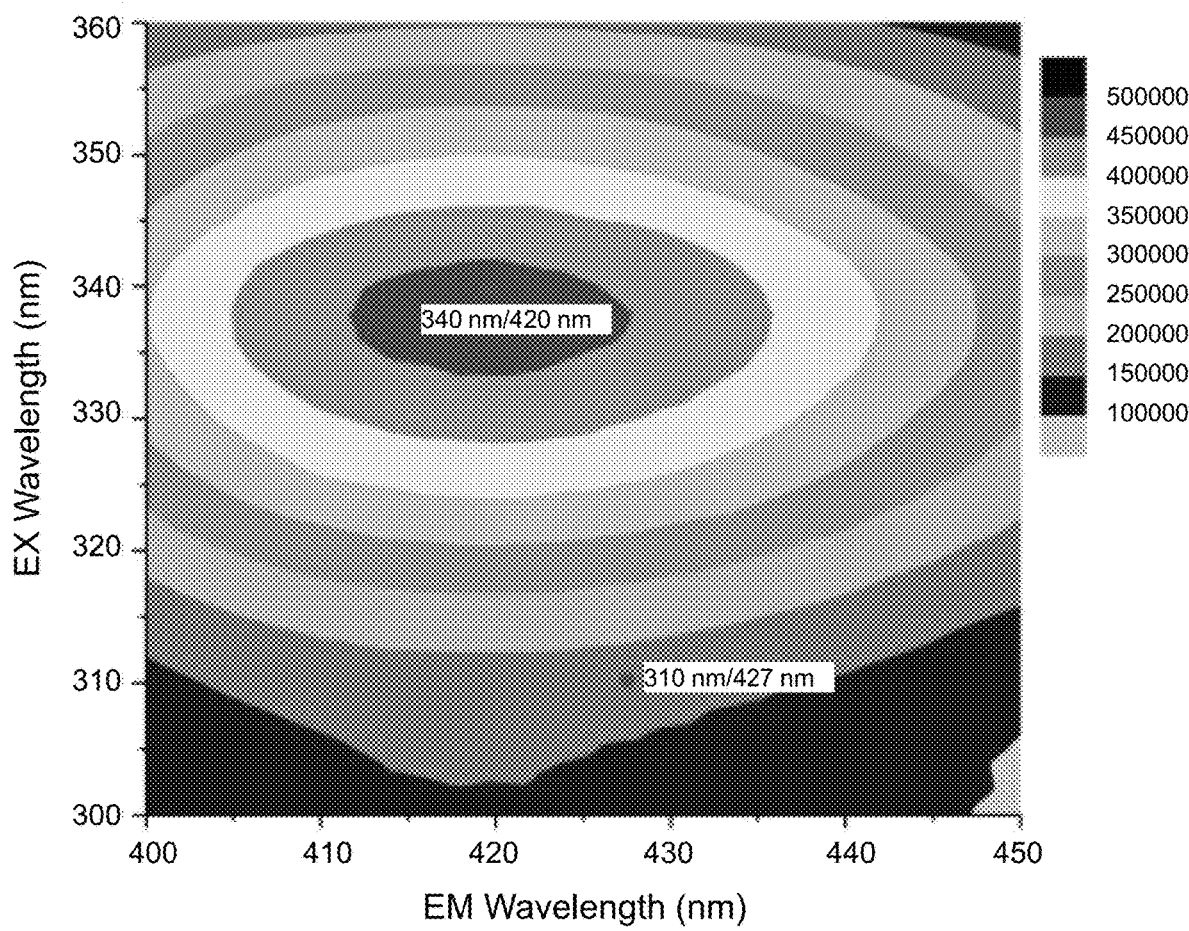
FIGS. 6A-6B. The effect of excitation/emission wavelength settings on the measurement of GSH, (FIG. 6A) the contour plot of fluorescence intensity of GS-OPA.
Figure 6B:
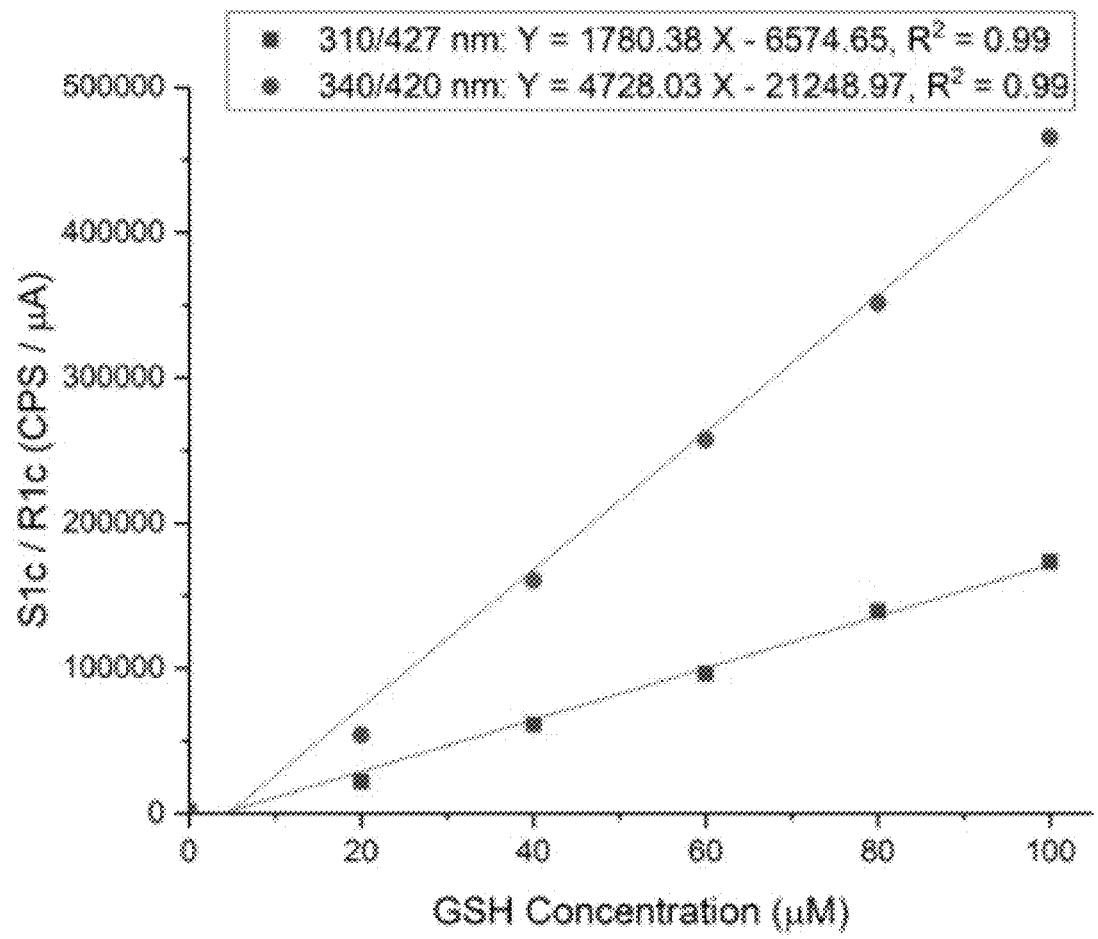

Fluorescence intensity of GS-OPA at different excitation/emission wavelengths (FIGS. 6A-6B): Although the peak of the fluorescence intensity for GS-OPA occurs at the excitation/emission wavelength of 340 nm/420 nm (Roušar et al. 2012), we chose 310 nm/427 nm to allow the measurement of both GSH and ·OH. Here, we show the contour plot of the fluorescence spectra of GS-OPA at different wavelengths. 400 μL of 100 μM GSH was diluted 10 times and mixed with 1.6 mL of 2 mM OPA. Although lower than at 340/420 nm, the fluorescent intensity at 310/427 nm is still substantially high (>150000 CPS/μA), indicating the suitability of this wavelength setting for measuring GS-OPA. We also conducted the calibration of GSH at both wavelength settings (FIG. 6B). Although, the calibration equation is different at 310/427 nm than at 340/420 nm, it is highly linear for both cases (R2>0.99), which allows the measurement of GSH at any of these wavelength settings.

Figure 7:
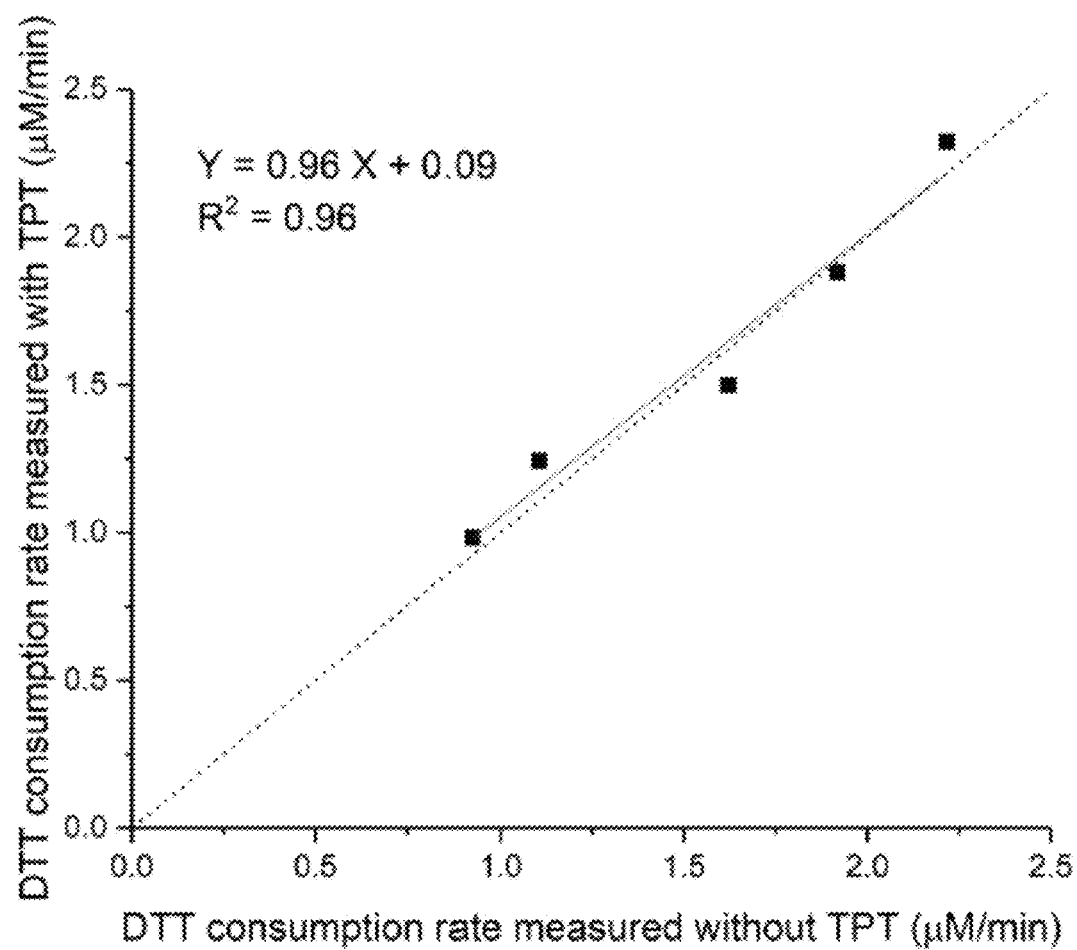
FIG. 7. Comparison of DTT consumption rate measured with and without TPT in the reaction mixture using 0.05 μM-0.25 μM PQ as positive control. The dotted line denotes identity line.

Effect of TPT on DTT consumption using PQ as the positive control (FIG. 7): In SAMERA, $OP_{DTT}$ and $OP_{OH-DTT}$ are measured in the same reaction vial (RV) and the latter requires adding TPT as the ·OH probe in RV. To check if there is any interference of TPT on DTT consumption, we performed the DTT assay by using both K-PB (pH=7.4) and TPT (prepared in K-PB; pH=7.4) in separate reaction vials. Five different concentrations of PQ within the range of 0.05-0.25 μM (in RV) were tested. FIG. 7 shows the orthogonal fit regression of DTT activity measured with and without TPT. As apparent, both slope and coefficient of determination ($R_2$) for the regression are close to 1. A 2-tailed paired t-test showed no significant difference in two sets of measurement (p=0.59). Based on these results, we conclude that TPT does not have any significant effect on the consumption rate of DTT, which allows us to conduct both DTT consumption and ·OH measurement in the same vial.

Figure 8A:
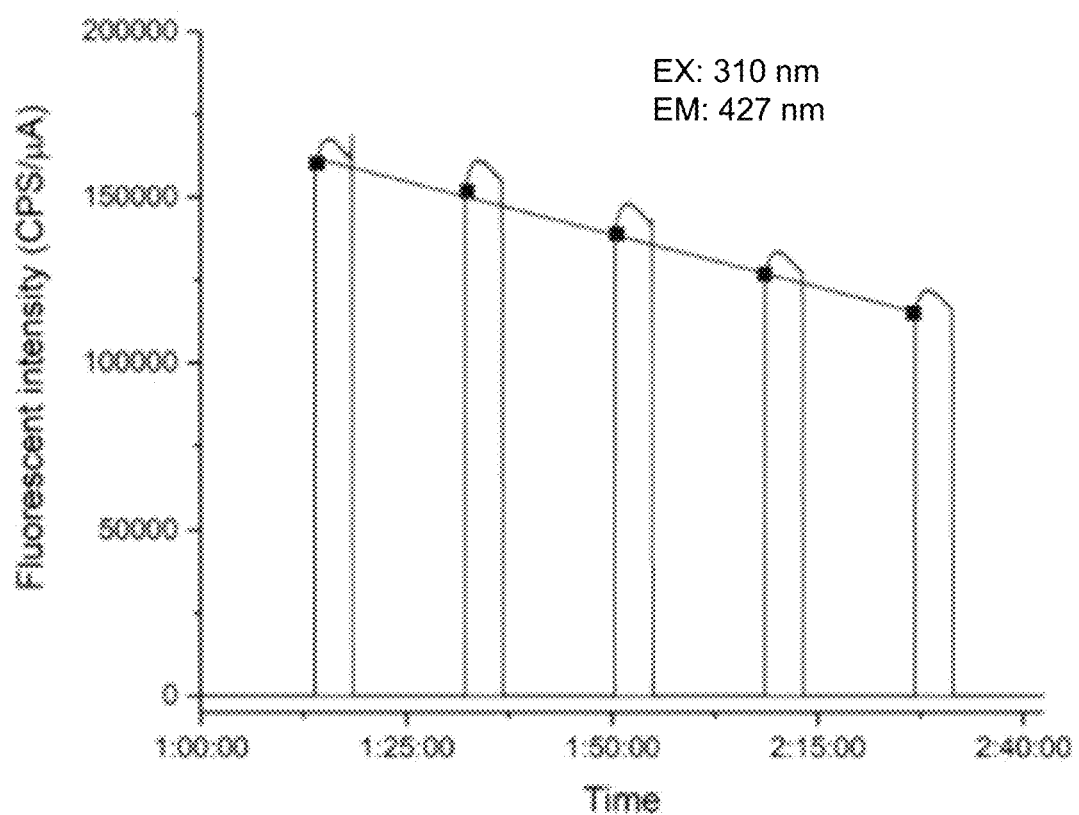
FIGS. 8A-8C. The illustration of OP determination using $OP^{GSH-SLF}$ as an example.
Figure 8B:
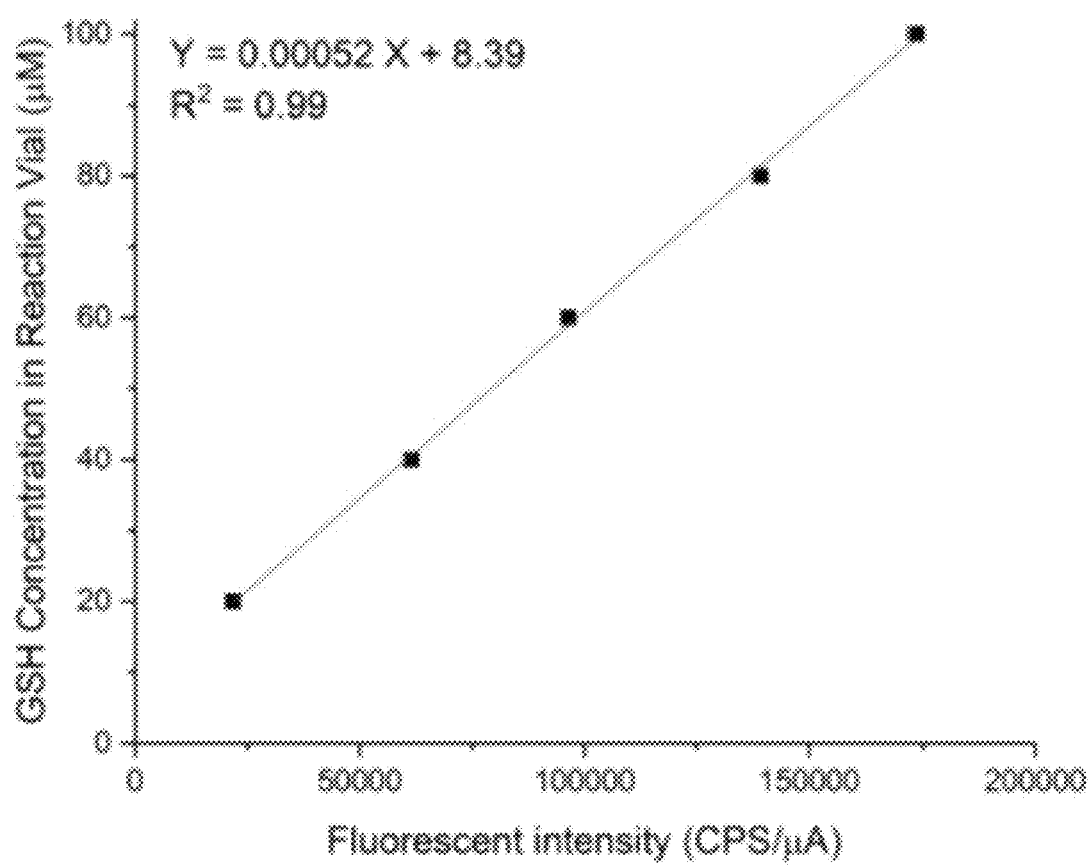
Figure 8C:
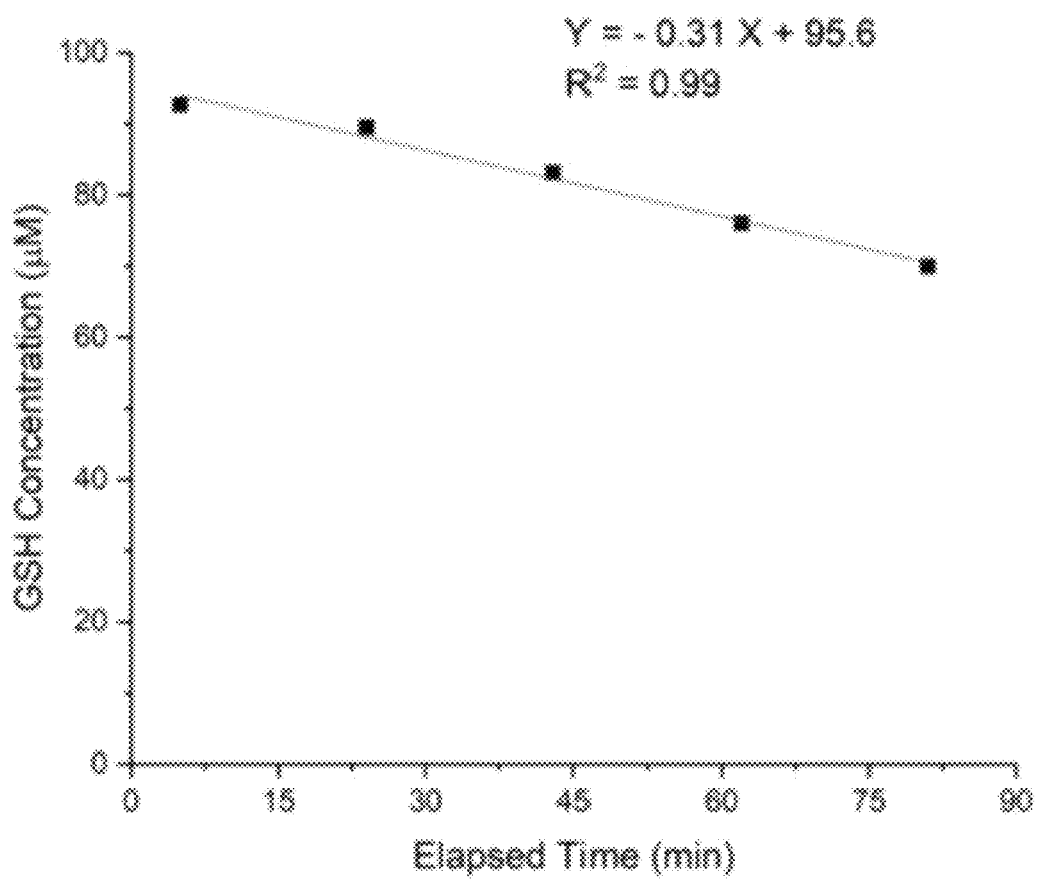

OP determination from absorbance or fluorescence data: FIGS. 8A-C show the data analysis procedure from the raw absorbance/fluorescence intensity data, using GSH as an example. The absorbance at 265 nm, 412 nm, 600 nm and the fluorescence intensity at excitation/emission wavelength of 310 nm/427 nm are measured continuously (resolution time=2 seconds for absorbance and 3 seconds for fluorescence) during the operation of SAMERA. At each measurement step, the pump pushes the diluted mixture from MV into the flow cells of spectrophotometer or spectrofluorometer, causing an increase in the absorbance or fluorescence intensity at specific wavelengths under measurement. The self-cleaning program at the end of each measuring step drives the pump to push DI through the flow cells, which restores the absorbance and fluorescence intensity to zero, and thus generating five columns on the strip chart for both absorbance and fluorescence intensity plots (FIG. 8A).

FIG. 8B shows an example of the calibration curve for different concentrations of the indicator compound (here GS-OPA for GSH measurement). The calibration equation is then used to convert the fluorescence to GSH concentration versus time plot (FIG. 8C). A simple linear regression is used to calculate the slope of this plot, which represents raw activity of the sample. Based on numerous tests with positive controls and ambient PM sample extracts, the coefficient of determination (R2) for the regression is always above 0.98 for all the endpoints, indicating high accuracy of the slope. A negative control, i.e. DI for chemical standards and blank filter extract for ambient $PM_{2.5}$ extracts was always analyzed along a batch of the samples, for the respective blank correction. For the calculation of ambient OP activities, these blank corrected slopes were further normalized by either mass of collected PM or volume of the sampled air. Mass normalized OP (OPm, nmol·min-1·μg-1) indicates an intrinsic OP property, which is driven by the specific chemical composition of PM. Volume normalized OP (OPv, nmol·min-1·m-3) represents the total oxidative load caused by the exposure to the ambient aerosols, and is driven by both chemical composition and ambient concentration of PM. The calculation of normalized GSH activity is shown as an example:

$$OP_{sample}^{GSH-SLF} = OP_{sample,raw}^{GSH-SLF} - OP_{Blank}^{GSH-SLF} \tag{S1}$$

$$OPm_{sample}^{GSH-SLF} = \frac{OP_{sample}^{GSH-SLF}}{\frac{m_{sample}}{V_{DI}} \times 0.7} \tag{S2}$$

where: $m_{sample}$ is the total mass of PM on fraction of the filter used for extraction (μg), VDI is the volume of DI used for extracting the filter, and 0.7 is the ratio of the sample extract volume to the total reaction volume in RV.

OPm and OPv are related by the following equation:

$$OPv_{sample}^{GSH-SLF} = \dot{m}_{sample} OPm_{sample}^{GSH-SLF} \tag{S3}$$

where: $\dot{m}_{sample}$ is the mass concentration of PM in ambient air (μg/m3).

The calculation of OP activities for other four endpoints is similar to OPGSH-SLF and therefore not discussed here.

Specifically incorporated herein by reference, including for systems, drawings, components, reagents, and methods for measuring $PM_{2.5}$ oxidative potential is Yu et al. "A semi-automated multi-endpoint reactive oxygen species activity analyzer (SAMERA) for measuring the oxidative potential of ambient $PM_{2.5}$ aqueous extracts." Aerosol Science and Technology. 54(3): 304-320 (Published online Dec. 6, 2019), DOI: 10.1080/02786826.2019.1693492.

Abrams, J. Y., R. J. Weber, M. Klein, S. E. Samat, H. H. Chang, M. J. Strickland, V. Verma, T. Fang, J. T. Bates, J. A. Mulholland. 2017. Associations between ambient fine particulate oxidative potential and cardiorespiratory emergency department visits. Environmental Health Perspectives 125(10):107008. doi: 10.1289/ehp1545.

Alfadda, A. A. and R. M. Sallam. 2012. Reactive oxygen species in health and disease. BioMed Research International 2012. doi: 10.1155/2012/936486.

Antiñolo, M., M. D. Willis, S. Zhou, J. P. Abbatt. 2015. Connecting the oxidation of soot to its redox cycling abilities. Nature Communications 66812. doi: 10.1038/ncomms7812.

Araujo, J. A. and A. E. Nel. 2009. Particulate matter and atherosclerosis: role of particle size, composition and oxidative stress. Particle and Fibre Toxicology 6(1):24. doi: 10.1186/1743-8977-6-24.

Ayres, J. G., P. Borm, F. R. Cassee, V. Castranova, K. Donaldson, A. Ghio, R. M. Harrison, R. Hider, F. Kelly, I. M. Kooter. 2008. Evaluating the toxicity of airborne particulate matter and nanoparticles by measuring oxidative stress potential—a workshop report and consensus statement. Inhalation Toxicology 20(1):75-99. doi: 10.1080/08958370701665517.

Böhmer, A., J. Jordan and D. Tsikas. 2011. High-performance liquid chromatography ultraviolet assay for human erythrocytic catalase activity by measuring glutathione as o-phthalaldehyde derivative. Analytical Biochemistry 410 (2):296-303. doi: 10.1016/j.ab.2010.11.026.

Baker, M. A., G. J. Cerniglia and A. Zaman. 1990. Microtiter plate assay for the measurement of glutathione and glutathione disulfide in large numbers of biological samples. Analytical Biochemistry 190(2):360-365. doi: 10.1016/0003-2697(90)90208-Q.

Bates, J. T., R. J. Weber, J. Abrams, V. Verma, T. Fang, M. Klein, M. J. Strickland, S. E. Sarnat, H. H. Chang, J. A. Mulholland. 2015. Reactive oxygen species generation linked to sources of atmospheric particulate matter and cardiorespiratory effects. Environmental Science & Technology 49(22):13605-13612. doi: 10.1021/acs.est.5b02967.

Becker, S., L. A. Dailey, J. M. Soukup, S. C. Grambow, R. B. Devlin, Y.-C. T. Huang. 2005. Seasonal variations in air pollution particle-induced inflammatory mediator release and oxidative stress. Environmental Health Perspectives 113(8):1032-1038. doi: 10.1289/ehp.7996.

Birben, E., U. M. Sahiner, C. Sackesen, S. Erzurum, O. Kalayci. 2012. Oxidative stress and antioxidant defense. World Allergy Organization Journal 5(1):9. doi: 10.1097/WOX.0b013e3182439613.

Bonomini, F., S. Tengattini, A. Fabiano, R. Bianchi, R. Rezzani. 2008. Atherosclerosis and oxidative stress. Histology and Histopathology 23(3):381-390. doi: 10.14670/H H-23.381.

Charrier, J. and C. Anastasio. 2012. On dithiothreitol (DTT) as a measure of oxidative potential for ambient particles: evidence for the importance of soluble transition metals. Atmospheric Chemistry and Physics 12(5):11317. doi: 10.5194/acp-12-9321-2012.

Charrier, J. G. and C. Anastasio. 2015. Rates of Hydroxyl Radical Production from Transition Metals and Quinones in a Surrogate Lung Fluid. Environmental Science & Technology 49(15):9317-9325. doi: 10.1021/acs.est.5b01606.

Charrier, J. G., A. S. McFall, N. K. Richards-Henderson, C. Anastasio. 2014. Hydrogen peroxide formation in a surrogate lung fluid by transition metals and quinones present in particulate matter. Environmental Science & Technology 48(12):7010-7017. doi: 10.1021/es501011w.

Charrier, J. G., A. S. McFall, K. K. Vu, J. Baroi, C. Olea, A. Hasson, C. Anastasio. 2016. A bias in the "mass-normalized" DTT response—An effect of non-linear concentration-response curves for copper and manganese. Atmospheric Environment 144325-334. doi: 10.1016/j.atmosenv.2016.08.071.

Cho, A. K., C. Sioutas, A. H. Miguel, Y. Kumagai, D. A. Schmitz, M. Singh, A. Eiguren-Fernandez, J. R. Froines. 2005. Redox activity of airborne particulate matter at different sites in the Los Angeles Basin. Environmental Research 99(1):40-47. doi: 10.1016/j.envres.2005.01.003.

Chuang, K.-J., C.-C. Chan, T.-C. Su, C.-T. Lee, C.-S. Tang. 2007. The effect of urban air pollution on inflammation, oxidative stress, coagulation, and autonomic dysfunction in young adults. American Journal of Respiratory and Critical Care Medicine 176(4):370-376. doi: 10.1164/rccm.200611-16270C.

Cohen, A. J., M. Brauer, R. Burnett, H. R. Anderson, J. Frostad, K. Estep, K. Balakrishnan, B. Brunekreef, L. Dandona, R. Dandona. 2017. Estimates and 25-year trends of the global burden of disease attributable to ambient air pollution: an analysis of data from the Global Burden of Diseases Study 2015. The Lancet 389(10082): 1907-1918. doi: 10.1016/S0140-6736(17)30505-6.

Crobeddu, B., L. Aragao-Santiago, L.-C. Bui, S. Boland, A. B. Squiban. 2017. Oxidative potential of particulate matter 2.5 as predictive indicator of cellular stress. Environmental Pollution 230125-133. doi: doi.org/10.1016/j.envpol.2017.06.051.

D'Autréaux, B. and M. B. Toledano. 2007. ROS as signalling molecules: mechanisms that generate specificity in ROS homeostasis. Nature Reviews Molecular Cell Biology 8(10):813. doi: 10.1038/nrm2256.

Delfino, R. J., N. Staimer, T. Tjoa, D. L. Gillen, J. J. Schauer, M. M. Shafer. 2013. Airway inflammation and oxidative potential of air pollutant particles in a pediatric asthma panel. Journal of Exposure Science and Environmental Epidemiology 23(5):466-473. doi: 10.1038/jes.2013.25.

Fang, T., V. Verma, J. T. Bates, J. Abrams, M. Klein, M. J. Strickland, S. E. Sarnat, H. H. Chang, J. A. Mulholland, P. E. Tolbert. 2016. Oxidative potential of ambient water-soluble PM 2.5 in the southeastern United States: contrasts in sources and health associations between ascorbic acid (AA) and dithiothreitol (DTT) assays. Atmospheric Chemistry and Physics 16(6):3865-3879. doi: 10.5194/acp-16-3865-2016.

Fang, T., V. Verma, H. Guo, L. King, E. Edgerton, R. Weber. 2014. A semi-automated system for quantifying the oxidative potential of ambient particles in aqueous extracts using the dithiothreitol (DTT) assay: results from the Southeastern Center for Air Pollution and Epidemiology (SCAPE). Atmospheric Measurement Techniques Discussions 7(7). doi: 10.5194/amt-8-471-2015.

Feng, S., D. Gao, F. Liao, F. Zhou, X. Wang. 2016. The health effects of ambient PM2.5 and potential mechanisms. Ecotoxicology and Environmental Safety 12867-74. doi: 10.1016/j.ecoenv.2016.01.030.

Godri, K. J., R. M. Harrison, T. Evans, T. Baker, C. Dunster, I. S. Mudway, F. J. Kelly. 2011. Increased oxidative burden associated with traffic component of ambient particulate matter at roadside and urban background schools sites in London. PloS One 6(7):e21961. doi: 10.1371/journal.pone.0021961.

Held, K. D., F. C. Sylvester, K. L. Hopcia, J. E. Biaglow. 1996. Role of Fenton chemistry in thiol-induced toxicity and apoptosis. Radiation Research 145(5):542-553. doi: 10.2307/3579272.

Hu, S., A. Polidori, M. Arhami, M. Shafer, J. Schauer, A. Cho, C. Sioutas. 2008. Redox activity and chemical speciation of size fractioned PM in the communities of the Los Angeles-Long Beach harbor. Atmospheric Chemistry and Physics 8(21):6439-6451. doi: 10.5194/acp-8-6439-2008.

Hulskotte, J., H. Denier van der Gon, A. Visschedijk, M. Schaap. 2007. Brake wear from vehicles as an important source of diffuse copper pollution. Water Science & Technology 56(1):223-231. doi: 10.2166/wst.2007.456.

Janssen, N. A., M. Strak, A. Yang, B. Hellack, F. J. Kelly, T. A. Kuhlbusch, R. M. Harrison, B. Brunekreef, F. R. Cassee, M. Steenhof. 2015. Associations between three specific a-cellular measures of the oxidative potential of particulate matter and markers of acute airway and nasal inflammation in healthy volunteers. Occupational & Environmental Medicine 72(1):49-56. doi: 10.1136/oemed-2014-102303.

Janssen, N. A., A. Yang, M. Strak, M. Steenhof, B. Hellack, M. E. Gerlofs-Nijland, T. Kuhlbusch, F. Kelly, R. Harrison, B. Brunekreef. 2014. Oxidative potential of particulate matter collected at sites with different source characteristics. Science of the Total Environment 472572-581. doi: 10.1016/j.scitotenv.2013.11.099.

Künzli, N., I. S. Mudway, T. Götschi, T. Shi, F. J. Kelly, S. Cook, P. Burney, B. Forsberg, J. W. Gauderman, M. E. Hazenkamp. 2006. Comparison of oxidative properties, light absorbance, and total and elemental mass concentration of ambient PM2.5 collected at 20 European sites. Environmental Health Perspectives 114(5):684-690. doi: 10.1289/ehp.8584.

Kampa, M. and E. Castanas. 2008. Human health effects of air pollution. Environmental Pollution 151(2):362-367. doi: 10.1016/j.envpol.2007.06.012.

Knaapen, A. M., P. J. Borm, C. Albrecht, R. P. Schins. 2004. Inhaled particles and lung cancer. Part A: Mechanisms. International Journal of Cancer 109(6):799-809. doi: 10.1002/ijc.11708.

Kodavanti, U. P., M. C. Schladweiler, A. D. Ledbetter, W. P. Watkinson, M. J. Campen, D. W. Winsett, J. R. Richards, K. M. Crissman, G. E. Hatch, D. L. Costa. 2000. The spontaneously hypertensive rat as a model of human cardiovascular disease: evidence of exacerbated cardiopulmonary injury and oxidative stress from inhaled emission particulate matter. Toxicology and Applied Pharmacology 164(3):250-263. doi: 10.1006/taap.2000.8899.

Li, N., C. Sioutas, A. Cho, D. Schmitz, C. Misra, J. Sempf, M. Wang, T. Oberley, J. Froines, A. Nel. 2003. Ultrafine particulate pollutants induce oxidative stress and mitochondrial damage. Environmental Health Perspectives 111(4):455. doi: 10.1289/ehp.6000.

Li, N., T. Xia and A. E. Nel. 2008. The role of oxidative stress in ambient particulate matter-induced lung diseases and its implications in the toxicity of engineered nanoparticles. Free Radical Biology and Medicine 44(9):1689-1699. doi: 10.1016/j.freeradbiomed.2008.01.028.

Longhin, E., J. A. Holme, K. B. Gutzkow, V. M. Arlt, J. E. Kucab, M. Camatini, M. Gualtieri. 2013. Cell cycle alterations induced by urban PM2.5 in bronchial epithelial cells: characterization of the process and possible mechanisms involved. Particle and Fibre Toxicology 10(1):63. doi: 10.1186/1743-8977-10-63.

Ma, S., K. Ren, X. Liu, L. Chen, M. Li, X. Li, J. Yang, B. Huang, M. Zheng, Z. Xu. 2015. Production of hydroxyl radicals from Fe-containing fine particles in Guangzhou, China. Atmospheric Environment 12372-78. doi: 10.1016/j.atmosenv.2015.10.057.

Maikawa, C. L., S. Weichenthal, A. J. Wheeler, N. A. Dobbin, A. Smargiassi, G. Evans, L. Liu, M. S. Goldberg, K. J. G. Pollitt. 2016. Particulate Oxidative Burden as a Predictor of Exhaled Nitric Oxide in Children with Asthma. Environmental Health Perspectives 124(10): 1616. doi: 10.1289/ehp175.

Mudway, I. S., S. T. Duggan, C. Venkataraman, G. Habib, F. J. Kelly, J. Grigg. 2005. Combustion of dried animal dung as biofuel results in the generation of highly redox active fine particulates. Particle and Fibre Toxicology 2(1):6. doi: 10.1186/1743-8977-2-6.

Mudway, I. S., N. Stenfors, A. Blomberg, R. Helleday, C. Dunster, S. Marklund, A. J. Frew, T. Sandström, F. J. Kelly. 2001. Differences in basal airway antioxidant concentrations are not predictive of individual responsiveness to ozone: a comparison of healthy and mild asthmatic subjects. Free Radical Biology and Medicine 31(8):962-974. doi: 10.1016/S0891-5849(01)00671-2.

Oh, S. M., H. R. Kim, Y. J. Park, S. Y. Lee, K. H. Chung. 2011. Organic extracts of urban air pollution particulate matter (PM2.5)-induced genotoxicity and oxidative stress in human lung bronchial epithelial cells (BEAS-2B cells). Mutation Research/Genetic Toxicology and Environmental Mutagenesis 723(2):142-151. doi: 10.1016/j.mrgentox.2011.04.003.

Pervez, S., R. K. Chakrabarty, S. Dewangan, J. G. Watson, J. C. Chow, J. L. Matawle. 2016. Chemical speciation of aerosols and air quality degradation during the festival of lights (Diwali). Atmospheric Pollution Research 7(1):92-99. doi: 10.1016/j.apr.2015.09.002.

Pham-Huy, L. A., H. He and C. Pham-Huy. 2008. Free radicals, antioxidants in disease and health. International Journal of Biomedical Science 4(2):89.

Pietrogrande, M. C., I. Bertoli, F. Manarini, M. Russo. 2019. Ascorbate assay as a measure of oxidative potential for ambient particles: Evidence for the importance of cell-free surrogate lung fluid composition. Atmospheric Environment 211(2019):103-112. doi: 10.1016/j.atmosenv.2019.05.012.

Puthussery, J. V., C. Zhang and V. Verma. 2018. Development and field testing of an online instrument for measuring the real-time oxidative potential of ambient particulate matter based on dithiothreitol assay. Atmospheric Measurement Techniques 11(10):5767-5780. doi: 10.5194/amt-11-5767-2018.

Rahman, T., I. Hosen, M. T. Islam, H. U. Shekhar. 2012. Oxidative stress and human health. Advances in Bioscience and Biotechnology 3(07):997. doi: 10.4236/abb.2012.327123.

Roušar, T., O. Kučera, H. Lotková, Z. Červinková. 2012. Assessment of reduced glutathione: comparison of an optimized fluorometric assay with enzymatic recycling method. Analytical Biochemistry 423(2):236-240. doi: 10.1016/j.ab.2012.01.030.

Saffari, A., N. Daher, M. M. Shafer, J. J. Schauer, C. Sioutas. 2014. Seasonal and spatial variation in dithiothreitol (DTT) activity of quasi-ultrafine particles in the Los Angeles Basin and its association with chemical species. Journal of Environmental Science and Health, Part A 49(4):441-451. doi: 10.1080/10934529.2014.854677.

Sarnat, S. E., H. H. Chang and R. J. Weber (2016). Ambient PM2.5 and health: does PM2.5 oxidative potential play a role?, American Thoracic Society.

Sauvain, J.-J., S. Deslarzes, F. Storti, M. Riediker. 2015. Oxidative potential of particles in different occupational environments: A pilot study. Annals Of Occupational Hygiene 59(7):882-894. doi: 10.1093/annhyg/mev024.

Shen, H., A. Barakat and C. Anastasio. 2011. Generation of hydrogen peroxide from San Joaquin Valley particles in a cell-free solution. Atmospheric Chemistry and Physics 11(2):753-765. doi: 10.5194/acp-11-753-2011.

Son, Y., V. Mishin, W. Welsh, S.-E. Lu, J. D. Laskin, H. Kipen, Q. Meng. 2015. A Novel High-Throughput Approach to Measure Hydroxyl Radicals Induced by Airborne Particulate Matter. International Journal of Environmental Research and Public Health 12(11): 13678-13695. doi: 10.3390/ijerph121113678.

Sun, Q., A. Wang, X. Jin, A. Natanzon, D. Duquaine, R. D. Brook, J.-G. S. Aguinaldo, Z. A. Fayad, V. Fuster, M. Lippmann. 2005. Long-term air pollution exposure and acceleration of atherosclerosis and vascular inflammation in an animal model. JAMA 294(23):3003-3010. doi: 10.1001/jama.294.23.3003.

Szigeti, T., C. Dunster, A. Cattaneo, D. Cavallo, A. Spinazzè, D. E. Saraga, I. A. Sakellaris, Y. de Kluizenaar, E. J. Cornelissen, O. Hänninen. 2016. Oxidative potential and chemical composition of PM2.5 in office buildings across Europe—The OFFICAIR study. Environment International 92324-333. doi: 10.1016/j.envint.2016.04.015.

Torres-Ramos, Y. D., A. Montoya-Estrada, A. M. Guzman-Grenfell, J. Mancilla-Ramirez, B. Cardenas-Gonzalez, S. Blanco-Jimenez, J. D. Sepulveda-Sanchez, A. Ramirez-Venegas, J. J. Hicks. 2011. Urban PM2.5 induces ROS generation and RBC damage in COPD patients. Frontiers in Bioscience (Elite Edition) 3 E(3):808-817. doi: 10.2741/e288.

Verma, V., T. Fang, L. Xu, R. E. Peltier, A. G. Russell, N. L. Ng, R. J. Weber. 2015a. Organic aerosols associated with the generation of reactive oxygen species (ROS) by water-soluble PM2.5. Environmental Science & Technology 49(7):4646-4656. doi: 10.1021/es505577w.

Verma, V., Z. Ning, A. K. Cho, J. J. Schauer, M. M. Shafer, C. Sioutas. 2009. Redox activity of urban quasi-ultrafine particles from primary and secondary sources. Atmospheric Environment 43(40):6360-6368. doi: 10.1016/j.atmosenv.2009.09.019.

Verma, V., R. Rico-Martinez, N. Kotra, L. King, J. Liu, T. W. Snell, R. J. Weber. 2012. Contribution of water-soluble and insoluble components and their hydrophobic/hydrophilic subfractions to the reactive oxygen species-generating potential of fine ambient aerosols. Environmental Science & Technology 46(20):11384-11392. doi: 10.1021/es302484r.

Verma, V., Y. Wang, R. El-Afifi, T. Fang, J. Rowland, A. G. Russell, R. J. Weber. 2015b. Fractionating ambient humic-like substances (HULIS) for their reactive oxygen species activity—Assessing the importance of quinones and atmospheric aging. Atmospheric Environment 120351-359. doi: 10.1016/j.atmosenv.2015.09.010.

Vidrio, E., H. Jung and C. Anastasio. 2008. Generation of hydroxyl radicals from dissolved transition metals in surrogate lung fluid solutions. Atmospheric Environment 42(18):4369-4379. doi: 10.1016/j.atmosenv.2008.01.004.

Vidrio, E., C. H. Phuah, A. M. Dillner, C. Anastasio. 2009. Generation of hydroxyl radicals from ambient fine particles in a surrogate lung fluid solution. Environmental Science & Technology 43(3):922-927. doi: 10.1021/es801653u.

Visentin, M., A. Pagnoni, E. Sarti, M. C. Pietrogrande. 2016. Urban PM2.5 oxidative potential: Importance of chemical species and comparison of two spectrophotometric cell-free assays. Environmental Pollution 21972-79. doi: 10.1016/j.envpol.2016.09.047.

Wang, Y., M. J. Plewa, U. K. Mukherjee, V. Verma. 2018. Assessing the cytotoxicity of ambient particulate matter (PM) using Chinese hamster ovary (CHO) cells and its relationship with the PM chemical composition and oxidative potential. Atmospheric Environment 179132-141. doi: 10.1016/j.atmosenv.2018.02.025.

Weichenthal, S., E. Lavigne, G. Evans, K. Pollitt, R. T. Burnett. 2016. Ambient PM2.5 and risk of emergency room visits for myocardial infarction: impact of regional PM2.5 oxidative potential: a case-crossover study. Environmental Health 15(1):46. doi: 10.1186/s12940-016-0129-9.

West, J. J., A. Cohen, F. Dentener, B. Brunekreef, T. Zhu, B. Armstrong, M. L. Bell, M. Brauer, G. Carmichael, D. L. Costa. 2016. What we breathe impacts our health: improving understanding of the link between air pollution and health. Environmental Science & Technology 50(10): 4895-4904. doi: 10.1021/acs.est.5b03827.

Xiong, Q., H. Yu, R. Wang, J. Wei, V. Verma. 2017. Rethinking The Dithiothreitol (DTT) Based PM Oxidative Potential: Measuring DTT Consumption versus ROS Generation. Environmental Science & Technology 51(11):6507-6514. doi: 10.1021/acs.est.7b01272.

Yan, Z., J. Wang, J. Li, N. Jiang, R. Zhang, W. Yang, W. Yao, W. Wu. 2016. Oxidative stress and endocytosis are involved in upregulation of interleukin-8 expression in airway cells exposed to PM 2.5. Environmental Toxicology 31(12):1869-1878. doi: 10.1002/tox.22188.

Yang, A., N. A. Janssen, B. Brunekreef, F. R. Cassee, G. Hoek, U. Gehring. 2016. Children's respiratory health and oxidative potential of PM2.5: the PIAMA birth cohort study. Occupational & Environmental Medicine 73(3): 154-160. doi: 10.1136/oemed-2015-103175.

Yu, H., J. Wei, Y. Cheng, K. Subedi, V. Verma. 2018. Synergistic and antagonistic interactions among the particulate matter components in generating reactive oxygen species based on the dithiothreitol assay. Environmental Science & Technology 52(4):2261-2270. doi: 10.1021/acs.est.7b04261.

Zhang, X., N. Staimer, D. L. Gillen, T. Tjoa, J. J. Schauer, M. M. Shafer, S. Hasheminassab, P. Pakbin, N. D. Vaziri, C. Sioutas. 2016. Associations of oxidative stress and inflammatory biomarkers with chemically-characterized air pollutant exposures in an elderly cohort. Environmental Research 150306-319. doi: 10.1016/j.envres.2016.06.019.

Roušar, T., O. Kučera, H. Lotková, Z. Červinková. 2012. Assessment of reduced glutathione: comparison of an optimized fluorometric assay with enzymatic recycling method. *Analytical biochemistry* 423(2):236-240. doi: 10.1016/j.ab.2012.01.030

Example 2: Spatiotemporal Variability of Oxidative Potential of Ambient PM2.5 Using SAMERA: Oxidative Potential (OP), i.e. the Capability for a Substance to Generate Reactive Oxygen Species (ROS), has been Widely Accepted as a Possible Mechanism for the Health Effects of Ambient Particulate Matter (PM)

Many chemical endpoints have been developed for assessing the OP of PM. However, no consensus has been reached for selecting the most appropriate method since different PM components have different ROS-generation mechanisms and thus are sensitive towards different endpoints.

To provide a comprehensive measurement of OP, we have developed a Semi-Automated Multi-Endpoint ROS-activity Analyzer (SAMERA) for assessing five different OP endpoints, and assessed the performance of SAMERA by precision and accuracy tests.

SAMERA was deployed to analyze a subset of Midwest Campaign (MWC) samples collected in 10 weeks and 5 sites (N=44). The concentrations of ROS-active metals and carbonaceous species of these samples were also measured. The variability and correlation among these species are analyzed.

Performance evaluation of SAMERA may include limit of detection (LOD), precision (including as quantified by a coefficient of variation (COV)) and accuracy (relative to manual determination). Variability of OP and chemical concentration among sites is assessed by calculating a Coefficient of Divergence (CoD) for different pairs of sites. Correlation between OP and chemical composition of PM is obtained.

Except CMP site, most of the OP endpoints are not correlated with the $PM_{2.5}$ mass, indicating the insufficiency of $PM_{2.5}$ mass to represent the toxicity of particulate matter mixtures. This further emphasizes the importance of measuring OP rather than mass or particle concentration. Metals (especially Cu and Mn) are correlated better with the SLF-based endpoints ($OP^{AA}$, $OP^{GSH}$ and $OP^{OH-SLF}$) while carbon species correlated well with DTT-based endpoints ($OP^{DTT}$ and $OP^{OH-DTT}$).

The spatial variability in PM mass concentrations is much smaller than OP activities and ROS-active chemical components among different sites.

Further analysis of OP on the remaining samples along with a detailed chemical speciation will yield insights on the chemical components and their emission sources contributing to different mechanisms of ROS generation induced by ambient $PM_{2.5}$ in the Midwest US.

REFERENCES FOR EXAMPLE 2

Abrams, J. Y., R. J. Weber, M. Klein, S. E. Samat, H. H. Chang, M. J. Strickland, V. Verma, T. Fang, J. T. Bates, J. A. Mulholland. 2017. *Environmental Health Perspectives,* 125(10):107008.

Fang, T., V. Verma, J. T. Bates, J. Abrams, M. Klein, M. J. Strickland, S. E. Sarnat, H. H. Chang, J. A. Mulholland, P. E. Tolbert. 2016. *Atmospheric Chemistry and Physics,* 16(6):3865-3879. Janssen, N. A., M. Strak, A. Yang, B. Hellack, F. J. Kelly, T. A. Kuhlbusch, R. M. Harrison, B. Brunekreef, F. R. Cassee, M. Steenhof. 2015. *Occupational & Environmental Medicine,* 72(1):49-56.

Yang, A., N. A. Janssen, B. Brunekreef, F. R. Cassee, G. Hoek, U. Gehring. 2016. *Occupational & Environmental Medicine,* 73(3):154-160.

STATEMENTS REGARDING INCORPORATION BY REFERENCE AND VARIATIONS

Tables 1, 2, 3, 4A-4E are appended herein and are specifically incorporated by reference. All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure.

Every device, system, formulation, combination of components, or method described or exemplified herein can be used to practice the invention, unless otherwise stated.

Whenever a range is given in the specification, for example, a temperature range, a time range, a frequency range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

LIST OF TABLES

TABLE 1

The average blank levels and LOD of SAMERA for five OP endpoints as measured from both DI blanks and field blank filters.

| | | DI blank | | Filter blank filters | |
|---|---|---|---|---|---|
| Endpoint | Unit | Average | LOD | Average | LOD |
| $OP^{AA-SLF}$ | μM/min | 0.150 | 0.197 | 0.169 | 0.210 |
| $OP^{GSH-SLF}$ | μM/min | 0.297 | 0.144 | 0.368 | 0.165 |
| $OP^{OH-SLF}$ | nM/min | 3.390 | 1.824 | 4.570 | 3.633 |
| $OP^{DTT}$ | μM/min | 0.496 | 0.060 | 0.651 | 0.065 |
| $OP^{OH-DTT}$ | nM/min | −0.463 | 0.634 | −0.385 | 0.724 |

TABLE 2

Precision of SAMERA as obtained by multiple (N = 10) measurements of various standard chemicals. The concentration of the standard chemical refers to concentration in the reaction vial. CoV is the percentage ratio of the standard deviation to the average level.

| Endpoint | Unit | Standard Chemical | Average | Standard Deviation | CoV (%) |
|---|---|---|---|---|---|
| $OP^{AA-SLF}$ | μM/min | 1 μM Cu(II) | 0.405 | 0.033 | 8.11 |
| $OP^{GSH-SLF}$ | μM/min | 1 μM Cu(II) | 0.737 | 0.044 | 6.03 |
| $OP^{OH-SLF}$ | nM/min | 2 μM Fe(II) | 11.74 | 0.83 | 7.10 |
| $OP^{DTT}$ | μM/min | 0.2 μM PQ | 1.867 | 0.094 | 5.04 |
| $OP^{OH-DTT}$ | nM/min | 0.2 μM 5-H-1,4-NQ | 15.83 | 0.77 | 4.89 |

TABLE 3

Precision of SAMERA as obtained by multiple (N = 10) measurements of an ambient $PM_{2.5}$ sample.

| Endpoint | Unit | Average | Standard Deviation | CoV (%) |
|---|---|---|---|---|
| $OP^{AA-SLF}$ | nmol/(min · μg) | 0.0166 | 0.00196 | 11.87 |
| $OP^{GSH-SLF}$ | nmol/(min · μg) | 0.0281 | 0.00221 | 7.89 |
| $OP^{OH-SLF}$ | nmol/(min · μg) | 0.437 | 0.0462 | 10.56 |
| $OP^{DTT}$ | pmol/(min · μg) | 0.0367 | 0.00387 | 10.52 |
| $OP^{OH-DTT}$ | pmol/(min · μg) | 0.0489 | 0.00650 | 13.28 |

Table 4. Comparison of Ambient $PM_{2.5}$ OP Obtained from SAMERA with Those Reported in the Literatures.

TABLE 4A

| | $OP^{AA}$ | | | | |
|---|---|---|---|---|---|
| Reference | PM size fraction (μm) | Levels | Location | Location type | Sample size |
| Fang et al. (2016)[a] | ≤2.5 | 0.2 – 5.2 nmol · min$^{-1}$ · m$^{-3}$ | Southeast US | Urban and rural | 483 |
| Mudway et al. (2005)[b] | ≤2.5 | 0.012 ± 0.0001 nmol · min$^{-1}$ · μg$^{-1}$ | Eksaal, India | Biomass burning | 3 |
| Künzli et al. (2006)[b] | ≤2.5 | 0.0096 ± 0.0025 nmol · min$^{-1}$ · μg$^{-1}$ | 19 European cities | Urban | 716 |
| Szigeti et al. (2016)[b,c] | ≤2.5 | 0.0017 – 0.04 nmol · min$^{-1}$ · μg$^{-1}$ | 8 European cities | Urban | 22 |
| Godri et al. (2011)[b] | 1.0-1.9 | 0.0058 ± 0.0025 nmol · min$^{-1}$ · μg$^{-1}$ | London, United Kingdom | Urban | 14 |

TABLE 4A-continued

$OP^{AA}$

| Reference | PM size fraction (μm) | Levels | Location | Location type | Sample size |
|---|---|---|---|---|---|
| This study ($OP^{AA-SLF}$) | ≤2.5 | 0.004 – 0.077 nmol · min$^{-1}$ · μg$^{-1}$<br>median: 0.012 nmol · min$^{-1}$ · μg$^{-1}$<br>0.044 – 0.745 nmol · min$^{-1}$ · m$^{-3}$<br>median: 0.160 nmol · min$^{-1}$ · m$^{-3}$ | Midwest US (5 sites) | Urban (4), rural (1) | 54 |

[a] The study assessed $OP^{AA}$ of ambient PM samples in an AA-only model (no other antioxidants involved).
[b] The composition of lung lining fluid (200 μM AA, 200 μM GSH and 200 μM UA) was different in these studies than the SLF used in our study. Moreover, total consumption of AA in 4 hours was reported, and we have estimated the rates assuming linear pattern of AA consumption with time.
[c] Comparison of the OP activities between indoor air PM and outdoor air PM. Only the results of outdoor air PM were included in this table.

TABLE 4B

$OP^{GSH}$

| Reference | PM size fraction (μm) | Levels | Location | Location type | Sample size |
|---|---|---|---|---|---|
| Mudway et al. (2005)[a] | ≤2.5 | 0.0083 ± 0.0002 nmol · min$^{-1}$ · μg$^{-1}$ | Eksaal, India | Biomass burning | 3 |
| Künzli et al. (2006)[a] | ≤2.5 | 0.0041 ± 0.0017 nmol · min$^{-1}$ · μg$^{-1}$ | 19 European cities | Urban | 716 |
| Szigeti et al. (2016)[a,b] | ≤2.5 | 0 – 0.0275 nmol · min$^{-1}$ · μg$^{-1}$ | 8 European cities | Urban | 22 |
| Godri et al. (2011)[a] | 1.0-1.9 | 0.0042 ± 0.0033 nmol · min$^{-1}$ · μg$^{-1}$ | London, United Kingdom | Urban | 14 |
| This study ($OP^{GSH-SLF}$) | ≤2.5 | 0.001 – 0.040 nmol · min$^{-1}$ · μg$^{-1}$<br>median: 0.010 nmol · min$^{-1}$ · μg$^{-1}$<br>0.008 – 0.463 nmol · min$^{-1}$ · m$^{-3}$<br>median: 0.100 nmol · min$^{-1}$ · m$^{-3}$ | Midwest US (5 sites) | Urban (4), rural (1) | 54 |

[a] The composition of lung lining fluid (200 μM AA, 200 μM GSH and 200 μM UA) was different in these studies than the SLF used in our study. Moreover, total consumption of GSH in 4 hours was reported, and we have estimated the rates assuming linear pattern of GSH consumption with time.
[b] Comparison of the OP activities between indoor air PM and outdoor air PM. Only the results of outdoor air PM were included in this table.

TABLE 4C

$OP^{OH-SLF}$

| Reference | PM size fraction (μm) | Levels | Location | Location type | Sample size |
|---|---|---|---|---|---|
| Vidrio et al. (2009)[a] | ≤2.5 | 0.253 ± 0.135 pmol · min$^{-1}$ · μg$^{-1}$ | Davis, CA | Urban | ~90 |
| Ma et al. (2015)[a] | ≤2.5 | 0.092 ± 0.019 pmol · min$^{-1}$ · μg$^{-1}$ | Guangzhou, China | Urban | 72 |
| This study | ≤2.5 | 0.085 – 0.967 pmol · min$^{-1}$ · μg$^{-1}$<br>median: 0.307 pmol · min$^{-1}$ · μg$^{-1}$<br>0.857 – 7.884 pmol · min$^{-1}$ · m$^{-3}$<br>median: 3.559 pmol · min$^{-1}$ · m$^{-3}$ | Midwest US (5 sites) | Urban (4), rural (1) | 54 |

[a] The SLF used in these studies had the same composition as ours (200 μM AA, 100 μM GSH, 100 μM UA and 300 μM CA). However, total •OH generated in 24 hours was reported, and we have estimated the rates assuming linear pattern of •OH generation with time.

TABLE 4D

$OP^{DTT}$

| Reference | PM size fraction (μm) | Levels | Location | Location type | Sample size |
|---|---|---|---|---|---|
| Fang et al. (2016) | ≤2.5 | 0.15 – 0.43 nmol · min$^{-1}$ · m$^{-3}$ | Southeast US | Urban and rural | 483 |
| Xiong et al. (2017) | ≤2.5 | 0.1 – 0.18 nmol · min$^{-1}$ · m$^{-3}$ | Urbana, IL | Urban | 10 |
| Verma et al. (2014) | ≤2.5 | 0.018 – 0.055 nmol · min$^{-1}$ · μg$^{-1}$ | Atlanta area, GA | Urban, rural | 483 |
| Cho et al. (2005) | ≤2.5 | 0.005 – 0.155 nmol · min$^{-1}$ · μg$^{-1}$ | Los Angeles basin, CA | Urban | 11 |

TABLE 4D-continued $OP^{DTT}$

| Reference | PM size fraction (μm) | Levels | Location | Location type | Sample size |
|---|---|---|---|---|---|
| Charrier et al. (2015) | ≤2.5 | 0.02 – 0.061 nmol · min$^{-1}$ · μg$^{-1}$ | San Joaquin, CA | Urban, rural | 6 |
| Hu et al. (2008) | 0.25-2.5 | 0.014 – 0.024 nmol · min$^{-1}$ · μg$^{-1}$ | Los Angeles harbor, CA | Urban | 84 |
| This study | ≤2.5 | 0.004 – 0.193 nmol · min$^{-1}$ · μg$^{-1}$ median: 0.014 nmol · min$^{-1}$ · μg$^{-1}$ 0.041 – 1.282 nmol · min$^{-1}$ · m$^{-3}$ median: 0.146 nmol · min$^{-1}$ · m$^{-3}$ | Midwest US (5 sites) | Urban (4), rural (1) | 54 |

TABLE 4E $OP^{OH\text{-}DTT}$

| Reference | PM size fraction (μm) | Levels | Location | Location type | Sample size |
|---|---|---|---|---|---|
| Xiong et al. (2017) | ≤2.5 | 0.2 – 0.6 pmol · min$^{-1}$ · m$^{-3}$ | Urbana, IL | Urban | 10 |
| Yu et al. (2018) | ≤2.5 | 0.2 – 1.1 pmol · min$^{-1}$ · m$^{-3}$ | Urbana, IL | Urban | 10 |
| study | ≤2.5 | 0.034 – 0.357 pmol · min$^{-1}$ · μg$^{-1}$ median: 0.082 pmol · min$^{-1}$ · μg$^{-1}$ 0.360 – 4.152 pmol · min$^{-1}$ · m$^{-3}$ median: 1.054 pmol · min$^{-1}$ · m$^{-3}$ | Midwest US (5 sites) | Urban (4), rural (1) | 54 |

We claim:

1. An instrument for analyzing oxidative potential of particles from an air sample comprising:
a sample injector comprising:
a plurality of reservoirs including at least one reaction vial (RV) and at least one measurement vial (MV), each reservoir configured to hold at least one material selected from the group consisting of: a reaction chemical, an incubation chemical, a cleaning liquid, air, and waste fluid;
a plurality of automated programmable pumps for flowing the material from each reservoir to another reservoir or to or from an automated measurement system;
an automated multi-position valve and fluid conduits to fluidically connect a sample vial to the plurality of reservoirs, wherein the programmable pump(s) are configured to drive a flow of fluid sample from the sample vial to the reaction vial;
an automated valve actuator for controlling the multi-position valve to select different samples for analysis and fluidically control fluid flow within, into and out of the sample injector;
an automated sample incubator comprising:
an automated thermal mixer fluidically connected to the sample injector for automatically incubating and mixing reaction mixtures: wherein the sample incubator is configured to prepare each reaction mixture that comprises the fluid sample having said particles from the air sample and a material from the plurality of reservoirs, and wherein each reaction mixture is contained in the RV;
wherein said particles are PM$_{2.5}$ airborne particles having an effective diameter that is less than 2.5 μm;
wherein the automated sample incubator is configured to prepare at least a first reaction mixture comprising a first portion of the particles and dithiothreitol (DTT), a second reaction mixture comprising a second portion of the particles, surrogate lung fluid (SLF), and disodium terephthalate (TPT), and a third reaction mixture comprising a third portion of the particles and SLF;
the automated measurement system fluidically connected to the sample incubator and/or sample injector comprising:
a spectrophotometer configured to detect an optical absorbance of a first targeted compound for determining a consumption rate of ascorbic acid and an optical absorbance of a second targeted compound for determining a consumption rate of dithiothreitol;
wherein the measurement system is configured to detect the optical absorbances at least at a first absorbance wavelength and a second absorbance wavelength different from the first absorbance wavelength;
wherein the instrument is configured to automatically provide a portion of the first reaction mixture and a portion of the third reaction mixture to the spectrophotometer configured to automatically detect the optical absorbances of the first targeted compound and of the second targeted compound;
a spectrofluorometer configured to measure a fluorescence of a first indicator compound for determining a consumption rate of glutathione and a fluorescence of a second indicator compound for determining a generation rate of hydroxyl radicals;
wherein the measurement system is configured to measure the fluorescence at least at a first fluorescence wavelength different from each of the first and second absorbance wavelengths;
wherein the instrument is configured to automatically provide portions of each of the first, second, and third reaction mixtures to the spectrofluorometer configured to automatically measure the fluorescence of the first indicator compound in the first and second reaction mixtures and of the second indicator compound in the third reaction mixture;

an automated analyzer configured to calculate and output the consumption rate of ascorbic acid and the consumption rate of dithiothreitol using the absorbance of the targeted compounds measured by the spectrophotometer and configured to calculate and output the consumption rate of glutathione and the generation rate of hydroxyl radicals using the fluorescence of the indicator compounds measured by the spectrofluorometer, and thereby analyze the oxidative potential of the particles via the calculated and output endpoints comprising:

consumption rate of ascorbic acid (AA) in surrogate lung fluid (SLF) ($OP^{AA-SLF}$);

consumption rate of glutathione (GSH) in SLF ($OP^{GSH-SLF}$);

generation rate of hydroxyl radicals (·OH) in SLF ($OP^{OH-SLF}$);

consumption rate of dithiothreitol (DTT) ($OP^{DTT}$); and generation rate of hydroxyl radicals in DTT ($OP^{OH-DTT}$); and an automated controller for automatically controlling fluidics with a control scheme;

wherein the controller, sample injector, sample incubator, measurement system, and analyzer are configured to provide an automated output of the endpoints in an output time that is less than 3 hours after the instrument receives the particles from the air sample.

2. The instrument of claim 1, wherein the instrument is configured to determine the:

$OP^{AA-SLF}$, $OP^{GSH-SLF}$, and $OP^{OH-SLF}$ from a first stage SLF protocol; and $OP^{DTT}$ and $OP^{OH-DTT}$ from a second stage dithiothreitol (DTT) protocol.

3. The instrument of claim 1, wherein the instrument is configured to simultaneously determine a plurality of the endpoints.

4. The instrument of claim 1, wherein the particles comprise atmospheric particulate matter having a diameter less than or equal to 2.5 µm extracted in a liquid solution.

5. The instrument of claim 1, wherein the automated measurement system is configured to simultaneously detect an optical absorbance using the spectrophotometer and measure a fluorescence using the spectrofluorometer.

6. The instrument of claim 1, wherein the material in the plurality of reservoirs comprises one or more of: K-PB (potassium phosphate buffer) of pH=7.4; SLF (surrogate lung fluid); TPT (Disodium terephthalate); DI (de-ionized water); OPA (O-pthaldialdehyde); DTT (dithiothreitol); or DTNB (5,5'-dithiobis-(2-nitrobenzoic acid)).

7. The instrument of claim 6, comprising three programmable pumps, wherein:

a first pump positioned in fluidic communication with DTNB, K-PB, SLF, DTT, reaction vials 1, 2 and 3, and measurement vials 1 and 2;

a second pump positioned in fluidic communication with reaction vials 1, 2 and 3, measurement vial 1, a spectrophotometer capillary cell, and the multi-position valve; and a third pump positioned in fluidic communication with the OPA, TPT, spectrofluorometer flow cell, reaction vials 1, 2 and 3, and measurement vial 1.

8. The instrument of any of claim 1, wherein the instrument is configured to automatically and periodically determine each of the five endpoints over a time course of between 30 minutes and 90 minutes.

9. An automated method for analyzing oxidative potential of particles from an air sample, the method comprising the steps of:

(a) fluidically connecting a liquid sample vial containing particles extracted from the air sample to the sample injector system of claim 1;

(b) determining the $OP^{AA-SLF}$, $OP^{GSH-SLF}$, and $OP^{OH-SLF}$ SLF-based endpoints by:

(i) introducing with the sample injector a first sample volume from the liquid sample vial to a first reaction vial and a second sample volume to a second reaction vial, wherein the reaction vials each contain a buffer and SLF, and the second reaction vial further contains TPT to immediately capture hydroxyl radicals generated in a reaction in the reaction vial;

(ii) incubating the first and second RVs for an SLF incubation time period;

(iii) transferring a first aliquot from the first RV to a first MV and a second aliquot from the first RV to a second MV, wherein the transferring is by the sample injector;

(iv) diluting the first MV with DI for measuring AA;

(v) adding OPA into the second MV for probing GSH, wherein GSH reacts with OPA to form the indicator compound, and the indicator compound is delivered to the spectrofluorometer for indicator compound detection;

(vi) flowing the diluted sample from the first MV to a capillary cell of the spectrophotometer to measure absorbance of the targeted compound to determine a concentration of residual AA;

(vii) further diluting the sample in the second MV and injecting the diluted sample into a flow cell of the spectrofluorometer to measure fluorescence intensity to determine a concentration of GSH;

(viii) cleaning the RVs, MVs, flow cell and capillary cell with DI by the sample injector after each measuring step; and (ix) repeating steps (ii)-(vi) over a time course to determine consumption rates of AA and GSH; and (x) quantifying AA and GSH from calibration curves of initial absorbance and fluorescence intensity of different known concentrations of AA and GSH in SLF to thereby determine $OP^{AA-SLF}$ and $OP^{GSH-SLF}$;

(c) wherein measurement of OH is conducted at substantially the same time as GSH and AA measurement, the method further comprising the steps of:

(xi) reacting TPT with the ·OH in the second RV to form a fluorescent product 2-OHTA;

(xii) periodically collecting at various time intervals an aliquot from the second RV containing 2-OHTA;

(xiii) diluting the collected aliquot with DI;

(xiv) providing the diluted aliquot to a flow cell of the spectroflourometer to determine a concentration of the 2-OHTA to thereby determine $OP^{OH-SLF}$;

(d) wherein the flow cell and RV are cleaned after each determining step.

10. The method of claim 9, wherein sample in the liquid sample vial containing particles from the air sample is prepared by the steps of:

collecting ambient $PM_{2.5}$ samples on a filter;

extracting the collected $PM_{2.5}$ from the filter; and suspending the extracted $PM_{2.5}$ in liquid.

11. The method of claim 9, wherein the simultaneous measurement of endpoints results in an elapsed measurement time to obtain all five endpoints that is less than or equal to three hours for a given ambient PM aqueous extract.

12. The method of claim 9, further comprising the step of automatically controlling the multi-position valve and programmable pumps to provide desired flow-rates, fluid volumes, fluid composition, to and between vials and the measurement system.

13. The method of claim 12, wherein the controlling step is by implementing a control scheme with a controller operably connected to the programmable pumps and the valve actuator.

14. The method of claim 13, wherein the controller is embedded in a computing device.

15. The method of claim 9, wherein after completing all determinations of AA and GSH in the first reaction vial and ·OH in the second reaction vial, a final cleaning step comprising rinsing with DI all the reaction vials, measurement vials, fluidic components and flow cells.

16. The method of claim 15, wherein after the final cleaning step, the method further comprises determining the $OP^{DTT}$ and $OP^{OH\text{-}DTT}$ DTT-based endpoints, wherein the $OP^{DTT}$ determination comprises the steps of:
introducing with the sample injector a first sample volume to the first reaction vial, wherein the first RV contains DTT, and a K-PB-buffered TPT;
incubating the first RV for a DTT incubation time period;
periodically transferring an aliquot from the first RV with the sample injector to the first measurement vial containing DTNB;
forming 2-nitro-5-thiobenzoic acid (TNB) from the DTNB and residual DTT in the first MV;
diluting the TNB;
flowing the diluted TNB from the first MV to a capillary cell of the spectrophotometer to measure an absorbance of the TNB to determine a concentration of TNB and thereby $OP^{DTT}$; and
simultaneously to the $OP^{DTT}$ determination steps, the $OP^{OH\text{-}DTT}$ determination comprises the steps of:
periodically transferring an aliquot from the first RV with the sample injector to the second measurement vial at various time intervals;
diluting the aliquot in the second MV with DI;
delivering the diluted aliquot to a flow cell of the spectrofluorometer to determine a concentration of the 2-OHTA to thereby determine $OP^{OH\text{-}DTT}$.

17. The method of claim 16, wherein after completing all determinations of DTT and ·OH, the method further comprises a rinsing with DI all the reaction vials, measurement vials, fluidic components and flow cells.

* * * * *